United States Patent [19]
Stern

[11] Patent Number: 5,771,321
[45] Date of Patent: Jun. 23, 1998

[54] MICROMECHANICAL OPTICAL SWITCH AND FLAT PANEL DISPLAY

[75] Inventor: Ernest Stern, Concord, Mass.

[73] Assignee: Massachusetts Institute of Technology, Cambridge, Mass.

[21] Appl. No.: 582,790

[22] Filed: Jan. 4, 1996

[51] Int. Cl.$^6$ ..................................................... G02B 6/26
[52] U.S. Cl. .............................. 385/31; 385/37; 385/25; 385/42; 385/41; 385/48; 385/146; 385/901
[58] Field of Search ................................ 385/37, 16, 18, 385/25, 26, 42, 40, 41, 48, 146, 901

[56] References Cited

U.S. PATENT DOCUMENTS

| | | | |
|---|---|---|---|
| 3,238,396 | 3/1966 | Nelson et al. | 178/7.5 |
| 3,871,747 | 3/1975 | Andrews | 350/160 R |
| 4,087,810 | 5/1978 | Hung et al. | 340/324 M |
| 4,113,360 | 9/1978 | Baur et al. | 350/285 |
| 4,234,361 | 11/1980 | Guckel et al. | 148/186 |

(List continued on next page.)

FOREIGN PATENT DOCUMENTS

| | | |
|---|---|---|
| 0259051 | 3/1988 | European Pat. Off. . |
| 0280279 | 8/1988 | European Pat. Off. . |
| 0295130 | 12/1988 | European Pat. Off. . |
| 0459688 | 12/1991 | European Pat. Off. . |
| 0495400 | 7/1992 | European Pat. Off. . |
| 537703A | 4/1993 | European Pat. Off. ........ G02F 1/313 |
| 675477A | 10/1995 | European Pat. Off. .......... G09F 9/37 |
| 2274123 | 1/1976 | France . |
| 2302536 | 9/1976 | France . |
| 2319912 | 2/1977 | France . |
| 2336026 | 7/1977 | France . |
| 2543729 | 10/1984 | France . |
| 2549235 | 1/1985 | France . |
| 2902259 | 7/1980 | Germany . |
| 3839109 | 5/1990 | Germany . |
| 4128935 | 9/1992 | Germany . |
| 2040063 | 8/1980 | United Kingdom . |
| 2180665 | 4/1987 | United Kingdom . |
| 2215084 | 9/1989 | United Kingdom . |
| 2265024 | 9/1993 | United Kingdom ............. G02F 1/01 |
| 9318423 | 9/1993 | WIPO . |

OTHER PUBLICATIONS

Petersen, "Micromechanical Light Deflector Array," *IBM Technical Disclosure Bulletin*, vol. 20, No. 1, pp. 355–356, Jun. 1977.

(List continued on next page.)

*Primary Examiner*—John Ngo
*Attorney, Agent, or Firm*—Theresa A. Lober

[57] ABSTRACT

The invention provides an optical coupling switch and flat panel display including an array of such optical coupling switches. The optical coupling switch includes a light storage plate adapted to set up conditions for total internal reflection such that light injected into the plate is internally reflected. A light tap is disposed proximal to a coupling surface of the light storage plate for coupling internally reflected light out of the light storage plate and into the light tap when the light tap is brought into contact with the light storage plate coupling surface. The light tap is capable of movement in a direction perpendicular to the light storage plate in response to an applied electrostatic force. The optical coupling switch includes a scattering mechanism, such as a scattering surface or scattering medium, for scattering light in the light tap into a viewing volume. With this configuration, the optical coupling switch provides an elegantly uncomplicated geometry that accommodates a range of actuation schemes for efficiently producing high-speed optical switching. Also provided is an optical display in which an array of light taps are disposed proximal to a light storage plate coupling surface. Each light tap is adapted to move in response to an applied electrostatic force in a direction perpendicular to the coupling surface, and each light tap includes a scattering surface for scattering coupled light. A light source is disposed at an edge of the light storage plate for injecting light into the plate. Control circuitry is provided connected to the array of light taps for applying an electrostatic force to selected one or more of the light taps in the array.

63 Claims, 18 Drawing Sheets

U.S. PATENT DOCUMENTS

| | | | |
|---|---|---|---|
| 4,268,116 | 5/1981 | Schmadel et al. | 350/96.29 |
| 4,281,904 | 8/1981 | Sprague et al. | 350/356 |
| 4,356,730 | 11/1982 | Cade | 73/517 R |
| 4,626,074 | 12/1986 | Crossland et al. | 350/345 |
| 4,662,746 | 5/1987 | Horbeck | 350/269 |
| 4,710,732 | 12/1987 | Hornbeck | 332/7.51 |
| 4,730,884 | 3/1988 | Seino et al. | 350/96.14 |
| 4,733,950 | 3/1988 | Takubo et al. | 350/392 |
| 4,822,145 | 4/1989 | Staelin | 350/345 |
| 4,909,611 | 3/1990 | Spooner | 350/360 |
| 4,973,131 | 11/1990 | Carnes | 350/166 |
| 4,974,942 | 12/1990 | Gross et al. | 350/347 V |
| 4,983,006 | 1/1991 | Nishimoto | 350/96.14 |
| 5,009,483 | 4/1991 | Rockwell, III | 350/96.24 |
| 5,024,500 | 6/1991 | Stanley et al. | 350/96.15 |
| 5,040,878 | 8/1991 | Eichenlaub | 350/345 |
| 5,044,734 | 9/1991 | Sperl et al. | 359/49 |
| 5,091,983 | 2/1992 | Lukosz | 385/13 |
| 5,106,181 | 4/1992 | Rockwell, III | 385/2 |
| 5,125,740 | 6/1992 | Sato et al. | 356/128 |
| 5,128,842 | 7/1992 | Kenmochi | 362/958 |
| 5,184,238 | 2/1993 | Wright | 359/70 |
| 5,206,746 | 4/1993 | Ooi et al. | 359/40 |
| 5,221,987 | 6/1993 | Laughlin | 359/222 |
| 5,233,459 | 8/1993 | Bozler et al. | 359/230 |
| 5,262,000 | 11/1993 | Welbourn et al. | 156/643 |
| 5,278,925 | 1/1994 | Boysel et al. | 385/14 |
| 5,289,351 | 2/1994 | Kashima et al. | 362/31 |
| 5,319,491 | 6/1994 | Selbrede | 359/291 |
| 5,455,709 | 10/1995 | Dula, III et al. | 359/245 |

OTHER PUBLICATIONS

Flores et al., "A Linear Total Int. Refl. Spatial Light Mod. & its Appl. In Opt. Info. Process.," *Topical Meet.On Int. & Guided–Wave Opt.*, pp. FA3/1–4, Pacific Grove, CA, Jan. 6–8, 1982.

Terui et al., "Optical waveguide 2×2 atrix switch using dielectric chip motion," *Applied Optics*, vol. 21, No. 11, pp. 1979–1984, Jun. 1, 1982.

Cadman et al., "New Micromechanical Display Using Thin Metallic Film," *IEEE Elect. Dev. Lett.*, vol. EDL–4, No. 1, pp. 3–4, Jan. 1983.

Jerominek et al., "Bistability and blocking oscillations in a total internal reflection integrated–optics device," *Opt. Comm.*, vol. 52, No. 6, pp. 393–400, Jan. 15, 1985.

Gustafsson et al., "A silicon light modulator," *J. Phys. E. Sci. Instrum.*, vol. 21, pp. 680–685, 1988.

Bawa et al., "Miniaturized total–reflection ferroelectric liquid–crystal electro–optic switch," *Appl. Phys. Lett.*, vol. 57, No. 15, pp. 1479–1481, Oct. 8, 1990.

Hogari et al., "Electrostatically driven micromechanical 2×2 optical switch," *Applied Optics*, vol. 30, No. 10, pp. 1253–1257, Apr. 1, 1991.

Watts et al., "Electromechanical optical switching and modulation in micromachined silicon–on–insulator waveguides," 1991 IEEE Int SOI Conf. Proc., pp. 62–63, Vail, CO, Oct. 1–3, 1991.

Nelson et al., "Leaky Lightguide/LED Row–Backlight, Column–Shutter Display," *IEEE Trans. Elect. Dev.*, vol. 38, No. 11, pp. 2567–2569, Nov. 1991.

Solgaard et al., "Deformable grating optical modulator," *Optics Letters*, vol. 17, No. 9, pp. 688–690, May 1, 1992.

Sainov et al., "Total internal reflection liquid–crystal device," *SPIE*, vol. 1665, Liquid Crystal Materials, Devices, and Applications, pp. 345–350, 1992.

Kim et al., "Micromechanically based integrated optic modulators and switches," *SPIE*, vol. 1793, Integrated Optics and Microstructures, pp. 183–189, 1992.

Lukosz, "Integrated opotical nanomechanical devices as modulators, switches, and tuanable frequency filters, and as acoustical sensors," *SPIE*, vol. 1793, Integrated Optics and Microstructures, pp. 214–234, 1992.

Pliska et al., "Electrostatically actuated integrated optical nanomechanical devices," *SPIE*, vol. 1793, Integrated Optics and Microstructures, pp. 259–272, 1992.

Fefelov et al., "High contrast optical switch–attenuator", *SPIE*, vol. 1807, Photonic Switching, pp. 254–258, 1992.

Guckel et al., "Polysilicon resonant microbeam technology for high performance sensor applications", *IEEE Solid State Sensor & Actuator Workshop*, pp. 153–156, H.Hd, SC, Jun. 21–25, 1992.

Aratani et al., "Process and design considerations for surface micromachined beams for a tunable interferometer array in silicon," Proceedings, Micro Electro Mecanical Systems, pp. 230–235, Ft. Lauderdale, FL, Feb. 1993.

Apte et al., "Deformable grating light valves for high resolution displays," *Solic State Sensor & Actuator Workshop*, pp. 1–6, Hilton Head, SC, Jun. 13–16, 1994.

Goosen et al., "Silico modulator based on mechanically–active anti–reflection layer with 1 Mbit/sec capability for fiber–in–the–loop applications," *IEEE Phot. Tech. Letts.*, vol. 6, No. 9, pp. 1119–1121, Sep. 1994.

Wiszniewski et al., Mechanical light modulator fabricated on a silicon chip using SIMOX technology, *Sensors and Actuators A*, vol. 43, pp. 170–174, 1994.

Jaecklin et al., "Mechanical and optical properties of surface micromachined torsional mirrors in silicon, polysilicon and aluminum," *Sensors and Actuators A*, vol. 43, pp. 269–275, 1994.

"Micro–Electromechanical Systems," pp. 1–4, *NOI Bulletin*, National Optics Institute, vol. 6, No. 2, Apr. 1995.

"Ion depletion Projection Display," *IBM Technical Disclosure Bulletin*, vol. 30, No. 6, pp. 43–44, Nov. 1987.

Differential Potential

MICROMECHANICAL OPTICAL SWITCH AND FLAT PANEL DISPLAY

GOVERNMENT RIGHTS IN THE INVENTION

This invention was made with U.S. Government support under Contract Number F19628-90-C-002 awarded by the Air Force. The U.S. Government has certain rights in this invention.

FIELD OF THE INVENTION

This invention relates to optical switching techniques, and more particularly relates to optical switching in large-scale optical systems such as optical displays.

BACKGROUND OF THE INVENTION

Electronically controlled optical displays, and particularly flat panel optical displays, which generally are distinguished by their relative slimness and ability to produce a direct, as opposed to a projected, display image are of increasing technological importance for a wide range of applications. Flat panel optical displays that produce directly viewable video images such as text and graphics are in theory ideally suited as television monitors, computer monitors, and other such display screen scenarios. Yet the many flat panel optical display approaches heretofore proposed and investigated all exhibit serious disadvantages that have limited their practical applicability as a commercially viable flat panel display screen technology.

For example, the class of flat panel displays known as liquid crystal displays require complex manufacturing processes that currently produce relatively low yields, resulting in an overall size limitation for volume production. In operation, liquid crystal displays require considerable power to maintain a display backlight and these displays provide only a limited range of viewing angles. Electroluminescent display technology suffers from similar limitations, as well as a limited display color range and limited operational lifecycle.

Active-matrix display technology, which employs an active electronic device at each pixel location of a display, is likewise limited both by high power consumption, production yield constraints, and limited operational lifecycle. Color gas plasma display technology, like liquid crystal technology, requires a complex manufacturing process to produce an optical display; a gas plasma display relies on complicated packaging schemes for providing reliable containment of a noble gas, resulting in high manufacturing costs.

Various electromechanical display technologies have been proposed which generally rely on electronic control in conjunction with manipulation of mechanical elements in a display. Typical mechanical display schemes have been limited by so many manufacturing complexities and/or operational constraints that they are as yet commercially impractical. Furthermore, the speed, resolution, and power consumption requirements of the latest optical display applications have heretofore been unachievable by conventional electromechanical display technologies. But electronic as well as electromechanical display technologies have all required design and performance trade-offs resulting in one or more suboptimal manufacturing or operational considerations.

SUMMARY OF THE INVENTION

The invention provides an optical coupling switch and optical display employing an array of optical coupling switches that overcome limitations of past optical switches and displays to achieve superior display switch speed, display efficiency, compact geometry, and ease of manufacture. The optical coupling switch of the invention includes a light storage plate that is adapted to set up conditions for total internal reflection such that light injected into the plate is internally reflected. A light tap is disposed proximal to a coupling surface of the light storage plate for coupling internally reflected light out of the light storage plate and into the light tap when the light tap is brought into contact with the light storage plate coupling surface. The light tap is capable of movement in a direction perpendicular to the light storage plate in response to an applied electrostatic force. The optical coupling switch also includes a scattering mechanism, such as a scattering surface or scattering medium, for scattering light in the light tap. With this configuration, the optical coupling switch provides an elegantly uncomplicated geometry that accommodates a range of actuation schemes for efficiently producing high-speed optical switching.

The light coupled into the light tap is effectively scattered by the scattering mechanism such that a practical range of optical viewing angles is produced by the optical coupling switch. In preferred embodiments, the scattering mechanism of the optical switch is a scattering surface, preferably on the light tap, and includes, e.g., surface asperities or a surface grating. In other preferred embodiments, the scattering mechanism is a scattering medium that is translucent, fluorescent, or luminescent.

Preferably, the light storage plate includes at least one coupling mesa located on the coupling surface in correspondence with the light tap such that the light tap contacts at least one coupling mesa when brought into contact with the light storage plate. Alternatively, at least one coupling mesa is preferably located on the light tap and is in contact with the light storage plate when the light tap is brought into contact with the light storage plate.

In preferred embodiments, the light tap is characterized by an internal mechanical restoring force, e.g., a tensile or compressive force, that opposes applied electrostatic force. Preferably the light tap is mechanically biased either into or out of contact with the light storage plate by this mechanical restoring force, and is moved in the other direction, i.e., out of or into contact with the light storage plate, by an applied electrostatic force. Alternatively, the light tap is both biased and moved into and out of contact with the light storage plate by an applied electrostatic force.

Preferably, the light tap of the optical coupling switch includes a textured Lambertian scattering surface that is reflective for reflecting coupled light back through the light storage plate to emerge into a viewing volume adjacent to the light storage plate. Alternatively, the scattering surface on the light tap is a forward scattering surface for scattering coupled light into a viewing volume adjacent to the light tap. In this case, a viewing plate is preferably disposed adjacent to the light tap. The viewing plate can also include a scattering surface for scattering light that emerges through the viewing plate into a viewing volume adjacent to the viewing plate. A light source is preferably located at an edge of the light storage plate.

The light tap is preferably anchored to the viewing plate by at least one support located at a point on the tap that permits flexing of the tap, and the viewing plate is preferably secured to the light storage plate. Preferably, the light tap includes protrusions on a surface facing the light storage plate. These protrusions permit coupling of light into the light tap but suppress contact forces between the light tap and the light storage plate.

In preferred embodiments, two or more of the light tap, viewing plate, and light storage plate include a conducting electrode disposed in correspondence with each other for generating an electrostatic force. Alternatively, the light tap includes a conducting electrode and the viewing plate or light storage plate include an electret for generating an electrostatic force.

Preferably, the light storage plate is formed of a glassy material such as quartz, or is formed of plastic. The light tap is preferably formed of a microelectronic material such as plastic or silicon nitride, and the viewing plate is preferably formed of plastic or a glass material, such as quartz.

In another aspect, the invention provides an optical display in which an array of light taps are disposed proximal to a light storage plate coupling surface. Each light tap is adapted to move in response to an applied electrostatic force in a direction perpendicular to the coupling surface, and each light tap includes a scattering surface for scattering coupled light. A light source is disposed at an edge of the light storage plate for injecting light into the plate. Control circuitry is provided connected to the array of light taps for applying an electrostatic force to selected one or more of the light taps in the array.

In preferred embodiments, a viewing plate is disposed adjacent to the light tap array, and the viewing plate includes an array of electrodes disposed on the viewing plate in correspondence with electrodes on the taps in the light tap array for producing an electrostatic force. Preferably, the control circuitry includes line and column electrode drive circuits and a controller for applying an electrostatic force between selected one or more of light tap and viewing plate electrodes in the array.

Preferably, the light source is configured adjacent to an edge of the light storage plate such that light injected into the light storage plate undergoes total internal reflection. A second light source can be disposed at an edge of the light storage plate and a second light source can be disposed on the back surface of the light storage plate. Preferably, the light source produces at least two different colors of light.

In yet other preferred embodiments, the array of light taps forms an array of pixels, each pixel designated by a set of n light taps corresponding to a number n of pixel bits. Each of the n light taps in the given pixel is controlled by the control circuitry to together produce for a given pixel one of a number of $2^n$ of possible optical intensities. Preferably, each of the n light taps in a given pixel is adapted to make contact with a contact area of the light storage plate having one of a number n of possible contact area sizes for a given pixel. Alternatively, the number n of pixel bits for a given pixel is the product of a temporal weight t equal to a number of possible durations during which light is injected into the light storage plate and an area weight w equal to a number of possible contact area sizes in a given pixel.

Preferably, the light tap array is formed of a plastic layer disposed proximal to the light storage plate, which in this case is also preferably plastic and is characterized by a refractive index such that light injected into the plate is internally reflected. The viewing plate is then also preferably plastic. The light taps are here formed of an array of conducting column electrodes disposed on the plastic sheet; preferably, an array of slots border the column electrodes. The plastic viewing plate includes an array of conducting line electrodes located in correspondence with the column electrodes on the plastic sheet for producing an electrostatic force. Preferably, the plastic light storage plate includes spacer protrusions for holding the plastic sheet separated from the light storage plate and similarly, the plastic viewing plate includes support protrusions for holding the plastic sheet separated from the viewing plate.

The optical coupling switch configuration of the invention can be employed in a wide range of display architectures, as well as other optical switch-based applications. Television displays, table top computer displays and other computer displays, monitor displays, kiosks, equipment monitors, and the like all achieve superior design and performance with the invention due to the flat, compact configuration of the display and the low power dissipation achieved by the actuation and control schemes.

Aside from display applications, the optical coupling switch configuration of the invention can also be used, for example, in applications such as optical relay or circuit breaker systems, two-dimensional digital optical computing, and other such optical switch applications. For example, the mechanical tap configuration can be employed to selectively radiate energy from an array of waveguides, whereby a single pole-multiple throw optical switch is produced. Optical multiplexing and opto-isolation schemes are accordingly enabled by the invention. Other features and advantages of the invention will be apparent from a description of a preferred embodiment, and from the claims.

DESCRIPTION OF A PREFERRED EMBODIMENT

Figure 1:
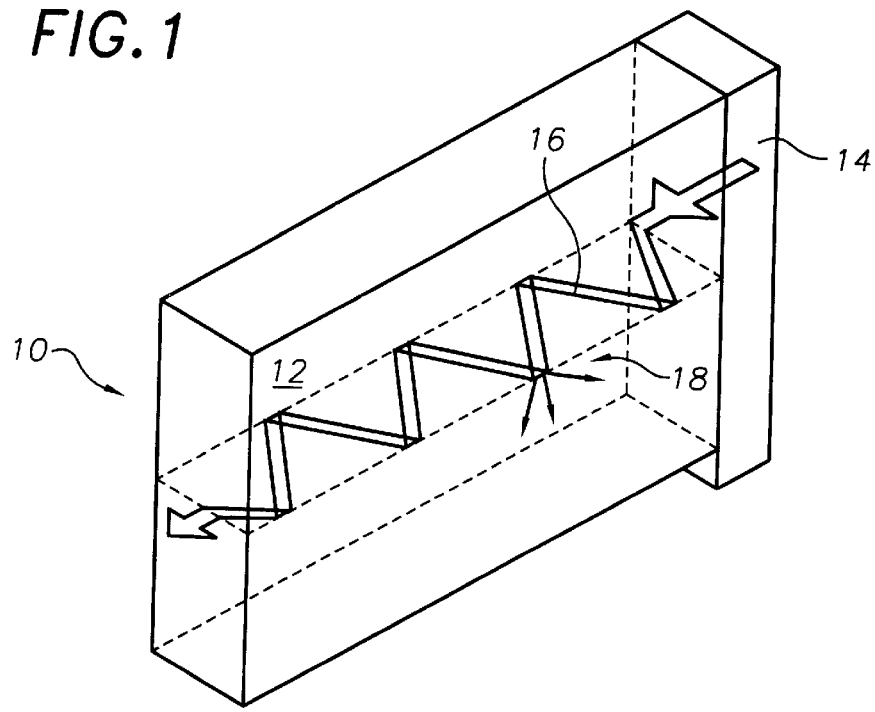
FIG. 1 is a perspective view of an example flat panel display in accordance with the invention.

As shown schematically in FIG. 1, a flat panel display 10 provided by the invention operates to controllably release light stored in a transparent light storage plate 12 for producing a localized viewable pattern of light on the display. Light is provided to the storage plate 12 by a light source 14, which injects light 16 into the storage plate. This injected light is shown only schematically at the edge of the storage plate in FIG. 1. The injected light remains substantially trapped in the storage plate due to a prespecified condition of total internal reflection. However, the display includes mechanical light taps, (not shown) corresponding to a matrix of locations along the storage plate, that provide the ability to overcome the total internal reflection condition at the light tap locations such that light is released from the storage plate toward a viewer at distinct locations, e.g., the location identified as 18 in FIG. 1. This controlled release of light enables the production of a viewable image across the storage plate. The features and operation of the light storage plate, the mechanical light taps, and the other elements of the flat panel display will be explained in turn below.

Figure 2:
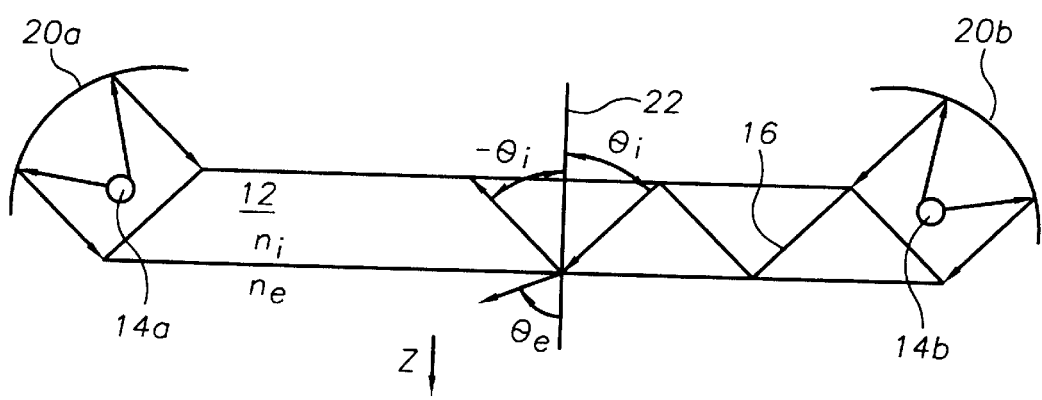
FIG. 2 is a schematic diagram showing an edge of the flat panel display of FIG. 1 and a possible path of light injected into the display.

The light storage plate 12, shown on-edge in FIG. 2, communicates with the light source 14, which may include multiple sources 14a, 14b, located at one or more edges of the plate, such that light, preferably collimated, is injected into the plate. Collimators 20a, 20b, or other suitable schemes can be employed to achieve a desired collimation. Details of specific light source configurations will be described later in the discussion. Once injected in the storage plate, light 16 impinges on surfaces of the plate, bouncing from one surface to the other parallel surface. At each such bounce, the light impinges the corresponding surface at an angle of internal incidence, $\theta_i$, as measured with respect to the perpendicular 22. At the point of the bounce, a component of the light bounces back toward the other surface at an angle of reflection, $\theta_r$, and a component of the light emerges out of the plate from the bounce surface at an angle of emergence, $\theta_e$.

For a given internal incidence angle, $\theta_i$, Snell's law prescribes both the angle of reflection, $\theta_r$, and the angle of emergence, $\theta_e$, as measured with respect to the perpendicular 22 of a storage plate surface, as shown in FIG. 2, as:

$$n_i \sin \theta_i = n_e \sin \theta_e, \quad (1)$$

where $n_i$ is the index of refraction internal to the storage plate and $n_e$ is the index of refraction external to the storage plate. A configuration of the light injected into a storage plate such that the value of $\theta_i$ in Snell's law results in a minimum value for $\theta_e$ of 90° prescribes that no light emerges from the storage plate, but rather, is substantially entirely reflected back at the reflection angle $-\theta_i$ to the opposite surface; this condition is known as total internal reflection. The minimum incident internal critical angle, $\theta_i = \theta_c$, that enables this condition is in turn defined by Snell's law as:

$$\sin \theta_c = n_e/n_i. \quad (2)$$

One example storage plate in accordance with the invention is made of quartz; in this case the internal index of refraction, $n_i$, is that of the quartz, namely, about 1.47. Given that the flat panel display is typically operated in accordance with the invention in air, the external index of refraction, $n_e$, is about 1.00, and correspondence (2) above sets $\theta_c$ equal to about 42.9°. Any internal incidence angle, $\theta_i$, larger than about 42.9° results in an imaginary value for the angle of emergence, $\theta_e$, whereby the light undergoes total internal reflection within the quartz plate; stated another way, under this condition light emerging externally to the plate could not propagate, and instead would decay exponentially in the distance normal to the plate. Thus, light injected into the quartz storage plate at angles greater than about 42.9° does not emerge from the plate each time it strikes an internal surface of the plate, and instead bounces back off internal plate surfaces. As a result, the light cannot effectively be seen by a viewer even though the plate is transparent.

Based on this discussion of total internal reflection, the storage plate 12 of the flat panel display is generally specified as a transparent material having a high index of refraction relative to air and a suitable absorption loss for a given application. Examples of suitable materials other than quartz include other types of clear glasses, plastics, e.g., Plexiglass™, polystyrene, and like materials. The thickness of the storage plate is preferably selected based on considerations for a given application; the thickness of the plate, as well as the lateral plate dimensions, determines the number of internal reflection bounces that occur for a light beam as it traverses the extent of the plate. A thickness of, e.g., between about 1 mm and 10 mm is suitable for many applications, but the thickness can be larger or smaller than this range. Specific storage plate manufacturing considerations will be addressed in detail later in the discussion.

Light is said to be "stored" in the light storage plate 12 as a result of alignment of components in the light source 14 with the storage plate such that light is injected at an angle sufficient for total internal reflection of the light in the plate. This stored light is controllably released, or tapped, in accordance with the invention, at distinct locations of the storage plate by bringing one or more mechanical light tap elements 24, an example of which is shown in cross section in FIGS. 3A–3B, in contact with the storage plate. The region in which light is released by a light tap element 24 is defined by a light storage plate contact area, i.e., the area of the storage plate that is contacted when a tap element is brought into contact with the plate. In one example, such a contact area consists of a mesa 26 on one of the surfaces of the storage plate 12.

The mechanical tap is preferably formed of, e.g., a suspended beam 28 transparent to the optical wavelengths of interest and having a smooth front surface 30 adjacent the mesa and a reflective back-scatter surface 32 on a side opposite the mesa. The mechanical tap is preferably of a high index of refraction relative to the index of refraction of air, and most preferably is of an index of refraction equal to or greater than that of the light storage plate.

Figure 3A:
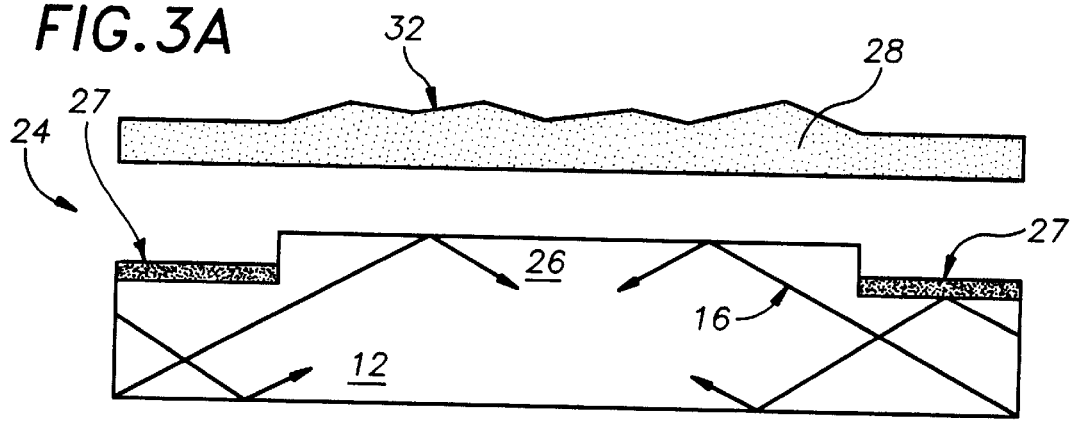
FIG. 3A and FIG. 3B are schematic side views of an example optical switch in accordance with the invention.
Figure 3B:
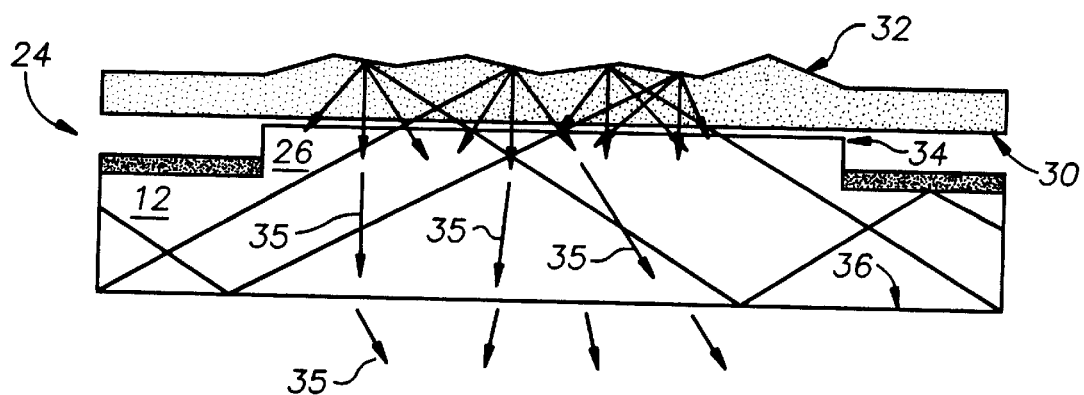

When the mechanical tap is held separated from a storage plate mesa, light 16 in the storage plate remains trapped in the storage plate due to total internal reflection. Movement of the mechanical tap into close contact with the top surface 34 of a corresponding storage plate mesa results in relative matching of the internal index of refraction of the storage plate and the index of refraction external to the storage plate at the location of the storage plate contact area, for example, the mesa top surface, compared to other surface locations of the storage plate; this condition negates the state of total internal reflection at the location of the contact area and results in escape of light from the storage plate 12 into the suspended beam, or mechanical light tap 28, as shown in FIG. 3B.

Light escaping into the mechanical tap propagates through the thickness of the tap and impinges on the reflective back-scatter surface 32 of the tap, where the light is reflected back through the tap toward the light storage plate and into the storage plate. The surface irregularities of the back-scatter surface 32 preferably are of a geometry such that light re-entering the light storage plate 12 is angled, once in the plate, at an angle less than the critical angle, $\theta_c$, defined by Snell's law for the given storage plate material. With this geometry, the re-entering light 35 impinges the front surface 36 of the storage plate 12 at an angle insufficient to support total internal reflection of the light, whereby the light 35 emerges from the front surface 36 of the storage plate and can be seen by a viewer.

As explained in detail below, this localized light release scheme provides a high-speed display configuration that is highly efficient and that provides for superior contrast, brightness, resolution, and dynamic range. A flat panel display enabling such a scheme, in accordance with the invention, is compact, durable, easily manufactured, and of reasonable materials and manufacturing costs. These advantages will be highlighted in the relevant discussion to follow.

Figure 3C:
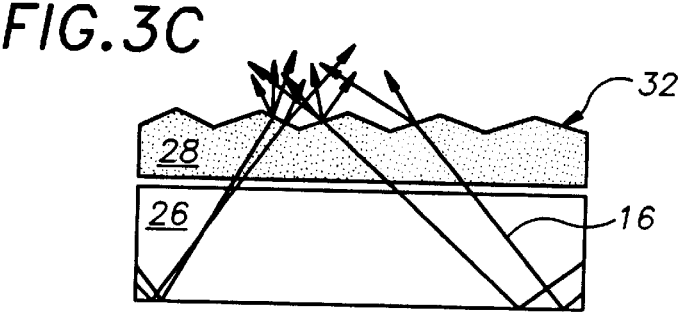
FIG. 3C is a schematic side view of a second example optical switch in accordance with the invention.

In an alternative light release scheme, shown in FIG. 3C, the mechanical light tap is embodied as a transparent suspended beam 28 having a transparent back surface 32 of a geometry that results in forward-scattering, rather than back-scattering, of light impinging the surface. In this case, light 16 that escapes from a mesa 26 in the light storage plate into a light tap 28 in close contact with the mesa propagates through the thickness of the light tap and out the back surface 32 of the tap 28. The surface irregularities of the back surface 32 are preferably of a geometry such that light emerges from that surface and is scattered in a reasonable angle of viewable emergent light.

Considering now the magnitude of movement required of a mechanical light tap to effect a distinct "on" and "off" of display light emerging from the light storage plate, the phenomenon of evanescent light coupling must be evaluated for the mechanical tap geometry. The evanescent light amplitude, $E_e$, of light coupled out of a free surface of a transparent medium containing total-internally-reflected light into an external medium, e.g., air, in which an element of similar refractive index to that of the light source is positioned, is given approximately as:

$$E_e = E_i e^{\alpha z}, \qquad (3)$$

where $E_i$ is the incident light level at the free surface, z is the perpendicular distance, in the air, away from the free surface, defined in FIG. 2, and $\alpha$ is an expression given as:

$$\alpha = (2\pi/\lambda_i) [ \sin^2 \theta_i - (n_e/n_i)^2 ]^{1/2}, \qquad (4)$$

where $\theta_i$, $n_e$, and $n_i$ are given as in FIG. 2 and $\lambda_i$ is the wavelength of light internal to the transparent medium. These expressions indicate that evanescent light coupling decays exponentially at a rate defined by $\alpha$; the expressions ignore the effects of polarization and ignore the effects of the adjacent mechanical tap surface proximity.

For the example described above in which the light storage plate is formed of quartz and the display is operated in air, $n_e=1.00$ and $n_i=1.47$. Given an internal incident light angle of 50° (which accommodates total internal reflection in the quartz plate) and a midband wavelength of light in the plate of, e.g., about 0.55 μm, expression (4) above for a provides a value of $\alpha \approx 5.91/\mu m$. This $\alpha$ value, when used in expression (3) above, indicates that the evanescent light amplitude, $E_e$, is reduced to about 30 dB below the incident light amplitude, $E_i$, at a distance of about 0.58 μm from the surface of the storage plate. In other words, midband evanescent light coupled from the light storage plate into a mechanical light tap located about 0.58 μm from the surface of the storage plate would be reduced by at least about 30 dB below the amplitude of light in the light storage plate.

Accordingly, a reasonable amplitude ratio for the "off" and "on" states of the mechanical light tap is preferably achieved when the mechanical light tap is controlled to be held in the "off" state at the minimum distance sufficient to decouple light below the background light level; in one example, an "off" distance of at least about 0.6 μm is suitable. Any "off" distance greater than the minimum required can result in undesirable effects such as increased actuation force required or decrease in switching speed. As will be understood by those skilled in the art, there are yet other considerations effecting this configuration. For example, the refractive index of the storage plate and the ambient medium in which the mechanical tap is located impacts the degree of evanescent coupling; a medium of higher refractive index than air, e.g., results in a slower decay of coupling with distance and a correspondingly greater required distance for the "off" state. The "off" state position of the mechanical tap is thus selected for a given application based on the characteristics of the tap and storage plate materials as well as characteristics of the surrounding medium. The "off" state position is also selected based on the wavelength of light to be displayed. An on/off coupling contrast of about 32 dB would typically be acceptable for green wavelengths and this gap results in about a 25 dB contrast in the extreme red portion (700 nm) of the visible spectrum.

Mechanical light taps for the flat panel display of the invention are preferably formed of electronic materials, plastics, or other suitable materials that enable the taps to be actuated by electrostatic force or optionally by a combination of electrostatic and mechanical restoring forces. Other suitable actuation schemes are accommodated by the mechanical light tap design and are additionally contemplated by the invention, however. Specific fabrication examples for various actuation schemes will be described below.

Actuation of the flat panel display light taps will be discussed with reference to the forward-scatter scheme like that of FIG. 3C; for many applications this scheme is preferable over a back-scatter scheme in which light emerges through the light storage plate. This can be due, in part, to, e.g., the fact that reflective scattering mechanisms are typically more lossy than forward scattering mechanisms. In addition, the light stored in the light storage plate of the invention is exceedingly intense; in a reflection scatter display scheme, any point defects inside the plate could scatter light toward the viewer and overwhelm the image being produced by the reflection scatter mechanism. In a forward-scatter display scheme, however, the light storage plate can be covered with a black absorbing material in areas except at the location of the contact points, to suppress any such scatter noise.

Figure 4A:
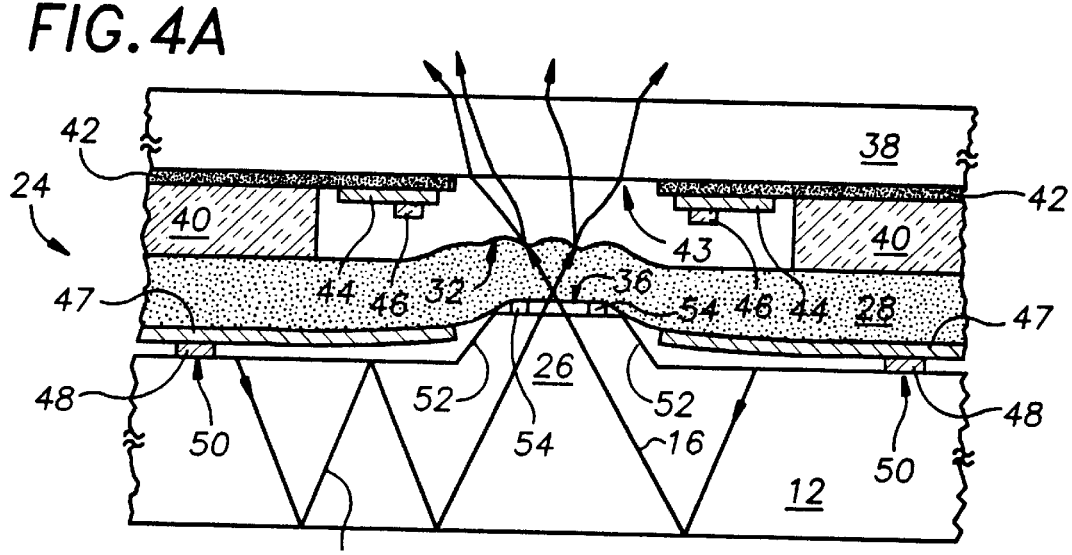
FIGS. 4A–4B are schematic side views of a third example optical switch in accordance with the invention.

Referring to FIG. 4A there is shown an example mechanical tap 24, in accordance with the invention, in which a combination of electrostatic force and mechanical restoring force is employed to move the tap into and out of contact with the light storage plate 12. In an effort to distinguish the various tap components, the figure is not shown to scale. In this first example design, the flat panel display is assembled such that each tap in the display is normally "on," i.e., each tap is normally contacting a corresponding mesa on the light storage plate.

As shown in the figure, the mechanical tap is embodied as a beam 28, and for dual electrostatic/mechanical actuation schemes, the beam is preferably formed of a material characterized by an internal stress, such as a compressive or tensile stress. Silicon (Si), silicon dioxide ($SiO_2$) or other oxides, silicon nitride ($Si_{(x-1)}N_x$), plastics, polymers, foils, or other suitable materials can be employed as the mechanical tap beam. The beam material is preferably characterized by a refractive index equal to or greater than that of the light storage plate 12 and is characterized by a reasonable level of transparency over a propagating distance of tens of microns for wavelengths of interest. As mentioned previously, the tap surface 32 on a side of the tap opposite the top surface 34 of the storage plate mesa 26 preferably exhibits a geometry for forward-scattering light that impinges that surface 34.

Based on a consideration of an "off" state tap distance from the light storage plate in the range of between about 0.5 $\mu$m and 1.0 $\mu$m, example geometric ranges will be discussed for the tap configuration. It must be realized, however, that these are provided as example only and that other tap geometries are contemplated by the invention. In this example case, the tensile tap beam 28, of about 0.1 to 1 $\mu$m in thickness, is fixed to a transparent viewing substrate 38 opposite the light storage plate by supports 40, formed of, e.g., silicon dioxide or other material, which is preferably an insulating material. The supports can additionally be coated with a protective material, preferably insulating, such as silicon nitride (not shown) for fabrication flexibility, as discussed below.

The viewing substrate, in addition to enabling a customizable display viewing surface, also protects the tap 28 from the ambient environment. The viewing substrate can be formed of, e.g., plastics, quartz, or other clear glass, or other suitable material. Preferably, the viewing substrate robustly withstands fabrication environments, exhibits a degree of thermal expansion comparable to that of the storage plate, and exhibits good transparency for a propagation distance of at least about 1 cm. For example, quartz is a suitable viewing substrate material for silicon nitride tap beams and plastic is a suitable viewing substrate material for plastic tap beams. The lower surface of the viewing substrate 38 is coated with a dark optical-absorbing layer 42 that suppresses back-reflection of light from the viewing volume, as well as stray light within the viewing substrate, from the storage plate, and from the micromechanical tap elements, by absorbing that light. A window 43 in the optical absorbing layer 42 is aligned with the lateral position of the light emitting surface 32 of the mechanical tap beam 28.

The optical absorbing layer 42 consists of, e.g., a conducting metal layer or a metal coating, such as a titanium/platinum layer of about 0.3 $\mu$m in thickness. Alternatively, an optical coating such as CrO can be employed. In the case of a metal absorption layer, the layer can be patterned to form line electrodes for actuating the mechanical tap in accordance with an actuation control scheme described below. In the case of a non-conducting absorption layer 40, line electrodes 44 are located on the lower side of the absorption layer. Like the absorption layer, such electrodes consist of, e.g., about a 0.3 $\mu$m-thick titanium/platinum layer, or other suitable conducting material.

One or more viewing substrate stand-offs 46 are preferably located on the lower side of the line electrodes 44 to space the tap beam 28 from the electrodes when the beam flexes toward the electrodes, as explained below. The viewing substrate stand-offs 46 are formed of, e.g., silicon dioxide, silicon nitride, a plastic, a polymer, a glass, metal, or other suitable material, and preferably are of a thickness in the range of hundreds of angstroms. Even with such small height, the stand-offs act to suppress contact forces such as Van der Waals "stiction" forces that could develop between the relatively smooth upper tap beam surface outside of the scatter region and the line electrodes 44 if the two surfaces were intimately contacted. The viewing substrate stand-offs prevent extended intimate contact of the surfaces to thereby reduce the likelihood that strong "stiction" forces develop.

Column electrodes 47 are provided on the tap beam 28 on a side opposite that of the viewing substrate stand offs 46 and line electrodes 44. The column electrodes are also suitably formed of, e.g., about a 0.3 $\mu$m-thick titanium/platinum layer, or other suitable conducting material.

In the normally "on" light tap configuration as illustrated, the light storage plate 12 includes spacers 48, formed of, e.g., silicon dioxide or other material such as those given above for the stand-offs, that preferably are of a thickness less than the height of the storage plate mesa 26. For example, for a storage plate mesa of about 10 $\mu$m in height, spacers 48 are suitably no more than about 8 $\mu$m in height. Preferably, the underside 50 of the spacers 48 are coated with a reflective layer so that light impinging an internal surface of the storage plate 12 at the location of the spacers is reflected back into the storage plate; for some spacer materials the condition of total internal reflection may not be met at the storage plate-spacer interface. A coating of, e.g., silver, of about 100 nm in thickness is suitable as such a reflecting layer. The sidewalls 52 of the storage plate mesa are also preferably coated with a reflective layer. Here the reflective layers are employed to ensure that light escapes only through the top surface 34 of the mesa; such light is scattered by the upper surface 32 of the beam within a range of angles that results in a reasonable viewing volume relatively perpendicular to the viewing substrate 38.

The display is assembled in the normally "on" condition by pressing the light storage plate 12 together with the viewing substrate 38; details of this procedure are discussed below. Intimate contact of the storage plate with the tap beam causes the tap beam 28, which is preferably tensile, to bend and make positive contact with the top surface 34 of the mesa 26 because the mesa is of a higher topology than the storage plate spacers 48. When light 16 is injected in the storage plate 12, it can escape conditions of total internal reflection at the location of the mesa 26, where the light is coupled into the contacted tap beam 28 and propagates through it. Upon reaching the back surface 32 of the tap the light is forward-scattered in the direction of the viewing substrate. The scattered light then couples with the viewing substrate 38, though which it propagates and emerges into a viewing volume.

Figure 4B:
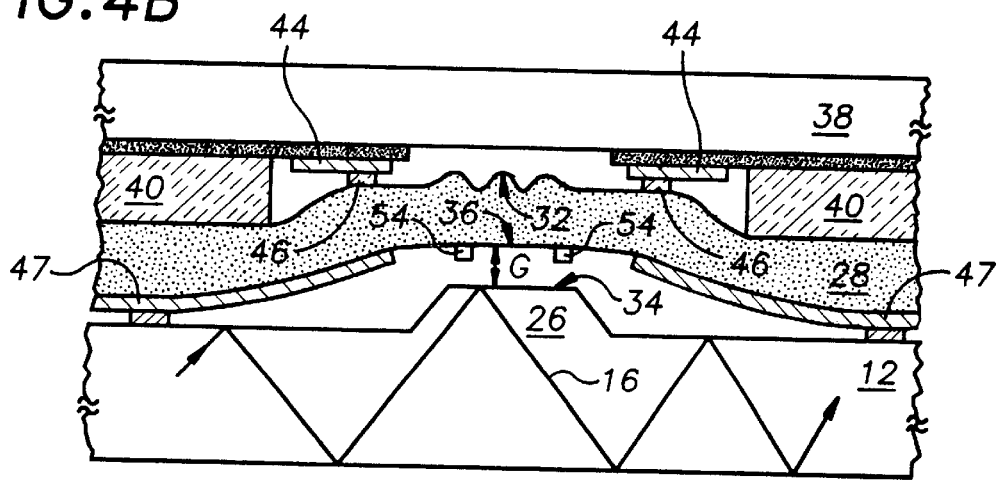

Referring now also to FIG. 4B, this "on" state is negated by way of electrostatic actuation. Application of an appropriate potential difference between the line electrodes 44 and the column electrodes 47 induces attractive electric charge configurations (not shown) on the electrodes, resulting in positive attraction of the flexible tap beam 28 and column electrodes 47 to the fixed viewing substrate and line electrodes 44. This positive attraction affects a flexing upward of the tap beam, whereby the tap beam moves into contact with the viewing substrate stand-offs 46.

In this arrangement, a gap, G, is introduced between the lower surface 32 of the tap beam 28 and the upper surface 34 of storage plate mesa 26. The gap is preferably of at least, e.g., between about 0.5 $\mu$m and 1.0 $\mu$m such that light in the storage plate is negligibly evanescently coupled into the tap beam 28. As explained in detail below, once the tap beam 28 moves into contact with the stand-offs 46 on the viewing substrate, the voltage required between the line and column electrodes to maintain this tap beam position is less than that required to actuate the tap beam; this is due to the fact that the electrostatic force between the electrodes increases greatly as the gap between the electrodes is reduced.

Actuation of the tap beam 28 to again "turn on" the tap is achieved by way of the mechanical restoring force inherent in the tensile state of the beam. Removal of the attractive potential condition between the column and line electrodes allows the tap beam to "snap" back to its resting position in contact with the top surface 34 of the storage plate mesa 26. Having moved back into contact with the mesa, the tap beam again couples light out of the storage plate and through the viewing substrate 38 into the viewing volume. This combination electrostatic-mechanical actuation scheme provides a bistable switch response that facilitates column and line control of a matrix of mechanical taps, as explained below.

Illustrated in FIG. 4B are tap beam stand-offs 54, formed of, e.g., the tap beam material, that hold the lower surface 36 of the tap beam 28 very slightly out of intimate contact with the top surface 34 of the mesa 26 when the tap beam moves to close the gap between the tap beam and the mesa. The stand-offs are preferably of a very small height, e.g., about 200 Å. Even with such small height, the stand-offs act to suppress contact forces such as Van der Waals "stiction" forces that could develop between the relatively smooth lower tap beam surface 36 and upper mesa surface 34 if the two surfaces were intimately contacted across their entire extent. A matrix of tap beam stand-offs distributed across the lower tap beam surface prevents extended intimate contact of the surfaces to thereby reduce the likelihood that strong "stiction" forces develop. The standoffs are preferably of such a small height, however, that they do not substantially impact the efficiency of light coupling between the mesa top surface and the tap beam lower surface when the two surfaces are brought together. Thus, the tap beam is said to be "in contact" with the light storage plate when it is in a position that enables coupling of light out of the light storage plate even though the beam and light storage plate may be slightly separated by the stand-offs.

Figure 4C:
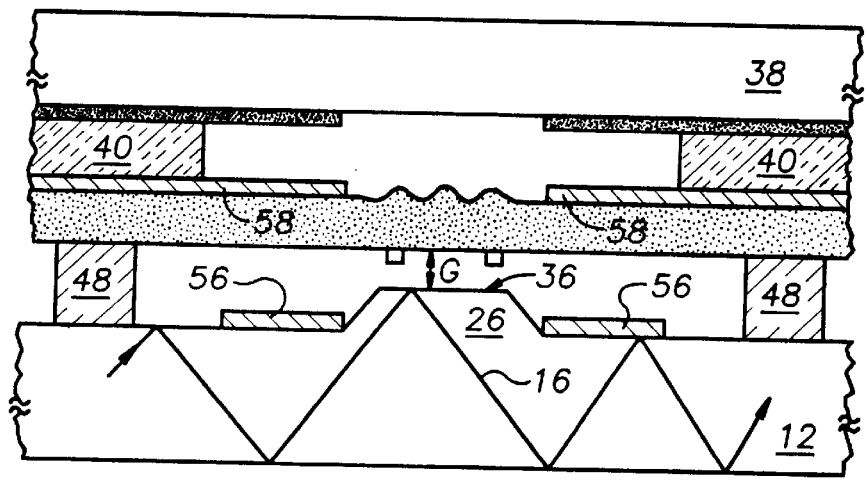
FIGS. 4C–4D are schematic side views of a fourth example optical switch in accordance with the invention.
Figure 4D:
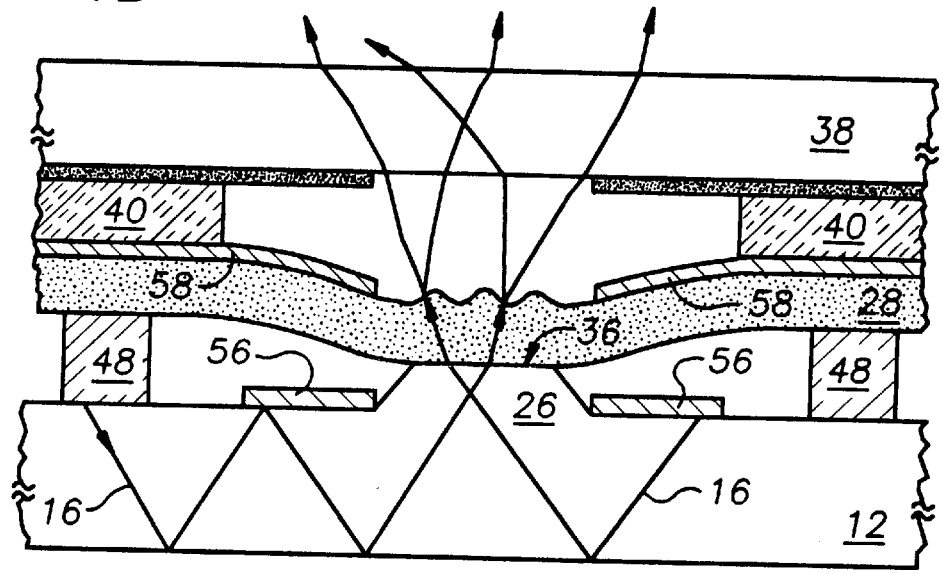

Referring now to FIGS. 4C–4D, a second example mechanical light tap actuation scheme provides a normally "off" light tap configuration. Here, the light storage plate mesa 26 is of a height less than that of spacers 48 on the light storage plate 12. Adjacent to the spacers 48 are line electrodes 56. Corresponding column electrodes 58 are located on the upper surface of the mechanical tap beam 28. The mechanical tap beam, spacers, and electrodes can here be formed of the same materials described above in connection with the normally "on" light tap configuration.

In the normally "off" configuration, the tensile nature of the mechanical tap beam maintains the beam spaced apart from the upper surface 36 of the storage plate mesa 26 due to the increased height of the spacers 48 above the mesa. A gap, G, of about, e.g., 0.7 $\mu$m between the tap beam and the top surface 36 of the mesa disallows coupling of light from the storage plate to the tap beam and upper viewing substrate 38, whereby negligible storage plate light is viewed in the vicinity of the mesa.

Application of an appropriate potential difference between the line electrodes 56 and the column electrodes 58 induces attractive electric charge configurations (not shown) on the electrodes, resulting in positive attraction of the flexible tap beam 28 to the light storage plate and line electrodes 56. This positive attraction affects a flexing downward of the tap beam, whereby the tap beam moves into contact with the top surface 36 of the storage plate mesa 26.

As shown in FIG. 4D, this contact "turns on" the mechanical light tap, whereby light is coupled out of the light storage plate mesa through the contacting mechanical tap beam, and from there through the viewing substrate 38 into a viewing volume from a point corresponding laterally to the location of the mesa. Upon removal of the attractive electrode potentials, the tensile mechanical tap beam snaps upward to return to its normal resting position in which a gap, G, separates the tap beam from the top surface of the light storage plate mesa. Hence, in contrast to the normally "on" configuration, the display element here requires application of a potential to initiate viewing of light.

Figure 4E:
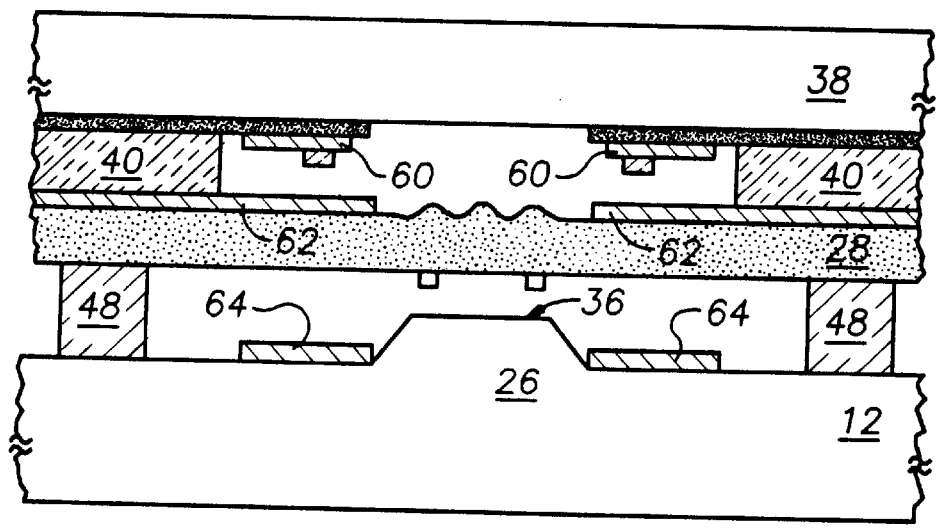
FIG. 4E is a schematic side view of a fifth example optical switch in accordance with the invention.

In yet another example of a mechanical light tap configuration, as shown in FIG. 4E, the height of the light storage plate mesa 26 is here less than that of spacers 48 separating the mechanical tap beam and the light storage plate 12. Electrodes 60, 62, 64 are provided on the viewing substrate 38, upper surface of the tap beam 28, and the light storage plate 12, respectively, for actuating the tap beam in a tri-electrode scenario. In this case the light tap is maintained out of contact with the light storage plate at an intermediate point, e.g., half-way, between the light storage plate mesa and the viewing substrate, when the potential difference between the mechanical tap beam and the light storage plate is about the same as the potential difference between the mechanical tap beam and the viewing substrate.

Application of an appropriate voltage between the tap beam electrodes 62 and the light storage plate electrodes 64 results in deflection of the tap beam toward the upper surface of the mesa 26 and contact of that surface, whereby light is coupled out of the light storage plate and into a viewing volume of the viewing substrate 38. A combination of mechanical and electrostatic forces can then be employed to draw the tap beam upward and out of contact with the mesa by way of application of an appropriate voltage between the viewing substrate electrodes 60 and the tap beam electrodes 62. In this three-electrode configuration, electrostatic force alone can be employed for actuating the mechanical tap beam; that is, a mechanical restoring force provided by, e.g., a tensile internal stress condition of the tap beam is not needed. Instead, electrostatic attractive force alone can be employed for moving the tap beam in either direction.

Figure 5:
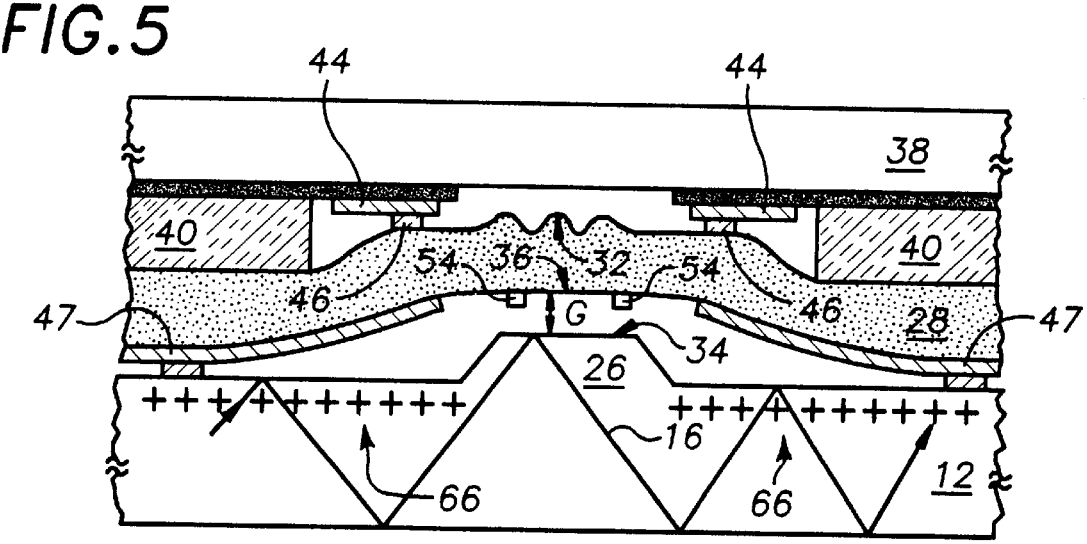
FIG. 5 is a schematic side view of a sixth example optical switch in accordance with the invention.

Many variations of the mechanical tap beam actuation schemes described above are contemplated by the invention. For example, as shown in FIG. 5, an electret configuration can be employed for producing electrostatic actuation. Here a layer of excess charge 66 is embedded in the upper surface of the light storage plate. As explained in detail below, such a charge layer can be produced by, e.g., ion-implantation of a light storage plate material such as a transparent form of teflon or an oxide such as silicon dioxide. In, e.g., a normally "on" geometry, the embedded electret produces corresponding attractive image charge in the tap beam electrode 47, resulting in a constant electrostatic downward force on the tap beam, holding the beam in contact with the top surface 34 of the light storage plate mesa 26. This force is relatively independent of the gap between the electret 66 and the beam electrode 47. Placement of a sufficiently large potential difference between the tap beam electrodes 47 and the viewing substrate electrodes 44 counteracts this static force and causes the tap beam to flex upward against the viewing substrate stand-offs 46, thereby "turning off" the display tap, as shown in the figure. Upon removal of the potential difference, the attractive electret force again causes deflection of the tap beam downward and into contact with the storage plate mesa.

The static, attractive electret force generation mechanism thereby presents itself as an alternative to the mechanical force generation mechanism of the static tensile tap beam condition described above. Both schemes provide a bistable actuation scenario, but do so with different static force generation schemes. Thus, a configuration including an electret can employ a tap beam material that is not necessarily under tensile stress. Polystyrene and silicon nitride with low tensile stress are examples of suitable materials. As will be understood by those skilled in the art, each scheme has specific advantages that may render that scheme superior for various applications. For example, because the turn-on and turn-off forces of the electret configuration are proportional to the embedded charge density, $q^2$, and are independent of the internal stress, T, of the mechanical tap beam, the electret scheme is not constrained to specific tap material conditions and accordingly, a wider range of materials can be considered for the electret scheme.

Considering other variations of the tap actuation scheme, the mechanical tap beam can be actuated based on a static internal compressive, rather than tensile, stress condition. In this case the tap beam exhibits a constant tendency to bow out of plane. As will be understood based on the previous discussion of actuation of a tensile beam, such a compressive beam could be configured in either a normally "on" or normally "off" scheme depending on the relative heights of the light storage plate mesa and the spacers separating the mechanical tap beam from the light storage plate and the viewing substrate. Electrode configurations can be employed on the tap beam, viewing substrate, and/or light storage plate to produce a desired electrostatic force generation mechanism in concert with the mechanical restoring force produced by the compressive tap beam condition.

For any of the various actuation schemes contemplated by the invention, light trapped in the light storage plate can be released and viewed through the light storage plate itself, the mechanical light tap beam, a transparent viewing substrate adjacent the mechanical light tap beam, or other suitable viewing surface. In a configuration in which a transparent viewing substrate is employed, it is preferable that the upper surface of the mechanical tap beam and the surface of the viewing substrate adjacent the mechanical tap beam be processed to optimize both coupling of light between the tap beam and the viewing substrate and scattering of light into a reasonably wide viewing angle through the viewing substrate.

Figure 6A:
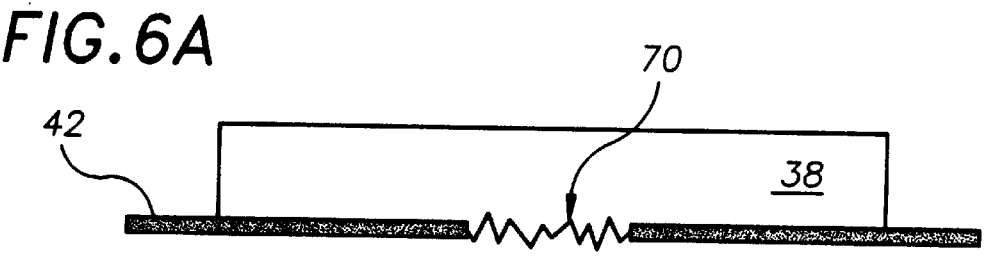
FIG. 6A is a schematic side view of a mechanical tap employed in the optical switches of FIGS. 4A–4E and FIG. 5 and having a Lambertian scattering surface in accordance with the invention.

In the configurations described above (FIGS. 4–5), the lower surface 43 of the viewing substrate 38 is smooth and flat. Alternatively, as shown in FIG. 6A, the region 70 of the viewing substrate that laterally corresponds to the location of the roughened region 32 of the beam 28 can also include geometric asperities. With this configuration, both the upper surface 32 of the mechanical tap and the lower surface 70 of the viewing substrate can provide a geometric optical scattering surface; this increases the spreading angle of the emitted light. In any of the these cases, it is preferable that the optical scattering surface be optimized for Lambertian scattering properties.

Without an effective scattering mechanism, light coupled through the mechanical tap and into a viewing volume may likely enter the viewing volume at angles quite obtuse from a direction perpendicular to the display. In other words, light exiting the display may likely be directed outward at angles close to the display surface if it is not first scattered, whereby a viewer could see the exiting light only at locations away from a direction perpendicular to the display. But as a practical matter, the most preferred position for viewing a display is indeed typically centered around a direction perpendicular to the display surface, and accordingly, only about 2 steradian of light within the vertical (and horizontal) angular spread of light emitted into a viewing volume is useful.

In the invention, a scatter mechanism, and preferably one that achieves Lambertian scattering, ensures that the arc of viewing angles of light exiting the display is generally around a direction perpendicular to the display surface at the location of the point at which light exits the display surface. A wide range of scattering mechanisms is contemplated by the invention. Beyond roughening of the tap beam and/or viewing substrate surface, any surface perturbation, e.g., a periodic or aperiodic grating, faceted pattern, or other geometric perturbation, can be employed as a scattering mechanism. Alternatively, a surface coating or other layer that provides scattering functionality can be located on the tap beam and the viewing substrate surfaces. In yet another alternative, a separate scattering medium such as a scatter beam element can be positioned atop the tap beam. The tap beam can alternatively be itself formed of a material that facilitates scattering; for example, the tap beam can be formed of a translucent material. As will be recognized by those skilled in the art, other scattering mechanisms are also suitable. A specific scatter mechanism or medium is not required by the invention, rather, it is the ability to effectively scatter light in the light tap beam that is preferably provided by a selected mechanism.

Figure 6B:
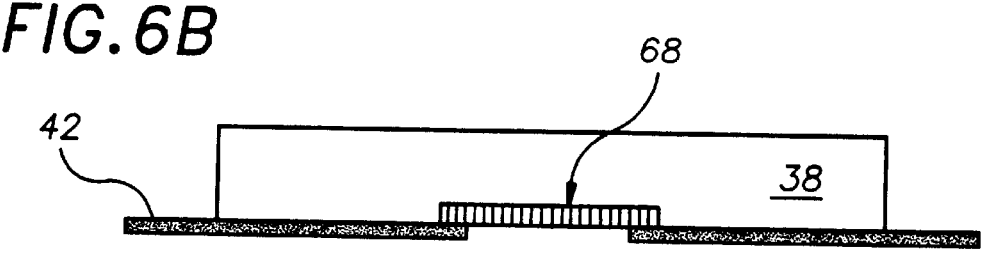
FIG. 6B is a schematic side view of a mechanical tap employed in the optical switches of FIGS. 4A–4E and FIG. 5 and having a color surface in accordance with the invention.

Considering yet another alternative of the mechanical tap configuration, as shown in FIG. 6B, the viewing substrate can include a color layer 68 located in a lateral position that corresponds to the location of the light storage plate mesa. Suitable dyes that filter, e.g., red, green, or blue wavelength components of white light trapped in and released from the light storage plate are here impregnated in the lower surface of the viewing substrate. In an alternative scheme, the color layer 68 includes one or more luminescent materials that each emit a selected color or colors when the luminescent material is excited by ultraviolet light trapped in and released from the light storage plate. Examples of suitable luminescent materials are described in *Luminescence of Solids*, by H. W. Lewrenz, Dover, 1968.

The invention is not limited to the variations in actuation mechanisms or mechanical tap configurations described above. Rather, the invention contemplates any mechanical tap scheme that suitably provides the ability to actuate a mechanical tap for making contact to a light storage plate to release light from the plate into distinct viewing locations. Preferably, the actuation mechanism achieves a stable mechanical response to the actuation force that exhibits, e.g., bistability. Cantilever beams, beams supported by two or more supports, plates, diaphragms, and other such mechanical structures are examples of alternative tap configurations contemplated by the invention. Materials under compressive stress, rather than tensile stress, or under no internal stress, are also suitable with corresponding actuation schemes.

Whatever geometry the tap element takes, it can itself provide a raised contact surface such as a mesa in addition to or instead of that provided by the light storage plate. In one such configuration, the light storage plate is smooth and each tap element includes a mesa protrusion on its lower surface for contacting the light storage plate. The height of the mesa is selected to produce a desired assembly configuration for a normally on or normally off actuation scheme. Alternatively, but not preferably for many cases, neither the tap element nor the light storage plate may provide a raised contact surface.

Of the example actuation mechanisms discussed above, those employing a combination of electrostatic and mechanical restoring forces provide bistability, which may be preferable for some applications. The force required to "turn on" the mechanical tap in the case of a normally "off" configuration (FIGS. 4C–4D) and the force required to "turn off" the mechanical tap in the case of a normally "on" configuration (FIGS. 4A–4B) is proportional to the voltage applied between the mechanical tap beam electrode and either the light storage plate electrode or the viewing substrate electrode for producing a potential difference between those electrodes, and the extent of the gap between the mechanical tap beam and the respective electrode toward which the tap beam is being actuated. This electrostatic force, $F_e$, is given as:

$$F_e \approx (\epsilon_0/2) w L (V/(x+d/\epsilon_r))^2, \tag{5}$$

where $\epsilon_0$ is the free-space dielectric constant, w is the width of the mechanical tap beam, L is the length of the mechanical tap beam suspension between the supports, V is the voltage applied between the tap beam and the other actuating electrode, x is the gap between the mechanical tap beam and the actuating electrode, d is the thickness of the tap beam, and $\epsilon_r$ is the relative dielectric constant of the tap beam.

The transverse mechanical restoring force, $F_m$, that inherently acts to actuate the mechanical tap beam in the opposite direction is given by:

$$F_m \approx -4T(wd/L)y \tag{6}$$

where T is the internal tensile stress of the tap beam, and y is the displacement of the tap beam from its resting (taut) position.

To effectively move the mechanical tap beam through the total gap distance G in opposition to the inherent mechanical restoring force, the electrostatic force must be produced by a voltage, V, of sufficient magnitude to overcome the mechanical restoring force. Given that such a voltage is employed, expressions (5) and (6) above provide an indication of the force to which the mechanical tap beam must subjected to switch between the "on" condition and "off" condition.

Expressions for estimating the switching time are highly nonlinear, and a numerical technique is used to solve for convergent switching time value. One approach for estimating the closure switching time of the mechanical elements shown in FIGS. 4C and 4D is as follows. Given that an increment of distance through which a tap beam moves is D=G/N, where G is the extent of the tap beam gap and N is a large number, e.g., greater than 10, and given that n=1, 2, 3, . . . , i−1, N−1, N; then, for the $i^{th}$ increment, $x_i$=G−i×D and $y_i$=i×D. Then expression for time duration is given as:

$$\Delta t_i = \left[ \left( \frac{v_{i-1}}{a_i} \right)^2 + \frac{2D}{a_i} \right]^{\frac{1}{2}} - \frac{v_{i-1}}{a_i}, \tag{7}$$

with $$a_i = (F_e(x_i) + F_m(y_i))/\rho w h d,$$

and $$v_i = v_{i-1} + a_i \Delta t_i,$$

where $\rho$ is the density of the mechanical tap beam material. The time required to close a tap beam switch is then given as:

$$t = \sum_{n=1}^{N} \Delta t_n. \tag{8}$$

Considering the actuation speed of an example mechanical tap beam configuration in which the tap beam is formed of highly-stressed silicon nitride, e.g., as a LPCVD layer of nitride, expressions (7) and (8) above indicate that the electrostatically-actuated closing of the tap beam relative to the light storage plate is achieved in about 230 nanoseconds. A similar computation can be made to estimate the time needed to open the tap beam switch shown in FIGS. 4C and 4D by substituting for expressions $y_i$ and $\alpha_i$, in expressions (7) and (8) above, $y_i'=G-i\times D$, and $\alpha_i'=-F_m(y_i')/\rho wLd$, respectively. In this case, the applied voltage, V, is set to zero, because the mechanical restoring force alone provides the tap beam actuation. These substitutions provide an estimation that the mechanically-actuated opening of the tap beam is achieved in about 240 nanoseconds.

The closing and opening switch time computations assume a silicon nitride stress condition, T, of about $1\times10^9 N/m^2$, a silicon nitride density, $\rho$, of about 2700 $Kg/m^3$, a dielectric tap beam thickness, d, of about 0.1 $\mu$m and dielectric constant, $\epsilon_r$, of about 8, a tap beam suspension length, L, of about 180 $\mu$m, a gap, G, of about 0.7 $\mu$m, and an electrostatic actuation voltage, V, of about 25 volts during the actuation time. The computation does not explicitly take into account stiffness and curvature of the mechanical tap beam as the beam flexes, e.g., against the top surface of the light storage plate mesa; does not explicitly take into account pneumatic forces, the mass of the electrodes on the tap beam, or the mass of a light-scattering medium, layer, or surface on the tap beam. Even without such considerations, however, the sub-microsecond speed indicated by the computation points out that a very high-speed display can be realized using a matrix of such mechanical tap beam elements, as discussed in detail below.

Figure 7:
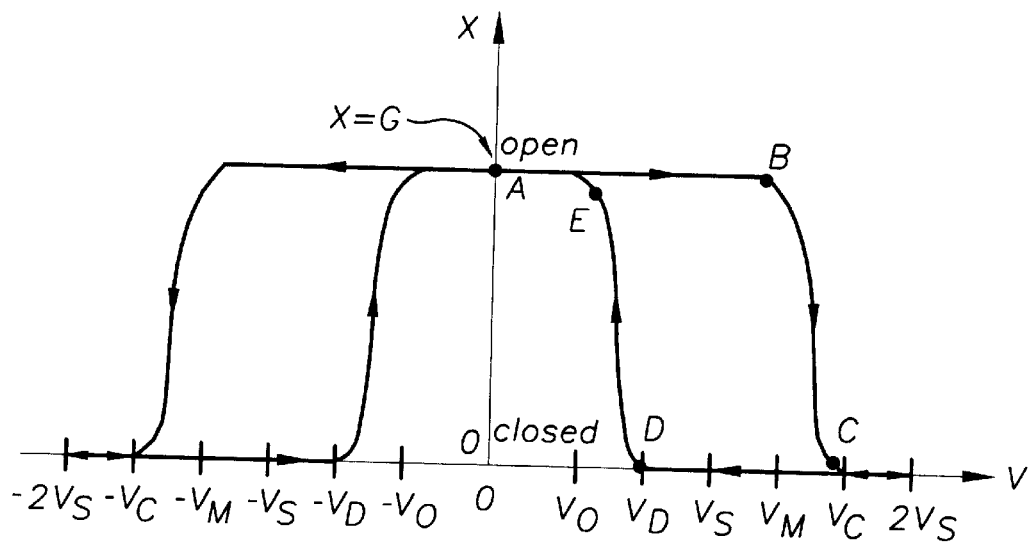
FIG. 7 is a plot of optical mechanical switch position as a function of applied potential difference for a mechanical tap control scheme in accordance with the invention.

The actuation response of the mechanical tap beam to a combination electrostatic/mechanical actuation scheme is bistable, as mentioned above, and this bistability, in combination with the proximity effect inherent in electrostatic actuation, results in a predictable actuation hysterisis function. FIG. 7 illustrates this actuation hysterisis function for the example case of FIGS. 4C–4D in which the mechanical light tap is configured in a normally "off" scheme. The dynamic distance between the mechanical tap beam and the top surface of the light storage plate mesa is given as x, where x is equal to G, the full extent of the gap, when the tap is fully open. The potential difference applied between the mechanical tap electrodes and the light storage plate electrodes is given as V, where V can be a positive or negative voltage; due to the polarity-independent attractive charge formation mechanism inherent in electrostatic actuation, the applied voltage can be of either a positive or negative polarity.

When the applied potential difference, V, is zero, the tension in the mechanical tap beam maintains the beam in the "open" position, where x=G, indicated by point "A" in FIG. 7. The mechanical tap beam continues to maintain this position when a positive polarity potential difference is applied, until the applied potential difference exceeds a threshold voltage, $V_m$, defined as that voltage which produces an electrostatic force equal to the inherent mechanical restoring force of the tap beam. At applied potential differences greater than $V_m$, the mechanical tap beam experiences a larger electrostatic force than mechanical restoring force and tends to move toward the light storage plate, indicated by point "B" in the figure.

Once a potential difference equal to or greater than a closure voltage, $V_c$, is applied, the tap beam experiences an electrostatic force adequate for actuating the beam completely through the gap, G, whereby the tap is in the "closed" position, indicated by point "C" in the figure, and for which light is coupled out of the light storage plate and into a viewing volume. The magnitude of the applied potential difference does not thereafter need to be increased beyond than the closure voltage magnitude because the closure voltage magnitude is sufficient for moving the tap beam completely across the gap G.

Based on the expression for electrostatic force, $F_e$, given above in expression (5), it is understood that as the tap beam moves closer to the actuating electrode, the tap beam experiences a stronger electrostatic force; this is reflected in the inverse relationship between $F_e$ and x in expression (5). Once the tap beam is separated from the light storage plate mesa only by the very tiny stand-offs on the lower surface of the tap beam (54 in FIG. 4B), the electrostatic force is quite strong due to the proximity effect, which embodies the inverse relationship between electrostatic force and distance. As a result, the tap beam remains in the "closed" position even when the applied voltage magnitude is decreased below the closure voltage, $V_c$. This fortuitous condition enables a display scheme in which the applied voltage required to hold a given tap beam closed is much less than the voltage required to first close the beam, and results in a reduced power requirement over typical display schemes, as discussed below.

Once the applied potential difference magnitude is decreased below the threshold voltage, $V_m$, corresponding to an electrostatic force equal to the mechanical restoring force of the mechanical tap beam, and is decreased further to a closure voltage threshold, $V_D$, the mechanical restoring force again dominates the electrostatic force, and the tap beam moves back toward the "open" position, as indicated by point "D" in FIG. 7. Thereafter, any applied potential difference magnitude equal to or less than an open voltage, $V_o$, results in "snapping" of the tap beam back to its rest position away from the light storage plate mesa, as indicated by point "E" in FIG. 7.

With this actuation response, the mechanical tap beam is seen to exhibit a bistable hysterisis response of either "open" or "closed" conditions, wherein 1) an applied potential difference magnitude of at least $V_c$ closes the tap and holds the tap closed; 2) an applied potential difference magnitude of less than $V_o$ opens the tap and maintains the tap open; 3) an applied potential difference magnitude between $V_o$ and $V_c$ maintains the tap in the open position if the tap's most recent actuation was opening; and 4) an applied potential difference magnitude between $V_o$ and $V_c$ maintains the tap in the closed position if the tap's most recent actuation was closing. This hysteresis response is polarity-independent, as explained above, and as is illustrated in the left half of FIG. 7.

A similar hysteresis actuation response is provided by a three-electrode tap scheme like that shown in FIG. 4E wherein an electrode is provided on all of the tap beam, the light storage plate, and the viewing substrate. In this case, no mechanical restoring force is employed; only electrostatic force actuates the tap beam. Here, the force, $F_u$, on the tap beam when in the "off" up position, and the force, $F_D$, on the tap beam when in the "on" down position, are given as, respectively:

$$F_u \propto \left(\frac{V_u}{x}\right)^2 ; \quad F_D \propto \left(\frac{V_D}{y+\frac{d}{\epsilon_r}}\right)^2, \tag{9}$$

where $V_u$ is the potential difference between the viewing substrate and tap beam electrodes (60 and 62, respectively, in FIG. 4E), $V_D$ is the potential difference between the tap beam and storage plate electrodes (62 and 64, respectively, in FIG. 4E), x is the gap between the tap beam and viewing substrate electrodes at any given time, and y is the gap between the tap beam and storage plate electrodes at any given time.

In one example 3-electrode actuation scheme, a constant potential, i.e., DC voltage, $V_u$, is maintained between the tap beam and viewing substrate and the potential between the tap beam and storage plate, $V_D$, is changed. In this case, given that the tap beam is initialized in the "off" up position, the tap beam will remain in that position until the applied voltage between the tap beam and storage plate electrodes produces a potential difference between those electrodes, $V_D$, that exceeds a closure actuation voltage, $V_C$. Thereafter, the tap beam closes and remains in the "on" down position until the applied voltage between the tap beam and storage plate electrodes produces a potential difference between those electrodes that falls below an opening potential difference, $V_o$. The closure potential difference, $V_C$, and the opening potential difference, $V_o$, are given as:

$$V_c \geq V_u \left( \frac{y_{max} + \frac{d}{\epsilon_r}}{x_{min}} \right) \quad V_o \leq V_u \left( \frac{y_{min} + \frac{d}{\epsilon_r}}{x_{max}} \right), \tag{10}$$

where $y_{min}$, $y_{max}$, $x_{min}$, and $x_{max}$ are the minimum and maximum separations between the tap beam and the storage plate and viewing substrate, respectively. As will be recognized by those skilled in the art, a DC potential might alternatively be applied between the tap beam and the light storage plate rather than the viewing substrate. In either case, it may be preferable in some applications to periodically reverse the polarity of the DC potential and the corresponding actuation potential to suppress electronic charge build up on the tap beam. Such charge build up could result in a strong electrostatic force that swamps out that produced by the applied voltages.

A hysteretic actuation response is also achieved by a tap scheme in which, as shown in FIG. 5, electrodes are provided on the tap beam and, e.g., the viewing substrate and an electret is provided in, e.g., the light storage plate. Here again no mechanical restoring force is required to actuate the tap beam. In this case, the downward force, $F_D$, on the tap beam, is a function of the electret charge density, D; and the upward force, $F_u$, is a function of the potential difference, $V_u$, between the tap and viewing substrate electrodes. These forces are given as, respectively:

$$F_D \propto D^2; \quad F_u \propto \left( \frac{V_u}{x + \frac{d}{\epsilon_r}} \right)^2, \tag{11}$$

where x is the distance between the viewing substrate electrode and the tap beam.

In one example 2-electrode/electret actuation scheme, the potential difference $V_u$, between the tap and viewing substrate electrodes is changed to actuate the beam. Given that the tap beam is initialized in the "on" down position, the tap beam will remain in that position until the applied voltage between the tap beam and viewing substrate electrodes equals or exceeds an opening potential difference, $V_o$. This causes the tap beam to move up to the "off" position, where it remains until the potential difference $V_u$, between the tap and viewing substrate electrodes is decreased below a closure potential difference, $V_c$. The closure potential difference, $V_C$, and the opening potential difference, $V_o$, are given as:

$$V_o \geq D(x_{max} + d/\epsilon_r); \quad V_c \leq D(x_{min} + d/\epsilon_r), \tag{12}$$

where $x_{min}$ and $x_{max}$ are the minimum and maximum separations between the viewing substrate electrodes and the tap beam. As will be understood by those skilled in the art, other hysteretic actuation schemes can be employed with a 2-electrode, 3-electrode, electret, or other electrostatic actuation scheme. If bistable, hysteretic response is not required, a wide range of electrostatic actuation control techniques can alternatively be employed. The electromechanical optical switch of the invention does not require a specific control scheme, but instead contemplates a wide range of control schemes that employ electrostatic force at least in part for actuation of a mechanical tap structure.

Figure 8A:
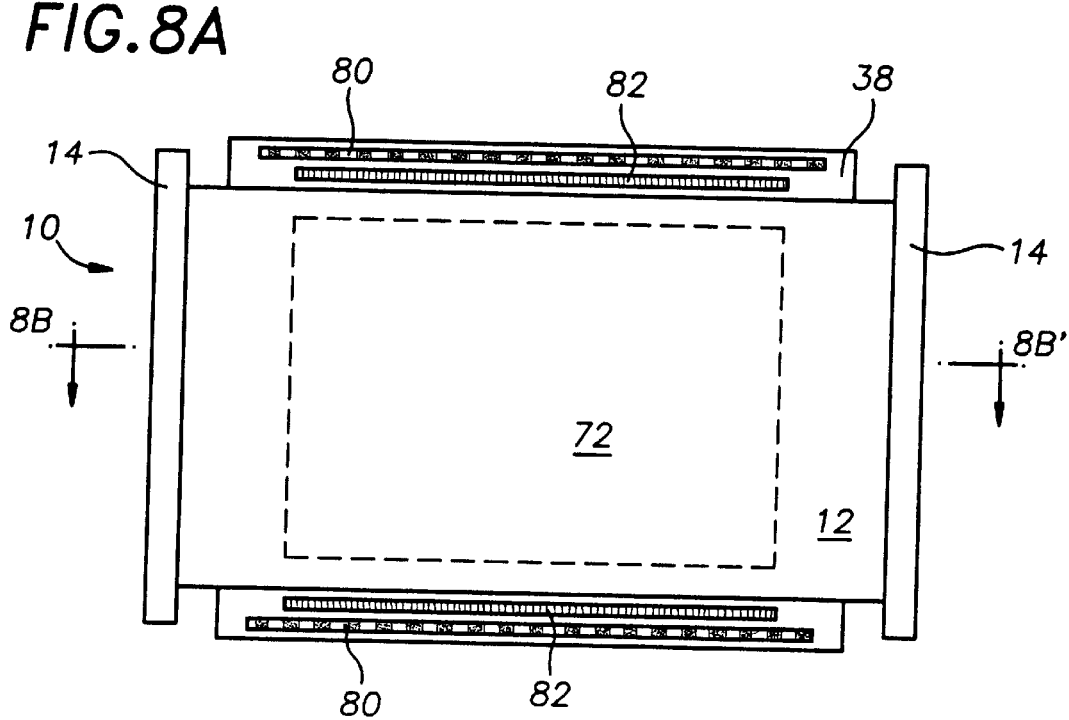
FIG. 8A is a schematic back-side view of a flat panel display in accordance with the invention.
Figure 8B:
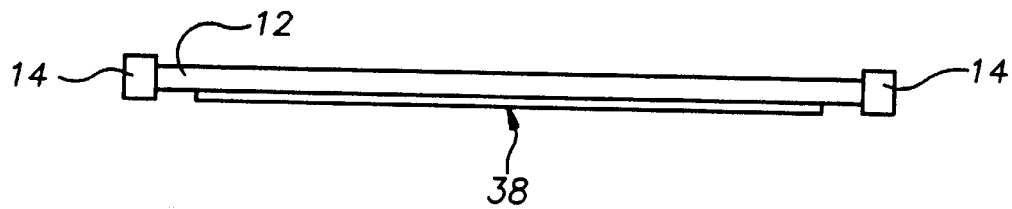
FIG. 8B is a schematic cross sectional view of the flat panel display of FIG. 8A taken through the line 8B–8B'.
Figure 8C:
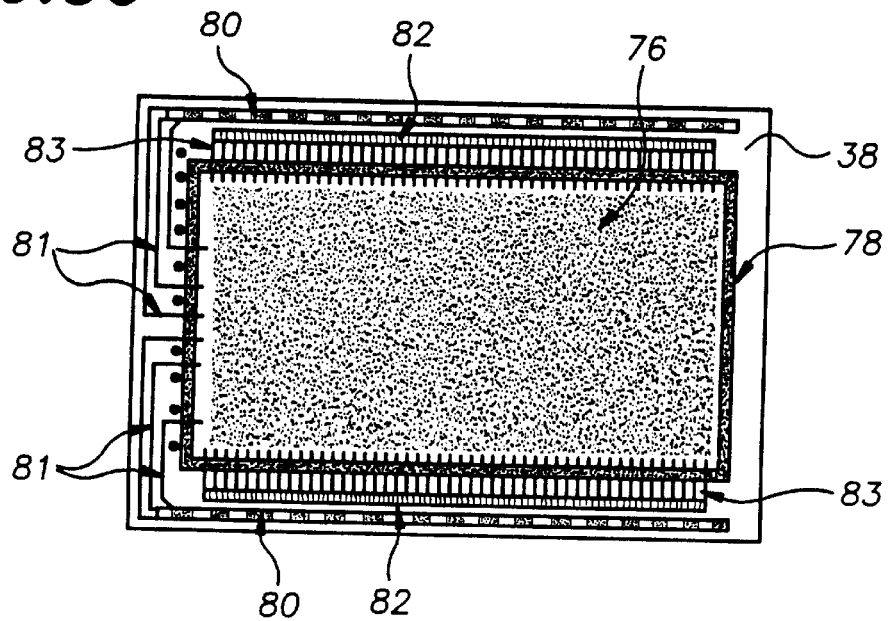
FIG. 8C is a schematic back-side view of the flat panel display of FIG. 8A with the light storage plate of the display removed.

Considering now in more detail a flat panel display employing an array of mechanical light taps provided by the invention as pixel elements, as shown in FIGS. 8A, 8B, and 8C, the display 10 consists of a light storage plate 12 having light sources 14, which preferably are white light or multicolor light sources, on each lateral end of the storage plate. The light storage plate forms the back of the display, opposite the viewing side; which consists of the viewing substrate 38, as described above. A display area 72 is defined by the area on the viewing substrate that corresponds to an array 76 of mechanical tap beam structures aligned in columns, examples of which were shown in FIG. 4. The viewing substrate 38 and light storage plate 12 are aligned and held together preferably under a partial vacuum. An O-ring 78, deposited on the viewing substrate 38, facilitates this evacuated assembly.

Line driver electronics 80 and column driver electronics 82 are positioned at the top and bottom edges of the viewing substrate 38. In one suitable example configuration, dedicated line drivers 80 are each connected to a corresponding line electrode on the viewing substrate by way of line conductors 81; and similarly, dedicated column drivers 82 are each connected to a corresponding column electrode on a mechanical tap beam by way of column conductors 83.

An example flat panel display in accordance with the invention is of a geometry in which the active display area (76 in FIG. 8C) is about 1 meter-wide and has a height of about 56 cm. The display provides, e.g., 1080 display lines, with 1920 pixel elements per line. Pixel intensity modulation, e.g., eight-bit modulation, is optionally provided by a temporal- or area-weighting scheme, described below. With these geometric considerations, the example display supports a frame rate of 60 frames/sec, also optionally supporting multi-color sub-frames, e.g., 3 color sub-frames/frame. High optical efficiency of the sub-frame scheme is achieved if, e.g., red, green, and blue light sources are pulsed in sequence to illuminate the light storage plate in a sequence of red, green, and blue sub-frame color time slots. In such a scenario, each of the three color time slots is ⅓ of the total frame duration provided by a frame rate of 60 frames/sec, and accordingly corresponds to about 5.56 msec for each color time slot. The actuation time of the array of mechanical light taps, given above as in the range of hundreds of nanoseconds, provides adequate speed for such a multi-color scheme, as explained in more detail below.

Figure 9:
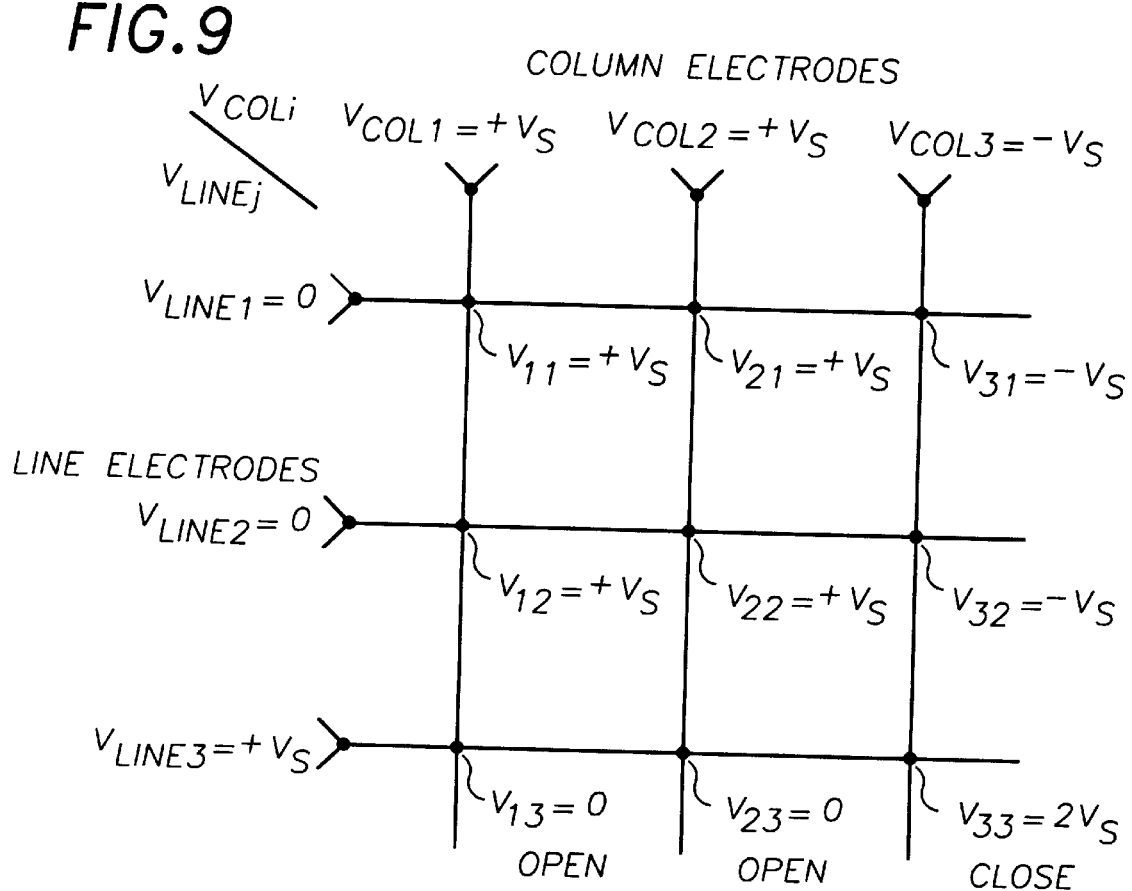
FIG. 9 is a schematic plot of the switch state of optical mechanical switches in an array of such switches controlled by an example set of voltages in accordance with the control scheme plotted in FIG. 7.

In a control scheme for setting the "on" and "off" states of the pixel array for one color time slot or in a case in which sequential color injection is not used, for one frame, voltages are applied to the line and column electrodes of the display to electrostatically actuate selected mechanical tap beams in the array. In one example control scheme, as shown in FIG. 9:

$V_{col i}$=Voltage applied to $i^{th}$ column electrode where i=1 to m;

$V_{line j}$=Voltage applied to $j^{th}$ line electrode where j=1 to n; and $V_{diff(i-j)}=(V_{col i}-V_{line j})$=Differential potential applied to the mechanical tap located at the intersection of the $i^{th}$ column electrode and the $j^{th}$ line electrode.

In one example of this control scheme, all of the column electrode voltages are applied simultaneously during the application of a given line electrode voltage; then the column electrode voltages corresponding to the next sequential line are applied simultaneously while the next line electrode voltage is applied. The line electrode voltages are in this way applied sequentially beginning with, e.g., the top-most line. During each line electrode voltage application, the $i^{th}$ column voltage, $V_{col i}$, applied to each of the i=1 to m column electrodes, is either $+V_s$ or $-V_s$, where $V_s$ is defined as in FIG. 7, and is maintained for the duration of a given line electrode actuation period. The $j^{th}$ line voltage, $V_{line j}$, applied to the $j^{th}$ of the j=1 to n line electrodes, is $+V_s$ during the actuation period for that line, and is 0 volts while all of the other lines are being addressed.

Electronics for enabling this actuation scheme are described later in the discussion. Whatever electronics are employed, for many applications it may be preferable to configure the display such that the line and column actuation voltage, $V_s$, is constrained to a magnitude less than abut 20 V such that conventional MOS technology can be employed. For the example geometry considered in the above computation of switching speeds, a line and column actuation voltage, $V_s$, of at least about 12.5 V is required. In this case, one or more of the various geometric parameters can be adjusted to achieve a desired actuation voltage magnitude, e.g., a lower magnitude than 12.5 V.

Considering the example control scenario shown in FIG. 9, which depicts a point in time during one frame or color time slot when lines 1 and 2 have been addressed and line 3 is actively being addressed, column electrodes i=1 and i=2 are set at an example voltage of $+V_s$ and column electrode i=3 is set at an example voltage of $-V_s$; line electrodes j=1 and j=2 are set at 0 volts and line electrode j=3, the line actively being addressed, is set at $+V_s$. With these column and line electrode voltages, the mechanical taps addressed at a time previous to that depicted in FIG. 8, i.e., those taps at the intersections of all the columns and lines 1 and 2 all are exposed to a potential difference of either $+V_s$ or $-V_s$. Based on the hysterisis actuation response of the mechanical tap scheme, as shown in FIG. 7, these voltages set those mechanical taps at a point in the hysterisis function whereby the taps remain at whatever position they were set at when they were each actively addressed, even though no active addressing of those lines continues. This condition is maintained provided that the transition to or from $+V_s$ or $-V_s$ occurs in a time interval short with respect to the mechanical switching speed of the elements and is a result of the bistable hysterisis actuation response.

The mechanical taps at the intersections of the active line, line 3, and columns 1 and 2 are exposed to a potential difference of 0 volts, whereby these two taps are opened. The mechanical tap at the intersection of column 3 and line 3 is exposed to a potential difference of $+2V_s$, which is greater than $+V_c$ (FIG. 7). As a result, this mechanical tap is closed, and light is coupled out of the tap into the viewing substrate. At a time after the third line is actively addressed, i.e., after the voltage applied to line 3 is switched to 0 V, the "open" and "closed" states of the taps in that line will retain their positions due to the hysterisis actuation response of the taps. In this manner, the entire sequence of line electrodes is addressed with taps retaining their position while later taps in the sequence are addressed. This scheme eliminates the need for active electronic devices at each pixel and provides an extremely efficient display with low power consumption.

Furthermore, this elegant control scheme requires only three different voltage magnitudes, namely, $-V_s, +V_s$, and 0 volts, and yet the bistable hysterisis actuation response of the mechanical tap scheme provides the ability to achieve four different responses, namely "open," "close," remain "open," and remain "closed." As explained above, the various column electrode voltages are applied simultaneously and switched simultaneously at the start of each line voltage application, while the line electrodes are set sequentially. Alternatively, but perhaps less preferably, the column and line electrode actuation voltages and control timing can be switched, i.e., $\pm V_s$ can be applied to the line electrodes simultaneously and 0 V or $+V_s$ applied to the column electrodes sequentially. Whichever electrodes are addressed sequentially, the voltage applied to each electrode in the sequence is preferably applied for a time duration that is sufficient to establish an electrostatic actuation force, after which the appropriate voltage is applied to the next electrode in the sequence. The polarity of the column (or line) voltages that are applied simultaneously are set at the start of the actuation time duration for a given sequential line (or column) and are switched at the start of the actuation time duration for the next line (or column) in the sequence.

Figure 10A:
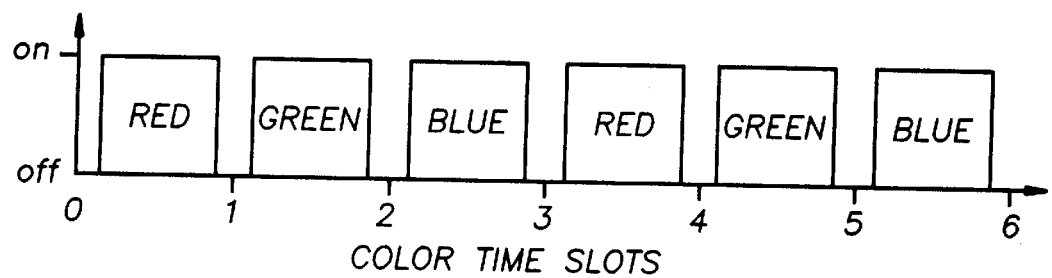
FIG. 10A is a plot of colors displayed in an example sequence of color time slots in a display frame in accordance with the invention.
Figure 10B:
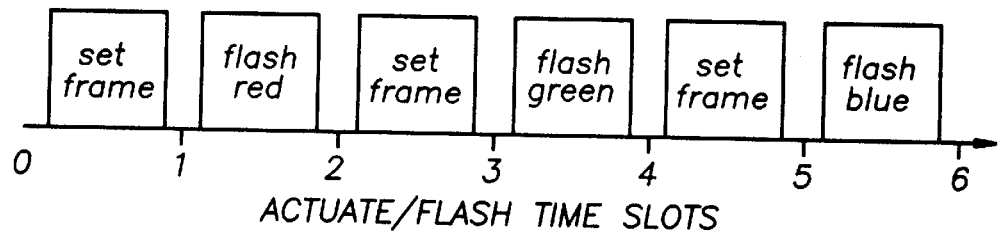
FIG. 10B is a plot of an example optical switch actuation and color flash timing sequence for producing the color sequence of FIG. 10A.

Considering a quantitative example of the control timing sequence for applying column and line voltages, recall that the flat panel display of the invention supports a temporal scheme in which about 5.56 msec is available for each of three color time slots in a frame, where the frame rate is 60 frames/sec. Referring to FIG. 10A, each color time slot corresponds to a temporal segment during the frame duration in which either red, green or blue light is produced in the location of any of the mechanical taps that are set "on" for that time slot. In one example scenario, one-half of the color time slot duration, i.e., about 2.78 msec, is allotted for actuating the mechanical tap beams to move selected ones into the "on" condition, and the remaining time, also 2.78 msec, is allotted for flashing of color light source lamps to produce the desired color of a given time slot. Referring to FIG. 10B, the actuate and flash sub-time slots corresponding to each color time slot are illustrated. For example, the first "red" color time slot in FIG. 10A, i.e., time slot number 1, is produced by a first actuation sub-time slot (FIG. 10B) to "set the frame" during which all of the line electrodes are sequentially addressed to actuate selected ones of the mechanical taps into the "on" condition, followed by a first "flash" sub-time slot during which red light is injected into the light storage plate. The sequence progresses in this manner to produce green and blue time slots in one frame duration. Thus, each mechanical tap in the display may be actuated up to three times to produce one display frame.

In an alternative scheme, a given color source can be maintained on during an entire color time slot duration, e.g., 5.56 msec. In this scheme, all tap elements are set in the "off" position at the start of a given color time slot and are switched to appropriate settings sequentially in a time short with respect to the time slot duration. The elements are then turned off sequentially prior to the next color time slot.

Actuation schemes like these employ a combination of column electrode and line electrode voltage application, as explained above. If, e.g., all column electrodes are to be addressed simultaneously, then the column driver electronics is controlled to, e.g., drive two half-columns of pixels, for example the top-half plane of the display and the bottom-half plane of the display, independently and simultaneously. This dual column actuation enables the addressing of two line electrodes. Then, if the line electrodes are to be addressed sequentially, the time available to address a single line is equal to the actuation time slot duration divided by one-half the number of lines in the display. In one sequential addressing scheme in accordance with the invention, line driver electronics are controlled to sequentially address lines beginning at the top of the display while simultaneously addressing lines beginning at the bottom of the display. In this scheme, e.g., lines 1 to n/2 (where n is the number of lines) are addressed in sequence while lines n to (n/2)+1 are simultaneously addressed in sequence. This scheme accomplishes addressing of all lines with twice the time available than would be available if all n lines were addressed in sequence from line 1 to line n.

Figure 10C:
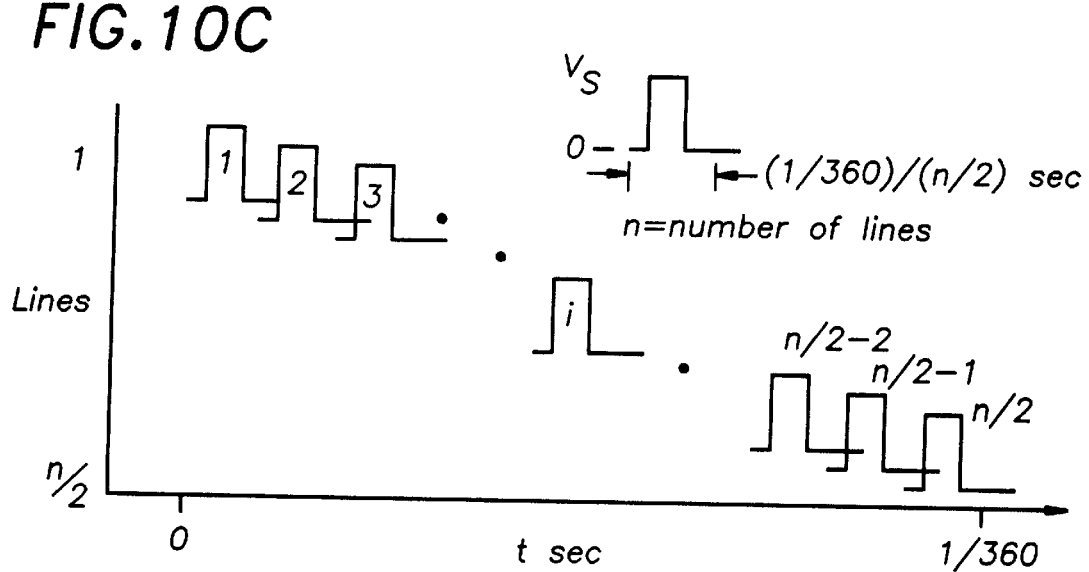
FIG. 10C is a schematic temporal and spatial plot of an example display line electrode actuation sequence for producing the timing sequence of FIG. 10B.

With this line addressing scheme, the time allotted to address one line is 2.78 msec/(1080/2)=5.15 μsec, for a display including 1080 lines. FIG. 10C schematically depicts this sequential addressing scheme for the top half of the display, containing line 1 to line n/2. The actuation voltage $+V_s$ is sequentially applied to each line for a time corresponding to the address line time, e.g., 5 μsec, as computed above. This address line time is more than sufficient to accommodate both the frame speed and switching speed of source lamps as well as the mechanical actuation speed of the mechanical light taps. Indeed, this illustrates an important advantage of the mechanical light tap scheme relative to more conventional display schemes that typically are either much slower or that require a more complicated actuation configuration.

As explained above, each micromechanical element in the flat panel display corresponds generally to the intersection of a column electrode and a line electrode, because an electrostatic force generated at such an intersection results in actuation of a mechanical tap beam to contact the light storage plate at the location of the intersection. Thus, at the location of every column and line electrode intersection in the light tap array there is located a corresponding contact area, which may include topology such as a mesa on, e.g., the light storage plate. As explained previously, a mesa or other contact topology could alternatively be located on the light tap elements themselves. The contact topology, in concert with the compact nature of the light tap elements and localized actuation enabled by the column and line electrode geometry, enables a display with superior resolution.

Figure 11:
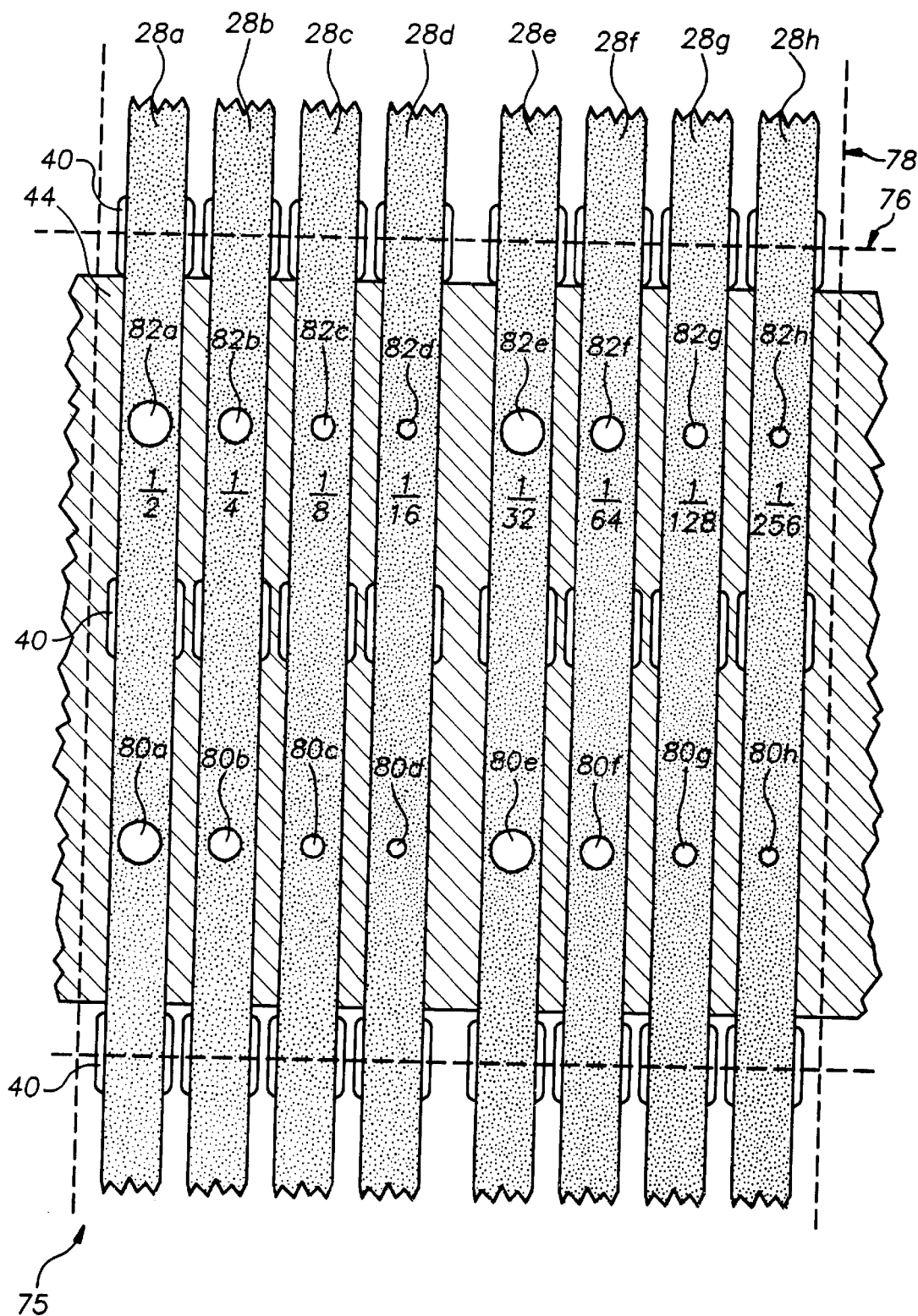
FIG. 11 is a schematic view of an example flat panel display pixel including eight optical mechanical switches in accordance with the invention.

In one example pixel geometry in accordance with the invention, as shown in FIG. 11, an area-weighting scheme is employed such that, e.g., eight bits of viewing intensity are associated with a single pixel. Other pixel weighting schemes are equally applicable, as described below. The view in FIG. 11 is from the back of the display with the light storage plate removed such that the bottom surfaces of the mechanical tap beams are in view (as in FIG. 8C) above the lower surface of the viewing substrate. As shown in FIG. 11, one pixel 75 is defined by the area of intersection of eight mechanical tap beam elements 28a–28h, and one line electrode 44 (with reference to FIGS. 4A–4D). The line electrode 44 is located on the lower side of the viewing substrate and extends the horizontal length of the active display area; a display of, e.g., 1080 lines includes 1080 such horizontal electrodes. Each of the eight tap beam elements is actually a portion of a beam that extends the full height of the active display area; a display of e.g., 1920 pixels/line therefore includes 1920×8=15,360 such mechanical tap beams. Each of these beams corresponds to a column electrode, e.g., a metallized top surface of the beam, to which a voltage of either $\pm V_s$ is applied, as explained above, during addressing of each line.

In one example voltage control scheme for simultaneously addressing all 15,360 tap beam columns, an upper set of 15,360 column drivers is provided at the top of the display and a lower set of 15,360 column drivers is provided at the bottom of the display. Preferably, as discussed in more detail below, each of the drivers is a fast-acting double-pole, double-throw switch that applies either $\pm V_s$ to the corresponding pixel tap bit beam. As is readily understood, the number of column drivers corresponds to the number of bits per pixel; and suitable division of pixel addressing between electronics at the top and bottom of the display can take many configurations other than that specifically described here.

Turning again to FIG. 11, in one suitable pixel design, one pixel extends about 500×500 μm$^2$, with a horizontal border 76 and a vertical border 78 laterally enclosing the eight taps and vertically enclosing a section of the eight taps that corresponds to the horizontal location of a given line electrode. In one example design, each of the eight mechanical taps is about 40 μm-wide, 180 μm-long, with two storage plate contact areas between the supports 40 at each end of the line electrode 44 and a support 40 in the center of the tap, and is separated from the other taps by about 20 μm. This spacing can provide adequate lateral area for positioning eight separate wires through each pixel to provide eight separate bits of binary control. Not shown explicitly are the metallizations on the eight mechanical taps for making contact to them. Each of the mechanical taps 28 are held separated from the viewing substrate 38 not only by supports 40 located at each edge of the line electrode but also by a support 40 in the central region of the line electrode. The spacers located on the lower side of the mechanical taps for holding them separated from the light storage plate are not shown.

In an 8-bit intensity modulation scheme, the most significant bit tap 28a is assigned an intensity weight of ½ and each successive bit tap 28b, 28c, . . . , and 28h, is assigned an intensity weight corresponding to the next consecutive power of two, i.e., ¼, ⅛, . . . , and 1/256, respectively, as shown in the figure. This weight assignment is produced by a combination of factors. First, as shown, each of the first four (leftmost) mechanical taps has a successively smaller pair of mesa contact areas 80a–80d and 82a–82d, and each of the second four (rightmost) mechanical taps has the same sequence of contact areas 80e–80h and 82e–82h. The contact area for a given mechanical tap is defined by the geometry of the upper surface of the light storage plate mesa underlying that tap. This geometry may be circular, as shown, or may take another suitable shape. If circular, the sequence of four diameters can be, e.g., 35, 24.7, 17.5, and 12.4 μm, from largest to smallest.

The contact areas are shown on the lower surfaces of the mechanical taps in FIG. 11 for clarity but in actuality, a similar geometric designation is made in the metallic layer located, e.g., on top of the mechanical tap beams to permit the released light to propagate into the beam 28 and out through a similar aperture in the line electrode located on, e.g., the viewing substrate. The contact areas are also defined by the geometry and area of the light storage plate mesas, if such protrusions are included in the light storage plate structure. Not shown are windows in the viewing substrate line electrode (behind the mechanical tap beams) that each correspond directly to the mesa contact geometry for a given pixel tap bit. These windows provide the optical path aperture for light coupled out of the light storage plate to enter the viewing substrate and emerge into a viewing volume.

Two mesa contacts are shown in the figure for each mechanical tap beam bit; this is an example of pixel redundancy provided by the display scheme of the invention. Specifically, two or more light storage plate mesas and corresponding windows in the viewing substrate line electrode are preferably provided for each bit so that in an unlikely event of failure of a tap bit beam to make contact with one of the corresponding storage plate mesas, one or more additional other mesas will couple light out of the storage plate for that bit.

The second factor providing digital weighting of the pixel bit intensities is the height of the stand-offs (54 in FIG. 4B) on the mechanical taps. Recall that the stand-offs are located on the lower surfaces of the mechanical tap beams in the areas where the beam contacts the light storage plate mesas. In FIG. 11, the stand-offs, if shown, would be located in the circular mesa contact areas 80a–80h and 82a–82h. The stand-offs are provided to suppress Van der Walls attractive forces that could develop when the an extended area of the tap beam makes mechanical contact with a light storage plate mesa, as discussed above. The four leftmost tap beams each include stand-offs having a height of, e.g., about 200 Å, while the rightmost tap beams each include stand-offs having a much taller height, e.g., of about 1500 Å.

As discussed previously, the 200 Å-high stand-offs have essentially no impact on the coupling of light from the top surface of the storage plate mesa through the mechanical tap. However, the 1500 Å-high stand-offs reduce the coupling of light out of a light storage plate mesa by about 12 dB. Thus, although the sequence of mesa contact areas of the four rightmost pixel bit beams is the same as that of the four leftmost pixel bit beams, the intensity of light produced by contact of the four rightmost beams is about 12 dB less than that produced by the four leftmost beams. As a result, a full sequence of eight different bit weightings is achieved for the pixel. This eight-bit weighting corresponds to a dynamic range of about 24 dB.

A noticeable feature of the pixel arrangement of FIG. 11 is the relatively small fraction of the overall pixel area through which light is coupled out to emerge into a viewing volume; this ratio is known as the filling factor, and is calculated as the ratio of aperture area to total pixel area. Consideration for a preferable filling factor is as follows. In a condition in which all pixels of a display are turned "on," it is desirable to achieve uniform illumination across the width of the display. Given that light sources are positioned on both the left and right edges of the display, an injected light beam propagating through the light storage plate from left to right will tend to compensate for losses suffered by a beam propagating from right to left, and vice versa, if the coupling coefficient for all pixels is designed to a value such that only one-half the available light is coupled out of the display by way of the pixel apertures. The pixel coupling coefficient is a function of the filling factor, the transmission coefficient across the gap between the mesas and the mechanical tap beams, and other factors.

It can be shown that for a light storage plate of 1 cm in thickness and 135 cm in width, coupling of 1.2% of the light incident at each pixel out of the light storage plate produces, in a lossless storage plate, an intensity across the display area that diminishes smoothly by only about 6% from the edges to the middle of the display. This assumes that about one-half of the injected light emerges from the display edge opposite the one at which it was injected. In this scenario, the filling factor for each pixel can be as small as about 3%. As mentioned previously, this then provides more than adequate lateral area for connection of electrode control wires to the mechanical tap beams, as well as for insulating spacers. A quantitative analysis of the display intensity as a function of display position will be presented later in the discussion.

Considering again the pixel bit weighting scheme provided by the invention, other weighting schemes, e.g., temporal, or a combination of temporal and area-weighting schemes, can also be employed. Such a combination scheme may in some cases be preferable because an all-area weighting scheme requires a dedicated electronic driver for each of the mechanical tap beams in the pixel. In one example combination temporal/area weighting scheme that provides eight-bit weighting, a sequence of only four different tap beams and four corresponding mesa contact areas is required, e.g., of relative sizes 1, ¼, ¹⁄₁₆, and ¹⁄₆₄. The switching speed for setting pixel line electrode voltages is then doubled to support two temporal settings for each color time slot, namely, a short-duration coupling and a long-duration coupling having a coupling time twice that of the short-duration setting; this results in a temporal weighting of either 1 or ½ for each mechanical tap beam addressed. This two-level temporal weighting scheme, in conjunction with the four-level mesa contact area weighting scheme, provides a full eight-bit intensity range from ½–¹⁄₂₅₆, while requiring half the number of tap beams control wires required of an eight-level, area-only weighting scheme.

Similarly, a three-level area weighting in combination with a three-level temporal weighting could be employed to produce nine bits/pixel of intensity weighting. As will be understood by those skilled in the art, other such weighting combinations, or temporal weighting alone, can also be employed; and as discussed initially, pixel weighting is not absolutely required. In general, a total bit weight, b, that provides b bits per pixel, is equal to pq, where p is the number of temporal bit weights and q is the number of area bit weights. In one suitable example timing control scheme, the least significant temporal weight, $t_{LSB}$, that can be accommodated is set to exceed $3t_s$, where $t_s$ is the switching speed of an element. In this case, the least significant temporal weight $t_{LSB}$, and the least significant area weight $\alpha_{LSB}$, for a pixel are defined by the following relationship:

$$t_{LSB} = \frac{t_a}{\sum_{x=0}^{p-1} 2^x} \qquad a_{LSB} = \frac{a}{\sum_{y=0}^{q-1} 2^{pq}} \tag{13}$$

where $t_a$ is the time duration for addressing a single line electrode and $\alpha$ is the product of the filling factor and the pixel area. Although not explicitly taken into account by this relationship, factors relating to the optical coupling efficiency of the mechanical tap beams and the finite tap beam actuation response time should also preferably be considered.

Table 1 below identifies some combinations of temporal and area weighting that results in "b" bits of combined weighting.

TABLE 1

| b | p | q | Temporal Weight, in units of $t_{LSB}$ | Area Weights in units of $a_{LSB}$ |
|---|---|---|---|---|
| 8 | 1 | 8 | 1 | 1, 2, 4, 8, 16, 32, 64, 128 |
| 8 | 2 | 4 | 1, 2 | 1, 4, 16, 64 |
| 9 | 3 | 3 | 1, 2, 4 | 1, 8, 64 |
| 8 | 4 | 2 | 1, 2, 4, 8 | 1, 16 |

In an alternative pixel layout scheme in accordance with the invention, each pixel includes one or more tap elements dedicated to a specific color; for example, three bits dedicated to red, three to green and three to blue. Each tap beam or the viewing substrate in the area of that tap beam includes a color filter or other medium for producing the color for which the tap beam is designated from a single injected light color. For example, color filters can be employed to filter injected white light for producing a multi-color display output. An example of a color filter was shown in FIG. 6. This configuration has an advantage over that of the sequential multi-color time slot scenario described previously in that only a white light source is employed instead of a multi-color source.

Figure 12A:
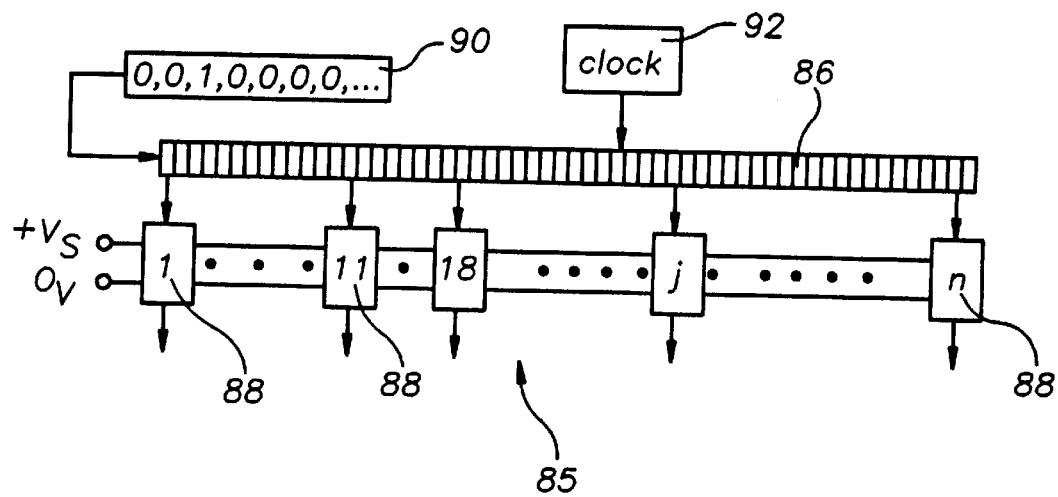
FIG. 12A is a schematic view of a line electrode driver circuit in accordance with the invention.

Considering now examples of drive circuitry for controlling the application of column and line electrode voltages in a display scheme with 4 area weights and 2 temporal weights, for a total of 8 bits per pixel, the line drive circuitry and column drive circuitry preferably are located at peripheral edges of the display structure, as shown in FIGS. 8A–8C. Turning to FIG. 12A, line drive circuitry 85 includes, e.g., a line voltage shift register 86 having a number, n, of shift bit positions that corresponds to the number, n, of lines in the display. Each line electrode is connected by way of wire, conducting trace, or other conductor, as shown in FIG. 8, to a dedicated single-pole, double-throw switch 88 for that line; there thus are n switches 88. Each switch is in turn connected to a corresponding one of the shift register bit positions for control by the bit in that position at a given time.

A line electrode switch sequence 90 is clocked through the shift register in FIFO manner under timing control of a line clock 92, synchronized with the register shifting by way of, e.g., a microprocessor (not shown), analog or digital control circuit, or software code. The line electrode switch sequence consists of a single "1" followed by a sequence of "0s" of a length to fill the shift register. The line clock shifts the sequence through the register at a speed corresponding to the time duration for which a line electrode voltage is applied to a single line. As the sequence is clocked through the register, the one bit position containing a "1" switches the corresponding switch 88 to apply the voltage $+V_s$ to the corresponding line electrode during one actuation time period. The other bit positions, which all contain a "0," switch their corresponding switches to apply 0 V to the corresponding line electrode. The line clock frequency is preferably set at a frequency, $f_c$, of:

$$f_c = 2\frac{n}{2} \, sF \sum_{x=0}^{p-1} 2^x \quad (14)$$

where p is the temporal bit weight, i.e., the number of temporal bits, as explained above; n/2 is the number of lines in one-half of a frame, as given above; F is the frame rate at which the display is operating; s is the number of time slots in a frame, e.g., each of three time slots can be employed in a frame to display one of red, green, or blue light, and the factor "2" corresponds to the time compression scheme as shown in FIG. 10B. If, for example, the number of time slots, s, in a frame is 3, the frame rate, F, is 60 frames/sec, the number of lines, n, is 1080, and the temporal bit weight, p, is 2, i.e., there are two possible time durations for a given pixel area, then the line clock frequency, $f_c$, is preferably set at an average rate of about 0.5972 MHz, as prescribed by correspondence (10) above; the instaneous rate is considerably higher, followed by a pause.

Figure 12B:
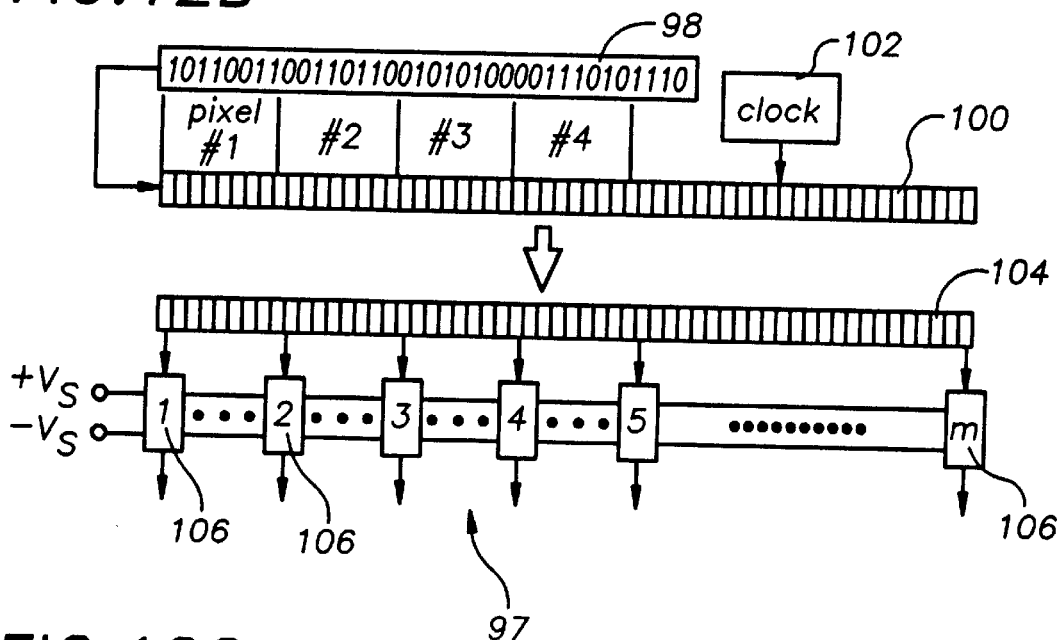
FIG. 12B is a schematic view of a column electrode driver circuit in accordance with the invention.
Figure 12C:
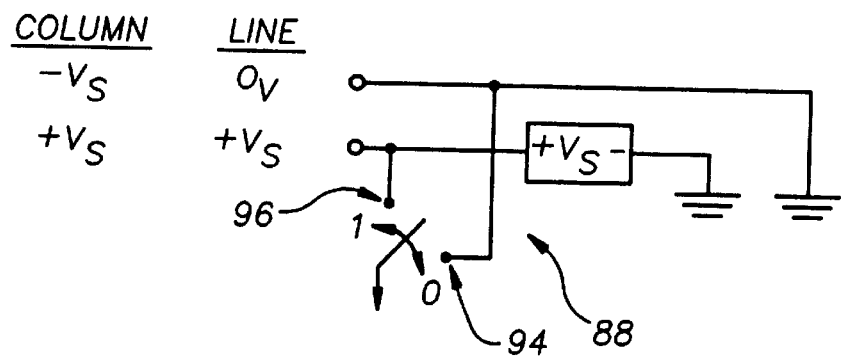
FIG. 12C is a schematic view of a single-pole, double-through switch in accordance with the invention for use in the line and column electrode driver circuits of FIGS. 12A and 12B.

Referring also to FIG. 12C, one of the n line switches is shown schematically in more detail. As explained above, all switches for which a "0" is positioned in the corresponding shift register bit position are set to a "passive" state position 94 for which 0V is supplied by the switch to the corresponding line electrode. The one and only switch for which at a given time a "1" is positioned in the corresponding shift register bit position is set to an "active" state position 96 for which $+V_s$ is supplied to the corresponding line electrode.

An example column drive circuit 97 is shown schematically in FIG. 12B. Here a column electrode switch sequence 98 of "1s" and "0s" corresponding to the mq column electrode voltages for one line of the display is shifted, in FIFO manner, into a set-up register 100 under control of a set up column clock 102. The set-up register 100 correspondingly includes a number, mq, of bit positions. The column electrode switch sequence includes a control bit for each area-weighting bit of each pixel in a column. Thus, as shown in the figure, if q=8 and p=1, then a first number, e.g., 8, of the switch sequence bits correspond a the first pixel in the column, the second 8 switch sequence bits correspond to a second pixel in the column, and so on, for a scheme like that of FIG. 11, where each pixel includes 8 tap beam bits.

The set up register 100 is filled with a new column electrode switch sequence 98 for each sequential line electrode actuation period. Accordingly, the set-up register is preferably filled with a given switch sequence in a time period no longer than a time period corresponding to $1/qf_c$, where $f_c$ is the line clock frequency defined above, so that a next sequential column switch sequence is ready at the end of a given line actuation period. Given a display of 1080 lines, 1920 pixels with 8 bits per pixel, 3 color time slots in each frame, one temporal weight, and 60 frames per second, the frequency of the column clock 102 is preferably set to achieve a data rate of about 3 GHz. This high data rate can be reduced by, e.g., segmenting the column register into k subregisters that are driven in parallel by the column clock 92 at a lower data rate. Alternatively, if bits of a pixel are separately dedicated to specific colors using, e.g., color filters and a white light source alone, then sequential color time slots in a given frame are not required and the register clocking rate can be correspondingly slower.

The column electrode drive circuit includes a second shift register, namely a column holding register 104, having a number of bit positions, mq, that like the set-up register, corresponds to the number of column electrodes. Once the column set-up register 102 is filled with a given column switch sequence 98, the entire sequence is laterally fed into the column holding register 104, preferably in a time short with respect to $1/f_c$. Then the next column switch sequence is clocked into the set-up register 100. Each bit position of the column holding register 102 is connected to directly control a dedicated single-pole, double-through switch 106, that in turn is directly connected to a corresponding column electrode. Only the switches corresponding to the most significant bit of the first few pixels are shown in the figure for clarity.

A suitable switch configuration is correlated to the two possible column electrode voltages, $+V_s$ and $-V_s$. For example, in a configuration similar to that shown in FIG. 12C for the line drive switch 88, a "1" in one of the holding register's bit positions could signal the application of $+V_s$ to the corresponding column electrode, while a "0" in one of the holding register's bit positions could signal the application of $-V_s$ to that electrode. Other column control switch schemes are equally suitable, as will be understood by those skilled in the art.

The rise and fall times of both the column and line electrode voltage signals applied to the column and line electrodes preferably exceed the characteristic switching time of the mechanical tap beam by a factor of about three. This ensures that mechanical taps of a given column in lines previously addressed do not change their position as the voltage applied to that column is later changed to address taps in later lines. The characteristic switching time of a mechanical tap is a function of the mass of the beam; a larger mass results in a longer switching time. Given a switching time of, e.g., about 0.5 $\mu$sec, the rise and fall times of the electrode voltage signals is preferably on the order of, e.g., about 150 nsec.

In the example pixel weighting scheme specified above, having two temporal weights and four area weights, which together produce eight bits per pixel, four columns of mechanical tap beams and corresponding electrodes are required for each pixel. This arrangement provides adequate lateral area on the display viewing substrate for locating column transmission lines adjacent to the mechanical tap beams. Considering the transmission line time constant for such a transmission line, the so-called RC time constant of the line is given by:

$$RC = \rho \epsilon L^2/(d_m d_d), \quad (15)$$

where $\rho$ is the unit resistivity of the line, $\epsilon$ is the unit relative dielectric constant of the line, L is the length of the line, $d_m$ is the metal line thickness, and $d_d$ is the dielectric line thickness. For a line length, L, of about 30 cm, a resistivity, $\rho$, of about $2.8 \times 10^{-6}$ ohm–cm, a dielectric constant, $\epsilon$, of about $4 \times 10^{-11}/36\pi$ fd/cm, and metal and dielectric thicknesses both of 1 $\mu$m, the transmission line RC time constant is about 90 nsec. This time constant is adequate for supporting a 150 nsec voltage signal rise time and fall time, as given above. It is notable that the power required to charge and discharge the transmission line and correspondingly, to actuate the mechanical tap elements, is about 200 W for the display specification given above, due to the electrostatic proximity effect and bistable response of the mechanical tap beam elements.

Shift register and switch/inverter electronics for implementing the control scheme above can be provided as dedicated microfabricated chips, e.g., CMOS gate arrays, ASICs, other custom configuration or conventional off-the-shelf packaged circuit that accommodates the number of shift positions and switches required for a selected display size. Preferably, the electronics accommodate the necessary actuation voltages, which may be e.g., about 12.5 V, and accordingly a conservative circuit layout design rule, e.g., a 2 $\mu$m design rule, is adequate. A conventional power supply and associated electronics is adequate.

Turning now to suitable light source configurations for illuminating the flat panel display of the invention, a first consideration for the optical source is that of optical efficiency. The optical efficiency of the display is enhanced if a majority of the light injected by the light source into the light storage plate arrives at internal surfaces of the light storage plate at an angle of incidence greater than the critical angle, and preferably at least 5° greater than the critical angle. Recall that the critical angle is that internal angle of incidence with a light storage plate surface that enforces total internal reflection of light in the storage plate, as was shown in FIG. 2. If the angle of incidence is at least 5° greater than the critical angle, the on/off ratio of optical intensity at each display pixel is then adequate for a nine-bit intensity modulation scheme. Therefore, if cost is not a concern for components of a display in accordance with the invention, a light source embodied as a laser is preferred. Such a laser light source provides the ability to very precisely achieve a desired incidence angle of collimated light.

Figure 13A:
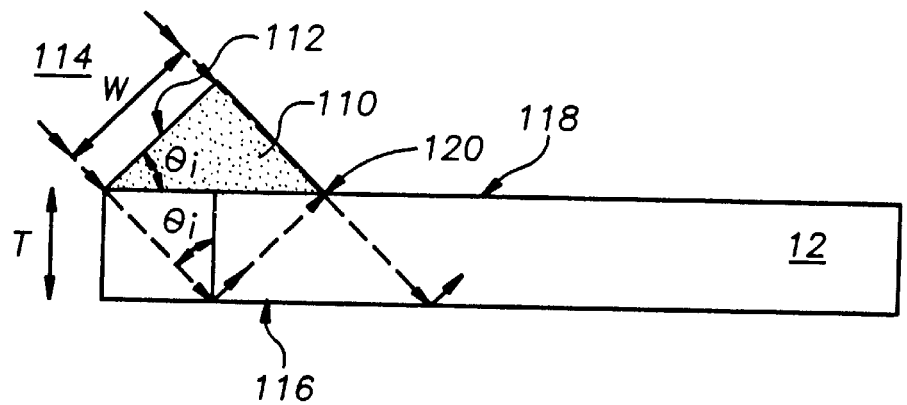
FIG. 13A is a schematic side view of an optical prism wedge configured with a light storage plate in accordance with the invention for injecting light into the light storage plate.

For applications in which cost of the display components is a concern, a trade-off between cost and optical efficiency is required. There are, however, several light source configurations provided by the invention that achieve reasonable optical efficiency at a relatively moderate cost. Considering one such scheme, the geometry of light injection from a light source into the light storage plate is illustrated in FIG. 13A. The light storage plate 28, formed of, e.g., Plexiglass™ is of a thickness T mm. A right-angle prism wedge 110, preferably of the same material as the light storage plate, is located at an edge of the storage plate in a configuration such that light entering the storage plate 28 is at an incidence angle greater than the critical angle. This is achieved, e.g., with a wedge triangle geometry in which the interior left corner wedge angle is equal to the desired incidence angle, $\theta_i$. Incident light 114 is preferably injected into the prism wedge at an incident wedge face 112, in the direction normal to the wedge face. The incident wedge face is of a width W mm, where:

$$W = 2T \sin \theta_i. \quad (16)$$

Once injected into the incident wedge face, the incident light propagates through the wedge 110 and into the storage plate 28, where it bounces off of the bottom surface 116 of the storage plate and strikes the top surface 118 at the point where the wedge ends 120. Thereafter, a uniform, collimated beam of width W bounces back and forth between the top and bottom surfaces of the storage plate under the condition of total internal reflection, whereby a uniform, seamless illumination source for the mechanical light taps is achieved.

Figure 13B:
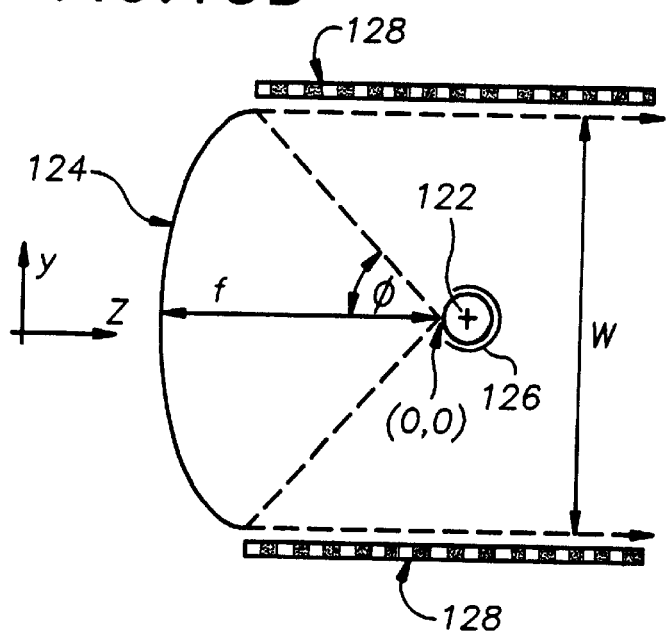
FIGS. 13B and 13C are schematic diagrams illustrating geometric considerations for positioning a flash lamp line source in relation to a parabolic reflector for producing an optical source in accordance with the invention.
Figure 13C:
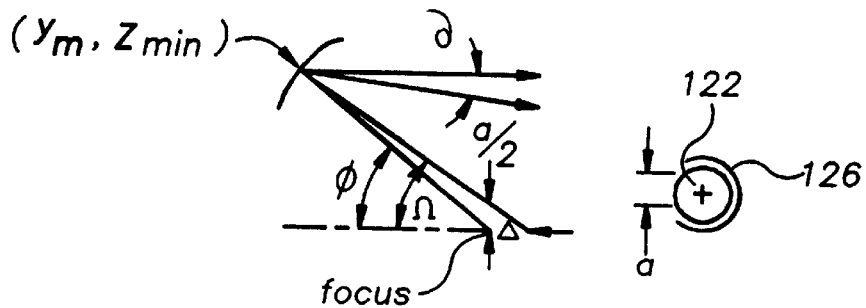

In a first suitable light source configuration, shown schematically in FIGS. 13B and 13C, a flash tube line source 122 is located parallel to a vertical edge of the storage plate at the focus of a cylindrical parabolic reflecting surface characterized by a focal length, f. The width of the line source 122 is given as $\alpha$, and corresponds to an opening in a cylindrical reflector 126 that encircles the line source except for an opening of dimension $\alpha$. This reflector opening is situated along the circumference of the reflector such that light from the line source propagates only in a direction toward the parabolic reflecting surface 124. This parabolic reflecting surface can be formed of, e.g., metallized, cast polystyrene, or other suitable material.

The line source and parabolic reflecting surface are positioned in relation to the light storage plate such that a collimated beam of width W is produced for injection into the wedge 114 positioned on one face of the storage plate. The geometric factors to be considered in setting this position are shown in the figures, and preferably are selected to satisfy conditions of total internal reflection within the light storage plate for a beam injected into the plate directly from a prism wedge such that the injected beam is a continuation of the beam propagating through the wedge. Assigning Cartesian coordinates in the y-z plane for the light source configuration, as shown, the light source is assigned a y-z coordinate position of (0,0). The geometric relationship between light produced by the light source and the parabolic reflecting surface is then given as:

$$z \sec\phi + z = 2f; \quad y = z \tan\phi = (z+\Delta) \tan\Omega; \quad (17)$$

$$\partial = \phi - \Omega; \text{ and } \alpha/2 = \Delta \tan\Omega_m$$

where $\phi$ is the angle of a light ray originating at the origin (0,0) and propagating to the coordinate point (y,z) on the parabolic surface 124; $\Omega$ is the angle of a light ray originating at the coordinate ($\alpha/2$,0) and propagating to the same coordinate point (y,z) on the parabolic surface; $\Delta$ is the z coordinate at the intersection of the z axis by a light ray originating at the coordinate ($\alpha/2$,0) and propagating to the upper edge of the parabolic reflector, with a coordinate point of ($y_m, z_{min}$); $\Omega_m$ is the angle of the ray propagating to that upper edge; and $\partial$ is the angular deviation of a ray reflected from the parabolic reflector that does not fall within the collimated beam of width W.

With these geometric definitions, the beam collimated beam width, W, and the numerical aperture, F, are given as:

$$W = 2y_m = 2T \sin \theta_i; \quad F = f/W. \tag{18}$$

If the numerical aperture, F, is set at about 2; the thickness, T, of the light storage plate is set at about 1 cm; and the angle of incident light, $\theta_i$, is set at about 50°; then based on these relationships, $y_m \approx 0.766$ cm; the focal length, f, is about 3.064 cm; $\phi_m$ is about 14.24°; and $z_{min}$ is about 3.018 cm. If $\partial$, the angular deviation from a collimated beam width, is set to be about $\leq 0.05$ rad, then $\Omega_m$ is about 11.38°; $\Delta$ is about 0.787 cm; and $\alpha$ is about 0.317 cm. These dimensions result in a configuration in which a light ray propagating from the opposite edge of the light source, i.e., from coordinates $(0, -\alpha/2)$ to the point on the parabolic reflector $(y_m, z_{min})$ deviates from the collimated beam by an angle of about 0.049 rad, and a ray propagating from that same point to the center of the parabolic reflector deviates from the collimated beam by an angle of about 0.052 rad.

The light source configuration resulting from this geometric design is thus about a 0.3 cm-wide ribbon line source aligned in parallel with the vertical edges of the light storage plate and located about 3.064 cm in front of a parabolic, cylindrical reflecting surface for which $F \approx 2$ and having a focal length, f, of about 3.06 cm. This produces a collimated beam having a width, W, of about 1.5 cm, and a deviation from that width by no more than about 0.1 rad in the (y,z) plane normal to the ribbon source. An optical absorber surface 128 is preferably located along the direction of the beam collimation to absorb unwanted light rays propagating in directions outside of the collimated beam. This light source configuration is preferably duplicated on an opposite edge of the light storage plate such that a pair of such light sources illuminates the plate.

Figure 14:
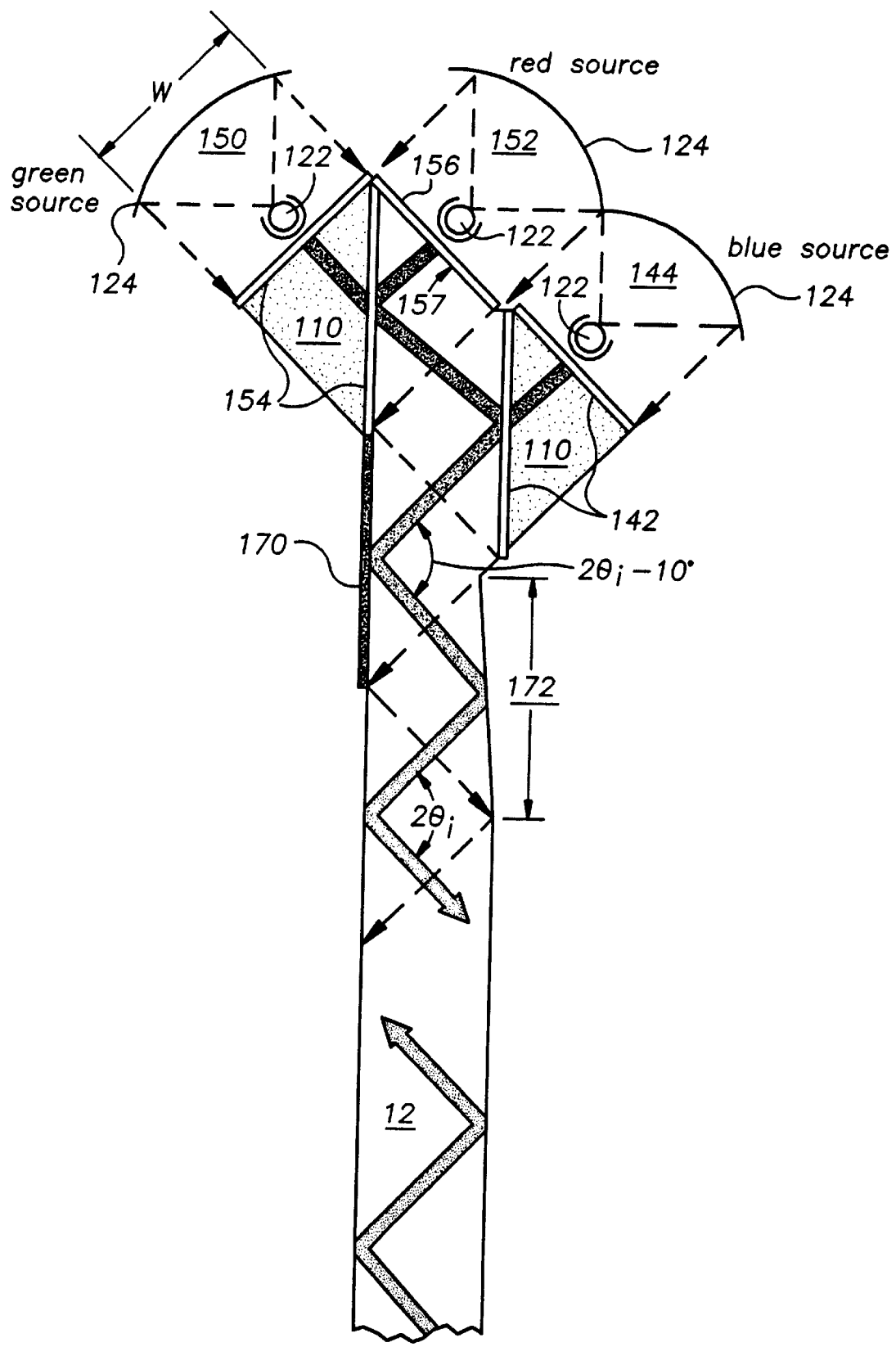
FIG. 14 is a schematic view of an example color optical source and its configuration with an edge of a light storage plate in accordance with the invention.

There is a wide range of suitable geometric configurations for providing a color light source in accordance with the electromechanical display of the invention. In one particularly compact scheme, shown in FIG. 14, blue, green, and red sources, 144, 150, 152, respectively, are aligned for direct injection of filtered light into the light storage plate 12. Here each source includes a white light line source 122, e.g., a flash tube, and a parabolic reflector 124 having a reflector aperture of width W, defined previously as the beam width preferably to be injected into the storage plate for filling the viewing surface of the display with light.

For the blue source 144, light reflecting from the parabolic reflector 124 is filtered through a dichroic mirror that 142 that transmits the blue wavelength and reflects other wavelengths. The reflected red and green light is refocused onto the light source, where it is absorbed. This scavenged optical energy helps to heat the flash lamp tube and lowers the power budget of the overall light source system. The filtered blue light is then injected into a prism wedge 110 and thereafter directly injected into the light storage plate 12 through an additional blue filtering dichroic mirror 142. The prism wedge preferably is of about the same index of refraction as the light storage plate. As can be seen by the geometric relationship of the red and green sources with the blue source, the second dichroic mirror is required to trap in the storage plate red and green light injected into the storage plate at locations closer than the blue source to the end of the storage plate.

Similarly, the green source 150 includes two green filtering dichroic mirrors 154. Light reflecting from the parabolic reflector 124 in the green source is filtered through the first dichroic mirror 154 such that the reflected light is absorbed and only the green wavelength is transmitted, which is injected into a prism wedge 110, and then directly injected to the light storage plate through the second green filtering dichroic mirror 154. This second mirror traps the red light produced by the adjacent red source 152. In this red source, light reflecting from the corresponding parabolic reflector 124 is filtered through a red filtering dichroic mirror 156, whereby the reflected light is absorbed and only the red wavelength is transmitted. This red light then is directly injected into a beveled edge 157 of the light storage plate, in which it is reflected first off the second green filtering dichroic mirror 154 and then off the second blue filtering dichroic mirror 142. The second prism wedge, like the first, is preferably of the same index of refraction as the light storage plate.

In this compact, direct-injection arrangement for the three color sources, the three flash lamps are turned on one at a time in sequence and in temporal correspondence with the three color subframe time durations defined by the line and column electrode addressing control scheme. As explained above, each sequential flash lamp "on" time would thus be about 50 msec.

The angular spread of light injected into the light storage plate with this light injection scheme is increased over the general configuration described above in FIG. 13, due to the use of a reduced distance between the light sources and corresponding reflectors to achieve an F factor of unity. This results in some fraction of the injected light being angled close to or even less than the critical angle, $\theta_c$, defined for the light storage plate as the angle of internal surface incidence required to maintain total internal reflection of light within the storage plate. Recall that light is preferably angled at least several degrees greater than the critical angle to ensure that no light "leaks out" of a mechanical tap element when that element is in the "off" position.

Enforcement of the critical angle is in this configuration achieved in the following manner. The geometric positions of the red, green, and blue filtering dichroic mirrors and the two wedges are set relative to edges of the light storage plate such that the red, green, and blue light injected into the plate is about, e.g., 5° less than the intended angle of injection; i.e., the injected angle, $\theta_{inj} \approx \theta_i - 5°$, where $\theta_i$ is the intended internal surface angle of incidence. An absorbing material layer 170, formed of, e.g., a layer of CrO, is located on the surface of the light storage plate at a position along an edge inward from where the red, green, and blue light is injected into the plate. Such an absorbing layer can consist of, e.g., a thickness of about 0.1 $\mu$m and a length corresponding to the internal injected beam width at that surface of the plate, corresponding to about 2T tan ($\theta_{inj}$). The absorbing layer is preferably positioned about 0.5 $\mu$m above the surface of the light storage plate.

Because the absorbing layer 170 is immediately adjacent to the plate surface, any of the injected light having an injection angle, in the arc of injected angles, that due to the 5° reduction in angle is less than critical angle, will escape from the light storage plate surface and be absorbed by the absorbing layer. All other light will reflect back into the light storage plate. This reflected light then impinges a wedge reflector 172 on the opposite surface of the storage plate; this may consist of, e.g., a geometric angling of the storage plate surface itself. The wedge reflector effectively adds 5° to the light impinging its surface, whereby that light is adjusted to the intended angle of internal incidence $\theta_i$. This arrangement ensures that the light propagating down the light storage plate into the display area is set at an angle of about 5° greater than the critical angle, and accordingly, minimizes the unintentional "leakage" of light out of mechanical taps that are in the "off" position. The active display area corresponding to the array of mechanical taps is preferably inward from the reflecting wedge 172, such that stray light of angles less than of the critical angle do not propagate into that section.

As can be readily understood, there are other equivalent schemes for minimizing the fraction of injected light that violates the conditions for total internal reflection within the light storage plate. For example, the use of an F-factor of about two or more, or the use of a single prism wedge filter of, e.g., 5°, can be employed to add that wedge angle to all light injected into the plate; this last scheme does not, however, ensure that even with the angular addition no fraction of light still will not meet the condition for total internal reflection. Whatever scheme is employed, it preferably minimizes the fraction of light that can escape from the light storage plate in the area of the mechanical tap array when the taps in the array are "closed."

No matter what color range is provided by a given light source configuration, that configuration is preferably provided in duplicate, one on each of two opposing edges of the flat panel display, for enhancing optical efficiency of the display. The light that traverses the extent of the display from one light source to the other is refocused into the light source flash tubes, where it is absorbed and heats the tubes, thereby increasing the power efficiency of the tubes. A single color or white light source may, however, be acceptable in certain applications.

Two opposing sources are also preferable based on the following considerations of intensity uniformity. As explained earlier, a good design rule for intensity of light emitted from the display is set based on the condition in which all pixels of the entire display are turned "on." In this case, it is preferable that about 50% of the light propagating through the light storage plate is emitted through mechanical light taps, the other about 50% of the light emerging at the edge opposite from that at which it was injected. For the condition in which all pixels are "on," one can reasonably approximate the loss of light out of the display across its length by a continuous dissipation function. Based on such a function, the intensity of that light which propagates the entire length of the display, when it reaches the end of the display, is given as:

$$I_o = I_{in} e^{-\alpha L}, \qquad (19)$$

where $I_o$ is the intensity of light at the end of the display, $I_{in}$ is the intensity of light at its injection point into the display, L is the length of the display, i.e., the length of the light storage plate, and $\alpha$ is the decay constant.

If it is specified that $I_o \approx I_{in}/2$, i.e., that about 50% of the injected light propagates the entire length of the display and emerges at the opposite end, then correspondence (19) above sets the value of the decay constant, $\alpha$, at about 0.693 Nepers/m. If only one light source is employed at, e.g., the left edge of the display, then correspondence (19) indicates that pixels at the right edge of the display will emit light having an intensity that is only about 50% of that for pixels at the left edge of the display.

If two light sources are instead employed, one on each vertical edge of the display, then the dissipation function of light intensity across the display gives the intensity, $I_z$, at any point, z, on the display, where the center point of the display is set as the origin, as:

$$I_z = I_{in} e^{-\alpha(L/2-z)} + e^{-\alpha(L/2+z)} = 2 I_{in} e^{-\alpha(L/2)} \cos h(\alpha z). \qquad (20)$$

Based on this expression, it is seen that when two vertical edge light sources are employed, the highest intensity light emitted by the display is at the edges, that is, the point of highest intensity on the display is at edge points of the display. But as mentioned previously, given a value for the decay constant, $\alpha$, that corresponds to about a 50% emergence condition, then the intensity at the center of the display, setting z=L/2 in correspondence (20), is only about 6% less than the intensity at the edges of the display, and the decay in intensity from the edges to the center is smooth (and thus hardly noticeable to the viewer). Thus, the use of two light sources provides a substantial improvement, both real and perceived, over the use of a single light source alone.

For very large displays, displays employing relatively weak optical sources, or displays that employ a light storage plate exhibiting high optical losses, it may be preferable in many circumstances to include multiple light sources and light sinks, positioned at points across the face of the light storage plate on the back surface of the plate, to compensate for optical losses. In one example configuration, light sinks and sources are provided at points along the display where the optical intensity is presupposed to drop below one-half the intensity of light at the display edges where it was injected.

Figure 15:
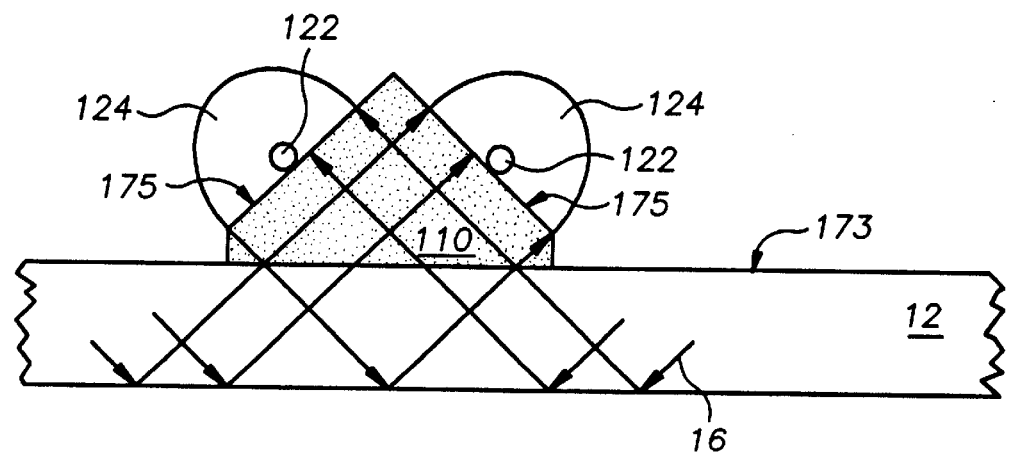
FIG. 15 is a schematic view of an example optical source and its configuration with the back surface of a light storage plate in accordance with the invention.

Referring to FIG. 15, in one such light source/sink, a prism wedge 110 is positioned next to the back surface 173 of the light storage plate 12. The prism wedge is preferably of the same index of refraction as the light storage plate; light beams propagating through the storage plate from either edge of the display (where light sources are positioned) are thereby efficiently coupled from the back surface of the light storage plate into the prism in the location of the prism. The prism facets 175 are preferably cut such that they are perpendicular to the light beams coupled from the light storage plate into the prism wedge. Light beams coupled into the prism wedge are directed to one of two light sources each including, e.g., a flash lamp 122 and a parabolic reflector 124 in a geometric relationship such as that given in FIG. 13. The coupled light is absorbed by the flash lamps, in a phenomena discussed above. At the same time, each of the two light source flash lamps injects light into the light storage plate through the prism wedge, after which the injected light propagates through the plate. The injected light is preferably provided at the same intensity level as that of the light injected at the display edges.

This scheme provides the ability to extract weakened light out of the light storage plate and replace it with light of the desired initial intensity. Because this scheme extracts the weakened light out of the back surface of the light storage plate, the electromechanical taps located in the vicinity of the storage plate front surface are unaffected, and no effects of the backside extraction/injection are noticeable to viewers. Thus, any number of source/sink locations can be accommodated by the storage plate.

Figure 16:
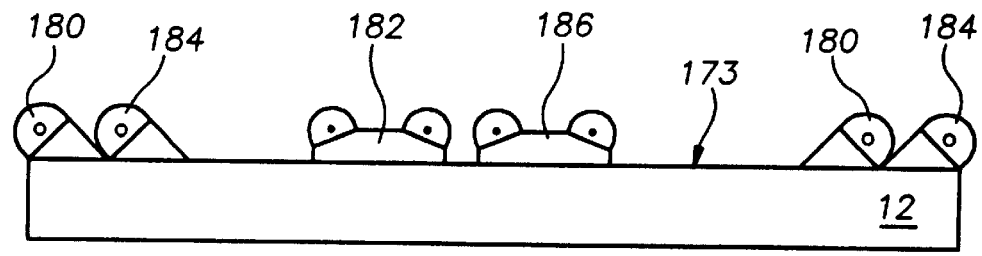
FIG. 16 is a schematic view of an array of the example optical sources of FIGS. 14 and 15 configured with a light storage plate in accordance with the invention.

Referring to FIG. 16, an array of source/sinks can be provided for each color in the range of colors of light injected into the storage plate. For example, edge light sources 180 for a first color can be located at each edge of the light storage plate, with one or more source/sinks 182 for that same color located at one or more points along the back surface 173 of the plate. Similarly, edge light sources 184 for a second color can be located at each edge of the light storage plate with one or more source/sinks 186 for that color located at points on the back surface 173 of the plate. In this scheme, the back surface of the plate is populated with source/sinks for each of the colors injected into the storage plate. Each source/sink site is selected based on the spatial profile of intensity loss expected for a given display configuration and material component selection.

Because the various optical color source schemes described above employ discrete white light line sources, the intensity of light emitted from the display may vary with the position along the display at which the light is emitted in these configurations. This effect is minimized with a scheme whereby, e.g., a ROM look-up table is included in the display electronics, for storing compensatory calibration factors that are a function of the duration of operation of the display. In this scheme, the initial display intensity variation is calibrated at the time of display manufacture, and the corresponding compensatory calibration factors are stored in the ROM. Then, as use of the display progresses in time, a control circuit, e.g., a microprocessor controlling the column and line electrode voltage application, employs the ROM look-up table for adjusting, e.g., the number of bits per pixel, the pixel addressing times, or other factors as specified by the look-up table. In one such scheme, e.g., the number of weighting bits per pixel is increased from eight to nine, in order to preserve the appearance of an eight-bit intensity weighting for the display viewer.

Considering now the specifications for the flash lamps used as line light sources in the various color source schemes described above, one important consideration is the preferable white luminance level for the display. A white luminance level on the order of 500 candles/m², i.e., 500 lumens/steradian-m², is acceptable for a large display, with a photometric efficiency of about 30–60 lumens per watt of input power for flash lamps operating at about 1000 amps/cm². The light flux output, $F_s$, of a typical flash tube may be approximated to be about 45 lumens/watt.

In the light source configurations provided by the invention, the flash lamp tube is silvered around its circumference except for an angular section corresponding to the location of a parabolic reflector positioned a distance from the tube. If it is assumed that the light emitted from this angular section is Lambertian, then the luminous intensity, I, produced by an input flash lamp power, $P_i$, is determined, for the value of $F_s$ given above, as:

$$I = 0.23\, F_s P_i = 10.4 P_i \text{ lumens/steradian} \tag{21}$$

where the factor 0.23 corresponds to the proportion of optical flux emitted into one steradian normal to the emitting surface of the flash lamp, relative to the total surface of the flash lamp. This large acceptance angle is a direct consequence of the use of a light scattering surface 32 on the movable tap beam 28 (FIGS. 3A–3C). This in turn permits the use of inexpensive incandescent light sources instead of lasers or elaborate but inefficient, highly collimated light sources.

In the optical source designs discussed above in accordance with the invention, each parabolic reflector produces a beam that is unconstrained within the plane and collimated in the plane normal to the axis of the flash lamp line source. A reflector for which the numerical aperture, F, is set equal to two and for which, as in the configurations above, the flash lamp source is located at the focus of the parabola, produces a beam having a solid angle, $\Psi$, that is given by:

$$\Psi = 2\,\tan^{-1}(y_m/z_{min}) \times 1 \text{ steradians}, \tag{22}$$

Where $y_m$ and $z_{min}$ are the coordinates of the most remote point of the reflector parabola, as defined in FIG. 13C.

The luminous flux, $F_{lum}$, entering the edge of the plate from the light source is given as:

$$F_{lum} = 10.4\,\Psi P_i \text{ lumens.} \tag{23}$$

Given that the desired luminance for the display is about 500 lumens/steradian-m², that the angular spread of the viewing volume is about 2 steradians, that the display area is about 0.6 m², and based on correspondence (22), using $y_m$ and $z_{min}$ coordinates of (0.766 cm, 3.018 cm), then assuming a relatively lossless system, the input power, $P_i$, of the flash lamp light sources is preferably about 116 W. This is provided by, e.g., two 60 cm-long flash tubes each having the specifications described above.

As mentioned previously, there are many light sources alternative to those described above that can be suitably employed in the flat panel display scheme of the invention. The invention is not limited to a particular light source configuration, but rather, generally contemplates any light source configured to inject light into a light storage plate in a manner that sets up conditions for total internal reflection for the injected light. For example, an array of laser diodes or other reasonably compact laser configuration can be employed to inject light into the light storage plate. Each laser or laser diode here preferably is associated with a corresponding lenslet to collimate the light. The resulting collimated point beam is then converted to a collimated line source using, e.g., a cylindrical lens.

A flat panel display system in accordance with the invention is manufactured by, e.g., configuring a light source with a light storage plate after a mechanical tap element array is fabricated and assembled with the light storage plate and a viewing substrate. Many fabrication and assembly processes are suitable; for a given application, considerations of cost and desired performance determine specific fabrication and assembly guidelines, as will be understood by those skilled in the art. In a multi-component system like the display system of the invention, there are many cost-performance trade-off opportunities.

In one example fabrication process, standard microelectronic materials and processing steps are employed to produce a mechanical tap element array. This enables a batch fabrication process in which efficiencies and uniformity provided by processing many display components simultaneously and under the same processing conditions can be exploited. However, this is but one of many suitable fabrication processes, and the invention is not limited to this specific process; it is provided as an example of the application of suitable and conventional microelectronic as well as liquid crystal fabrication techniques to the invention. With such processes, transparent fused quartz is preferably employed as a light storage plate material, in the form of, e.g., a fused quartz plate. The dimensions of the plate preferably correspond to the dimensions of the flat panel display, and thus can range from the size of standard microelectronic substrates, e.g., 2-inch, 4-inch, 6-inch, 8-inch, or other size diameter, to plates of several square feet.

Whatever size display is selected, it is preferable that a single quartz plate embody the entire expanse of the display's light storage plate. Standard processing techniques now exist for fabrication of, e.g., expansive liquid crystal displays, whereby plates of several square feet are accommodated. Such techniques are described in, e.g., *Liquid Crystal Flat Panel Displays: Manufacturing Science and Technology*, by W. C. O'Mara, Van Nostrand, 1993. In the invention, it is preferable to employ processing techniques that similarly accommodate a desired quartz storage plate dimensions. If, however, a plate of the necessary dimensions or a suitable processing facility is unavailable, then the corresponding light storage plate expanse can be obtained by mechanically and optically coupling multiple quartz plates in the desired dimensions.

In a first fabrication step, a quartz plate of selected size, shape, and of a thickness of, e.g., about 5 mm is cleaned and if desired, opaque reference marks are produced on the substrate for use as alignment marks if automatic photolithographic techniques are available for automating various of the fabrication processes.

Figure 17A:
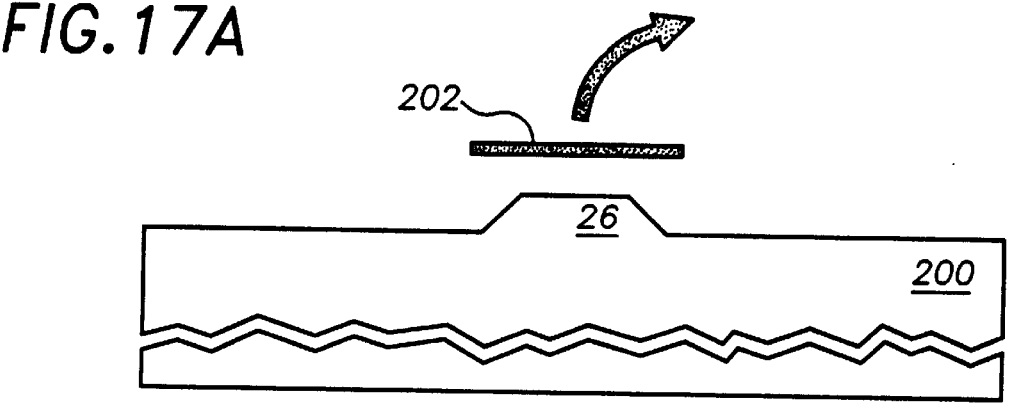
FIGS. 17A–17K are schematic side views illustrating fabrication steps for a first flat panel display manufacturing process in accordance with the invention.

Referring to FIG. 17A, the quartz plate 200 is then blanket coated with, e.g., a positive photoresist layer, which is exposed to a mask and developed for defining an array of light storage tap mesas or other desired geometry for contact areas on the plate. The substrate is then exposed to an isotropic chemical or dry etch, e.g., a standard plasma etch or a buffered hydrofluoric acid (BHF) etch, for a time sufficient to remove a surface layer of substrate material in the areas not protected by a mesa mask pattern 202. This results in formation of an array of light storage plate tap mesas, one of which (26) is shown in the figure. The photoresist mask 202 is then removed, and the substrates are cleaned.

Figure 17B:
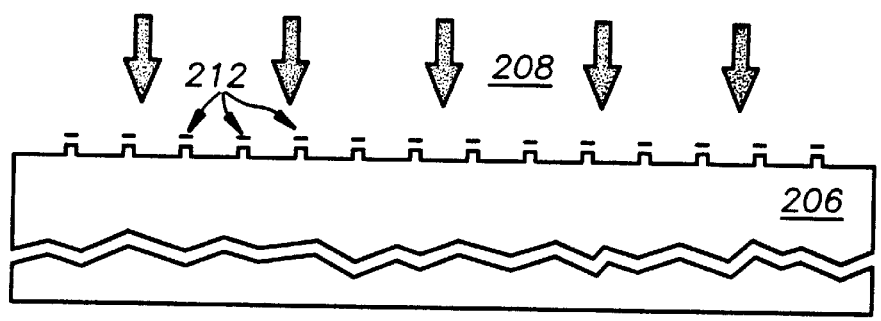

Processing of the viewing substrate is then begun as follows, referring to FIG. 17B. Like the light storage plate, the viewing substrate can be embodied as a quartz substrate, e.g., of about 5 mm in thickness and ranging in size between several inches and several feet. First the quartz viewing substrate 206 is blanket-coated with positive photoresist and exposed to a mask defining an array of small squares 212. This array corresponds to stand-offs 46 that maintain a spacing between the viewing substrate and a mechanical light tap when the tap is actuated toward and in contact with the viewing substrate. The photoresist-coated substrate is etched with, e.g., an ion beam etch 208, to remove about, e.g., 200 Å from the substrate in unmasked areas and produce an array of stand-offs 212 each masked with a photoresist layer. The resist is then removed and the substrate cleaned.

Figure 17C:
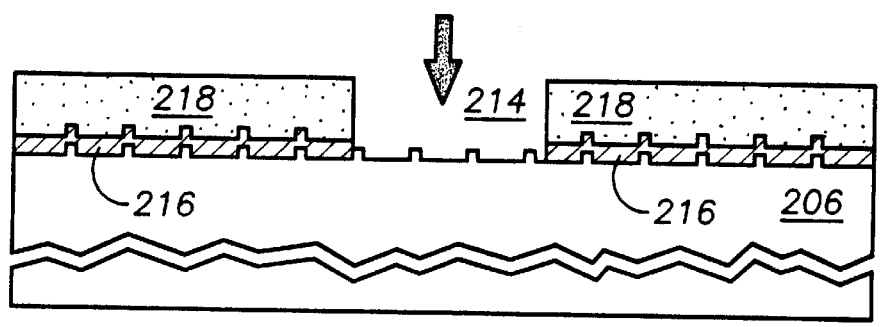

Next, the substrate is coated with about a 1000 Å-thick layer of metal, e.g., a layer of a titanium-platinum alloy. This is produced by, e.g., evaporation. The metal layer forms the line electrodes on the viewing substrate. This layer is blanked coated with a layer of positive photoresist and exposed to a mask that defines the "stripes" 216 of the line electrodes, as shown in FIG. 8, and that defines the windows in each line electrode through which light is coupled from a mechanical light tap out through the viewing substrate and into a viewing volume. The photolithographic mask also preferably provides the metal geometry at the peripheral edges of the viewing substrate for connecting each line electrode to a corresponding driver circuit like that shown in FIG. 12. A reactive ion beam etch 214, shown in FIG. 17C, is then undertaken to etch the metal layer 216 in areas not protected by the photoresist layer 218. The resist is then removed and the substrate cleaned. For some applications, the metal line driver circuit connections at the periphery of the viewing substrate are preferably thicker than the metal lines themselves. Multiple metal deposition and etch steps can be undertaken at this point to achieve a desired thickness for the metal connections.

Figure 17D:
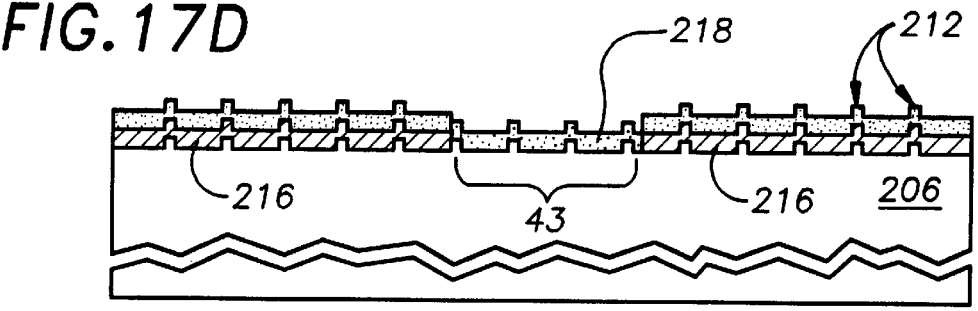

Then, as shown in FIG. 17D, a layer of silicon nitride 218, e.g., of about 1000 Å in thickness, is blanket coated over the metal line electrodes 216 and the quartz substrate 206 in the region of the optical coupling window 43. This silicon nitride layer, which can be produced by, e.g., low pressure chemical vapor deposition, is employed as an etch stop layer in later fabrication steps. Note that the spacers 212 previously etched in the substrate provide a corresponding topology to the metal and the silicon nitride layers; this corresponds to the viewing substrate spacers 44 of FIG. 4.

The quartz viewing substrate 206 is then blanket coated with a layer of, e.g., $SiO_2$ to form the supports 40 (in FIG. 4) that hold a mechanical light tap a prespecified distance out of contact with the viewing substrate in regions, corresponding to the line electrodes, outside of the light coupling window 43. The viewing substrate supports 40 are of a height corresponding to a desired normally "on" or normally "off" configuration. In one example configuration, the viewing substrate spacers are of about 1 $\mu$m in thickness.

Figure 17E:
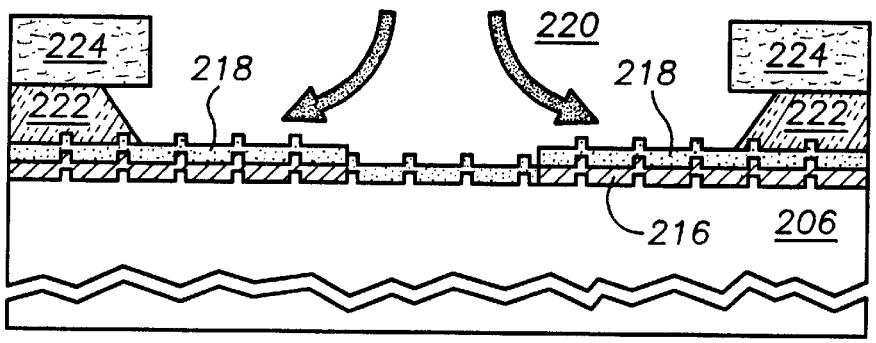
Figure 17F:
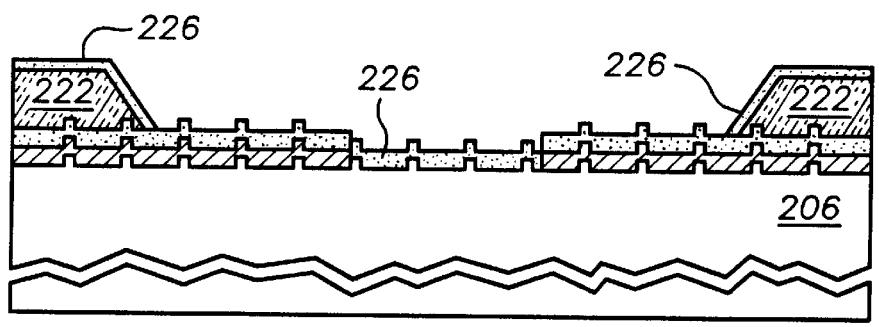

Once a layer of oxide is deposited, that layer is blanket coated with positive photoresist, which is exposed to a mask that defines the supports, and is developed. Then, as shown in FIG. 17E, an isotropic etch 220, e.g., a wet BHF etch, is employed to etch the oxide layer 222 and undercut the layer of resist 224. The underlying silicon nitride layer 218 is substantially resistant to the wet etch and thereby protects the metal layer 216 and the quartz substrate 206 from the etch. The resist is then removed and the substrate cleaned. Thereafter, as shown in FIG. 17F, an additional layer of silicon nitride 226, of, e.g., about 2000 Å in thickness, is blanket deposited over the substrate to act as an additional etch stop in later process steps for protecting the viewing substrate supports.

Figure 17G:
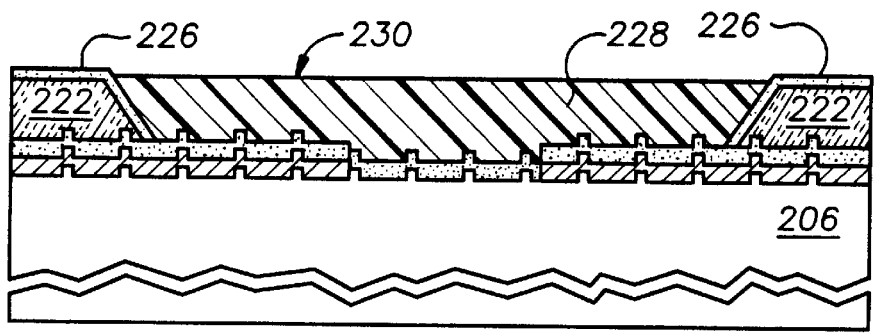

Micromechanical tap beam elements are then fabricated using surface micromachining techniques with the viewing substrate 206 serving as the platform support during the tap beam fabrication sequence. In the first step, as shown in FIG. 17G, a layer of polycrystalline silicon (poly-Si) 228 is blanket deposited using, e.g., standard chemical vapor deposition techniques. This poly-Si layer serves as the sacrificial micromachining layer in the final surface micromachining release etch of the micromechanical tap beams. Accordingly, the poly-Si layer can be doped to achieve a desired etch rate and selectivity. For example, the poly-Si layer can be doped with phosphorous to enhance the rate at which the poly-Si layer etches. Because the poly-Si layer is employed as a sacrificial layer, not a structural layer, its morphology is not of particular importance, and standard deposition techniques are adequate.

The poly-Si layer 228 is preferably deposited to a thickness at least as great as that of the silicon dioxide supports 222. Once deposited, the poly-Si layer 228 takes on the topology (not shown) of the supports. The poly-Si layer is then planarized; this planarization can be produced by, e.g., chemical lapping via a conventional slurry polishing, by chemical etching with an etchant to which silicon nitride is resistant, or other suitable process. As a result, the poly-Si layer 228 is smoothed such that its top surface 230 coincides with the top surface of the silicon nitride layer 226 covering the viewing substrate supports 222. This results in a filling of the "trough" between the supports 222 with a sacrificial poly-Si material and provides a smooth flat surface for subsequent photolithographic steps.

Figure 17H:
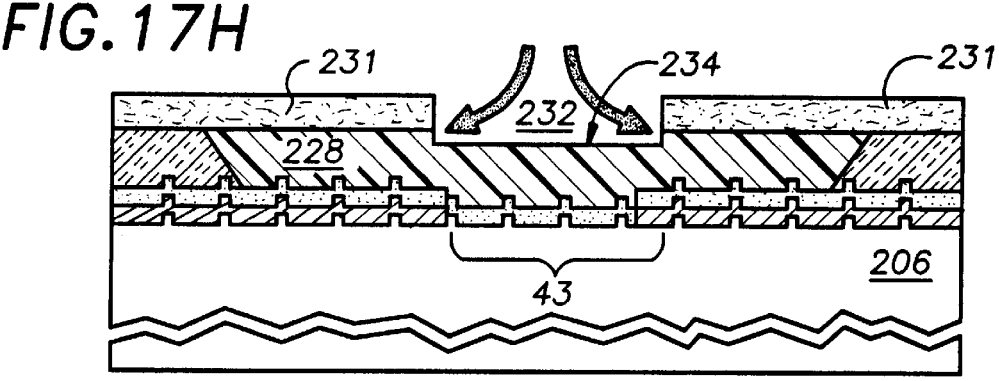

A blanket coating of resist is then deposited, and then as shown in FIG. 17H, the resist 231 is exposed to a mask having openings corresponding to the optical window 43 in the viewing substrate 206. The poly-Si sacrificial material 228 is then etched 232 in the unmasked areas to produce a recess 234 in the poly-Si. This recess can be produced by, e.g., a standard plasma etch. As with the other poly-Si plasma etch steps in the display fabrication sequence, the gases employed in this plasma etch step can be $SF_6$, $CF_4$, $Cl_2$, $CCl_3F$, or other gases or gas combinations suitable for poly-Si. Alternative wet chemical etches such as a water-based solution of potassium hydroxide (KOH), hydrazine ($N_2H_4$), ethylene-diamine/pyrocatechol (EDP), or other suitable poly-Si etchant can be employed. Whatever etch technique is employed, the resulting recess is preferably about, e.g., 0.5 µm-deep.

Figure 17I:
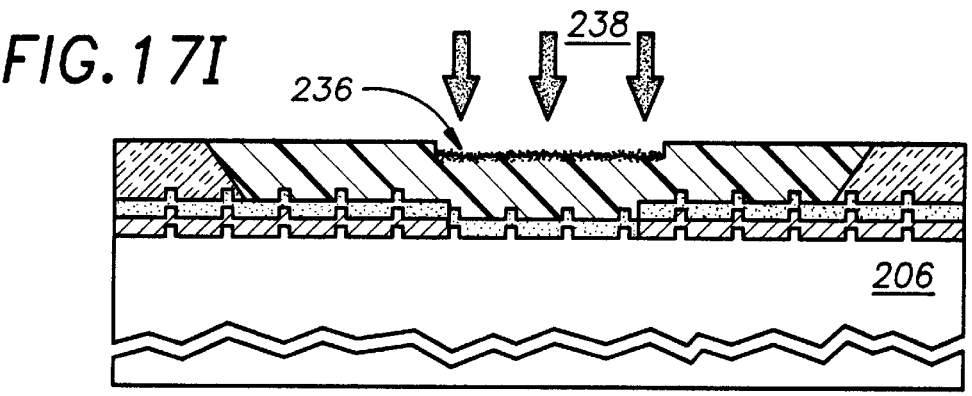

The poly-Si recess 234 is produced to provide a mechanism for forming a Lambertian, forward-scattering surface on the upper side of the mechanical tap beam. In this process, as shown in FIG. 17I, a solution of inert microscopic particles, e.g., a solution of polystyrene beads suspended in, e.g., water, is dip-coated onto the substrate. Given that the suspension is water-based, areas of the substrate away from the central scattering area can be coated with a hydrophobic layer so that the solution of particles adheres only to the desired scattering area. Given an alternative configuration in which the suspension is not water based, other surface coatings can be employed. The suspension of beads 236 settles into the 0.5 µm-deep recess formed in the previous steps. Given this settling mechanism, it is preferable that the recess be etched to a depth corresponding at least to the size of the beads to be used in this process. Once a layer of microscopic beads 236 has been supplied into the recess, a directed ion-beam etch 238 is undertaken to roughen the poly-Si surface in the area of the beads 236 in the recess. In one example process, an Ar ion beam is directed to the scattering area in a background gas of Cl. This results in a topology on the poly-Si surface corresponding to ion-beam induced damage produced in cooperation with the beads. Any bead remnants remaining in the recess are removed by standard procedure such as plasma ashing, rinsing with acetone and methanol, or other suitable cleaning procedure.

Figure 17J:
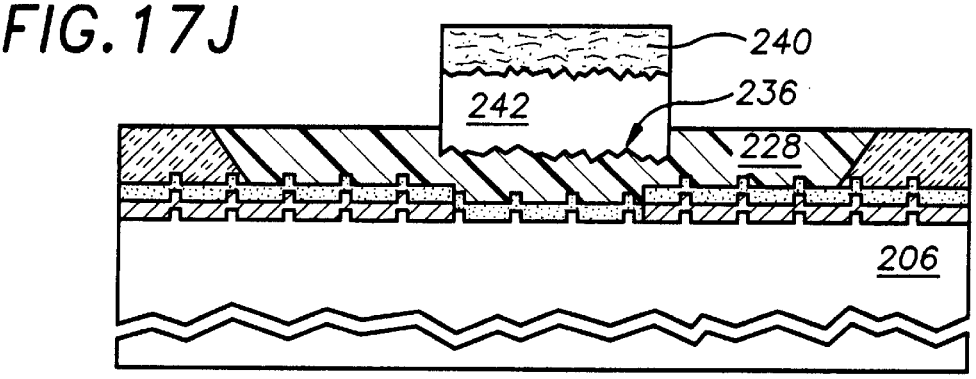

In a next process step for forming the forward-scattering surface, a layer of silicon dioxide is deposited as a thickness of, e.g., about 2 µm. This deposition may be produced by, e.g., LTO LPCVD. Then, as shown in FIG. 17J, a photoresist layer is deposited, exposed to a mask, and developed to produce photoresist islands 240 in the area corresponding to the recess 236 in the poly-Si 228. Note that the silicon dioxide fills in the recess 236. Thereafter, the unmasked silicon dioxide areas are etched, e.g., with a BHF chemical wet etch, to remove the unmasked silicon dioxide. The poly-Si and silicon nitride layers are effective etch stops for this silicon dioxide etch. This results in silicon dioxide islands 242 underlying each photoresist island 240.

Figure 17K:
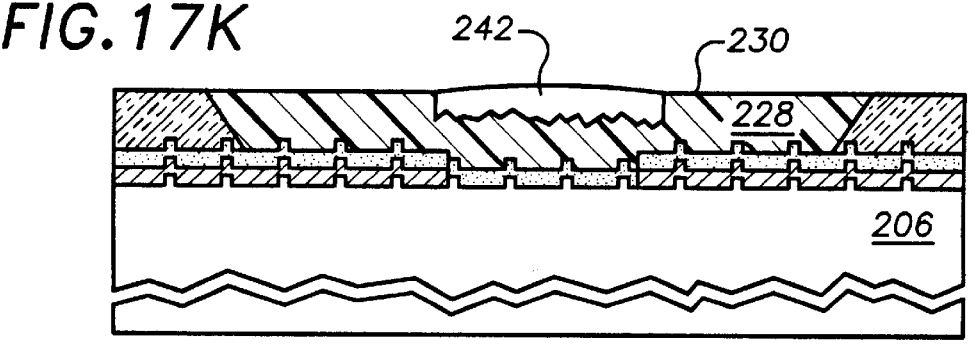

The photoresist is then removed, and the silicon dioxide islands 242 are chemically lapped using, e.g., a chemical polishing procedure like that described above. As shown in FIG. 17K, the chemical lapping or other etching process is preferably continued until the top surface of the silicon dioxide islands 242 substantially corresponds with the top surface 230 of the poly-Si 228. The silicon dioxide islands thereby become a filler material in the poly-Si recess.

The micromechanical tap beam material is then deposited. In the case of an actuation scheme in which the tap is actuated by a combination of electrostatic and mechanical restoring forces, the tap beam material preferably consists of, e.g., a silicon nitride film under tensile stress. For example, LPCVD silicon-rich silicon nitride is well-characterized as exhibiting a built-in tensile stress of between about $3 \times 10^9 - 3 \times 10^{10}$ dynes/cm$^2$; this range of tensile stress is adequate for the regime of restoring force employed to actuate the tap beam. If instead of a tensile restoring force, a compressive restoring force is desired, PECVD silicon nitride, can be employed as the tap beam material. PECVD silicon nitride exhibits a compressive stress in the range of $10^9-10^{10}$ dynes/cm$^2$. Standard plasma and low pressure chemical vapor deposition processes can be employed for producing such films, or other stochiometry of film that is in a desired state stress. If a three-electrode, electret, or other tap beam actuation scheme is employed, the tap beam material need not provide a specific internal restoring force, but it is preferable that the tap beam exhibit a degree of internal stress sufficient to hold the beam substantially level; i.e., such that the beam does not sag between supports. Polyimide, oxides such as silicon dioxide, various nitrides, or other materials can be employed in this case.

The composition of the mechanical tap beam material also provides a mechanism for tailoring the electrical conductivity of the mechanical tap beams. This is an important parameter based on the following considerations. During operation of the mechanical taps, periodic application of a potential difference between the mechanical tap and the light storage plate or viewing substrate can result in a build up of surface charge on the dielectric tap material. This build up can occur due to the periodic, polarizing field, through a slow drift of ions or electrons in the material, or by attraction of ionized particles in the ambient gas to the dielectric surface. When the applied potential difference is turned off, this charge remains on the tap material, and can result in an electrostatic field that holds the tap and substrate or plate together.

Although this tendency can be greatly reduced by reversing the polarity of the applied electric field periodically, if such a scheme is not feasible, it can also be reduced by providing a weak level of conductivity in the tap, preferably with a time constant greater than about, e.g., 10 msec, to provide a leakage path for any built up charge out of the mechanical tap. The resistivity of a silicon-rich silicon nitride film can be tailored to achieve a desired conductivity to address this attraction tendency.

Turning back to the example fabrication process, the silicon nitride film is blanket deposited to a thickness of, e.g., about 1 µm. Then the stand-offs (54 in FIG. 4) to be located on the lower side of the tap beams are formed on the top surface of the silicon nitride film; this top surface becomes the lower mechanical tap beam surface when the display is assembled. Recall that the tap beam stand-offs are employed to reduce Van der Walls sticking forces and to achieve a desired degree of optical coupling between the light storage plate and the tap beam for various beam pixel magnitudes.

A blanket layer of photoresist is deposited and then exposed and developed to produce a pattern corresponding to arrays of stand-offs, each array located at a point on the silicon nitride layer that corresponds to a silicon dioxide-filled recess under the silicon nitride layer. A conventional plasma-assisted ion-beam etch, or other suitable etch, is then undertaken to etch the unmasked silicon nitride layer by about, e.g., 200 Å, whereby stand-offs corresponding to the 200 Å etch are produced. The photoresist is then removed and the wafers cleaned.

At this point, stand-offs (shown in FIG. 4) exist on the top surface of a silicon nitride layer that forms the mechanical tap beam material. Then, as shown in the figure, a metal layer is deposited and patterned to form column electrodes for the underside of each mechanical tap beam. Here a layer of metal, e.g., a 1000 Å-thick layer of a chromium-platinum alloy, is evaporated, after which photoresist is deposited and patterned to mask the areas of the metal corresponding to the tap beam column electrodes. The unmasked metal areas are then etched by, e.g., a plasma-assisted ion beam etch, to define the column electrodes. Note that the topology of the stand-offs is replicated in the metal layer topology.

Preferably, this metal deposition and etch step also produces the geometry of metal column electrode connections at the ends of each of the beams in the manner that that the line electrode metal deposition and etching on the viewing substrate produced line electrode connections. In the case of column electrode connections, each beam preferably is provided with a metal column connection geometry and any necessary wiring pattern for configuring the beam for its intended pixel bit position and for making connection to a corresponding column driver circuit like that shown in FIG. 12. As with the metal line circuit connections, the metal column circuit connections at the ends of the beams might in some cases preferably be thicker than the metal columns. Repeated metal deposition and etching steps can be employed to accomplish this or alternatively, separate metal deposition and etching steps can be employed for constructing the column lines and the column line connections.

Next the mechanical tap beams are themselves defined in the silicon nitride layer. Photoresist is blanket deposited, exposed, and developed to produce a pattern of tap beams that correspond to the tap beam column electrodes, and to produce a pattern of tiny holes on each tap beam. The pattern of holes covers the entire beam; i.e., the holes are also located on the areas covered with column electrode metal. Then the unmasked electrode and beam materials are etched. The electrode geometry is thereby produced using, e.g., a standard lift-off process, and the silicon nitride is etched using, e.g., a Cl-based plasma etch process. This etch stops on the poly-Si underlying the silicon nitride layer. The etch thereby defines the lateral extent of each mechanical tap beam.

The etch also produces holes (not shown) through the thickness of the column electrodes and the mechanical tap beam corresponding to the mask holes. These holes provide two functions. First, they allow liquid etchant to penetrate through the tap beam element and attack the sacrificial poly-Si layer in a last surface micromachining release step. In operation of the mechanical taps, they also provide an escape route for any air trapped between a tap beam and either the light storage plate or the viewing substrate as the tap beam is actuated toward the plate or substrate. The holes are preferably of such a small size in relation to the overall tap beam size that they do not impact the mechanical properties of the tap beam.

The top surface of the beams is then blanket coated with a layer of silicon dioxide of about, e.g., 2 $\mu$m in thickness, produced by, e.g., a low temperature chemical vapor deposition process that forms $SiO_2$. This silicon dioxide layer defines the spacers (48 in FIG. 4) that separate the mechanical tap beam from the light storage plate. The thickness of the silicon dioxide layer is set by the desired mechanical tap configuration; as explained earlier, in some configurations the spacers are shorter than the light storage plate mesa (e.g., the normally "on" configuration) while in others they preferably are taller than the mesa. The silicon dioxide layer thickness is accordingly set for a desired spacer height.

A blanket coating of positive photoresist is then deposited and exposed to a mask defining the spacer locations. After development of the resist, the substrate is then exposed to an isotropic chemical wet etch, e.g., BHF, or a dry etch, to remove the unmasked oxide. This etch results in spacers 48 as shown in FIG. 4, that will space the tap beams from the light storage plate once assembled. This oxide deposition and etching process can be employed to simultaneously produce a bordering oxide O-ring for later use in attaching the light storage plate to the viewing substrate. Such an O-ring (not shown) consists of a continuous oxide strip located at the periphery of the quartz plate.

At this point in the fabrication process, the mechanical tap beams are laterally defined and are lying on a poly-Si layer and silicon dioxide supports. The mechanical tap beams are released such that they are free to move vertically by way of removal of the underlying poly-Si sacrificial layer. This is accomplished by, e.g., submerging the entire substrate into an etch solution that preferentially attacks poly-Si and does not substantially attack silicon nitride, silicon dioxide, or metal alloys. Example poly-Si preferential etches include, e.g., potassium hydroxide-water solutions (KOH), sodium hydroxide-water solutions (NaOH), Ethylenediamine Pyrocatechol-water solutions (EDP), and $HF:HNO_3$. The doping level of the poly-Si and the deposition conditions of all the materials in a given fabrication sequence determine the specific etch selectivity of each material to a selected etchant in a given fabrication process. The arrays of holes produced in the mechanical tap beams aids in delivering the etchant to the underlying poly-Si layer at points along the tap beam width. As a result, the etchant can completely undercut the width of the beams by attacking various lateral areas simultaneously, rather than propagating inward from the edges of the beams. This decreases the required etch time and in turn, this reduces the required etch selectivity of the materials used.

As is well-known, strong attractive forces can be generated between released structures and the underlying substrate when, at the end of a micromachining release etch procedure, the substrate is removed from the etch solution. The three main causes of such forces have been identified as liquid surface tension, Van der Waals forces, and electrostatic forces. Typically, these forces draw a released element to the substrate and hold the element there with a force greater than that which can reasonably be applied to counteract the force.

In an effort to minimize such forces, any one of several possible post sacrificial etch rinses is preferred. In one such rinse procedure, the substrate is maintained in the etch bath at the end of the etch period and the bath is diluted/flushed with water until the bath includes only water. This can be accomplished by, e.g., positioning a tube in the bath that is connected to a water source and allowing the bath liquid to run over the sides of the bath container into, e.g., an acid waste sink.

The water bath is then continually flushed with additional water for some period of time, e.g., 5 minutes. At this point, the water bath is then diluted/flushed with an alcohol, e.g., methanol, until the bath liquid includes only the alcohol. This alcohol flushing is then maintained for some period of time, e.g., 5 minutes. Then the bath, with the substrate remaining in bath, is subjected to, e.g., a high temperature environment such as an oven set at 65° C. The oven temperature is selected based on the particular alcohol used; the temperature is preferably high enough to boil the alcohol and effectively evaporate the bath solution. Alternatively, the bath solution can be freeze-dried in a vacuum chamber. In either case, the bath solution is preferably converted directly from a liquid to a vapor, whereby strong surface tension forces are not created, and the released mechanical tap beams are not attracted to or "stuck" to the substrate. If a final boiling or freeze drying step cannot be accomplished, a final rinsing with a low surface tension liquid such as methanol is preferred to provide some degree of surface tension reduction.

At the completion of the micromachining release etch, the mechanical tap beams 28, as shown in FIG. 4, are suspended over the area where the poly-Si was removed and are supported by the silicon dioxide supports 222 as shown in FIG. 17G. A Lambertian forward-scatter surface 32 is formed on the beam by a silicon dioxide protrusion 242 as shown in FIG. 17K that corresponds to the depth of the recess formed in the poly-Si in earlier steps. Once removed from the etch bath container, the substrate is preferably kept in a dry box and protected from dust and other contaminants until it is assembled in the display configuration.

In assembly of a flat panel display employing the fabricated mechanical tap beams, the viewing substrate 206 is aligned with the light storage plate 200 such that the array of mesas 26 on the light storage plate spatially corresponds to the array of Lambertian scattering surface areas 242 on the mechanical tap beams and the optical aperture 43 in the line electrodes of the viewing substrate 206. This lateral alignment is shown in FIG. 4.

After aligning the light storage plate with the viewing substrate, the plate and substrate are pressed against the spacers and O-ring such that in, e.g., a normally "on" configuration, the lower surface of the mechanical tap beams are each in contact with a corresponding light storage plate mesa. Once in proper alignment and in contact, an adhesive sealant, e.g., a type of caulk, is applied along the outer edge of the O-ring around a majority of the circumference of the O-ring. Then, the ambient gas in the space between the plate and the substrate is partially evacuated and a selected gas is optionally introduced. This gas can consist of dry air, nitrogen, or other suitable gas. Once a desired level of evacuation is obtained, the remaining circumference of the O-ring is adhesively sealed with, e.g., caulk. The substrate and plate are held together by the differential air pressure and by the adhesive sealant along the edges of the O-ring circumference. At this point the mechanical tap beam elements are protected by virtue of the sealed environment formed between the light storage plate and the viewing substrate. Although this configuration is preferable for maintaining mechanical integrity of the taps, the mechanical tap array can alternatively be operated without use of a viewing substrate, as explained earlier.

Final assembly steps for manufacturing the flat panel display are directed to connection of electronics and optical sources to the display. In one example assembly sequence, conventional flip-chip bonding techniques are employed to attach line and column driver chips and associated timing and control circuitry to the column and line electrode connections formed previously, at the periphery of the viewing substrate.

In a final assembly step, light sources are configured at one or more edges of the light storage plate. As explained in detail above, the light sources are preferably attached in a configuration whereby efficient, direct coupling of light from the light sources into the storage plate is achieved and total internal reflection of light injected into the plate is maintained. Accordingly, it is preferred that an index matching fluid be employed to affix the optical source prism wedges to the light storage plate such that substantially true optical contact is obtained between the surfaces.

The light sources and their connections to the light storage plate, as well as the electronics on the periphery of the viewing substrate, can be protected with an outer peripheral housing (not shown) that encloses edges of the display such that the electronics and light sources are mechanically protected from, e.g., tampering. Plastic, metal, or combination materials can be employed for such a housing in any convenient geometry that provides adequate protection.

As explained previously, many alternative fabrication and assembly techniques are contemplated by the invention. For example, an array of rectangular or hexagonal pieces of fused quartz, each on the order of, e.g., inches, can be mechanically attached to each other in an array to produce either or both a composite quartz light storage plate and composite viewing substrate of much larger dimensions. Such a composite display configuration has obvious disadvantages, including imperfect optical coupling between quartz pieces and suboptimal viewer appearance. However, as mentioned previously, if a fabrication facility cannot accommodate a desired quartz piece size, a composite scheme might provide an adequate alternative. Electrical connections on a composite quartz viewing plate, such as the line electrodes, can be coupled between quartz pieces of the array by, e.g., silk screen processes or other such printing techniques.

As will be recognized by those skilled in the art, the light storage plate, viewing substrate, and mechanical tap beam components of the flat panel display can be formed from any of a range of materials other than those specifically described in the fabrication sequence above. Considerations of material performance for a given cost guide materials selection. For many applications, microelectronic materials and fabrication processes provide the most cost effective components and manufacturing techniques for a given cost. Aside from silicon nitride, mechanical tap beams could be formed of silicon dioxide or other dielectric material, including, e.g., polymer materials. Whatever tap beam material is selected, it preferably exhibits etch resistance to an etchant of the material selected as a sacrificial layer for releasing the tap beams. Accordingly, e.g., poly-Si can be employed as a sacrificial layer companion material to a silicon dioxide tap beam material, or silicon dioxide or silicon nitride can be employed as a sacrificial layer companion material to a poly-Si tap beam material. Alternatively, a conventional bulk micromachining process can be employed wherein, e.g., bulk silicon in the form of silicon wafers is etched and subsequently bonded together to produce an array of suspended single crystal silicon tap beams. As will be understood by those skilled in the art, other beam materials and surface or bulk micromachining schemes are also suitable.

Considering manufacturing processes other than those associated directly with microelectronics, the mechanical tap beam configuration and flat panel display of the invention can be manufactured by way of a plastic molding and printing process in accordance with the invention. While the fabrication sequence described above employs many fewer processing steps than conventional display manufacturing sequences, the plastic molding process of the invention further simplifies display manufacture by eliminating micromachining steps.

Figure 18A:
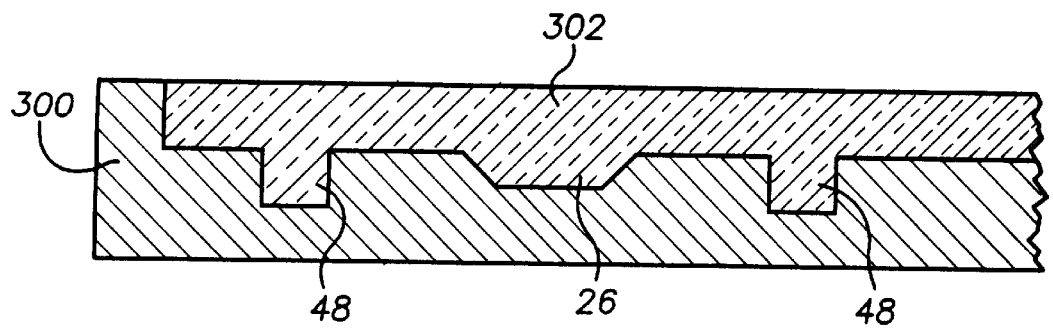
FIGS. 18A–18G are schematic views illustrating fabrication steps for a second flat panel display manufacturing process in accordance with the invention.
Figure 18B:
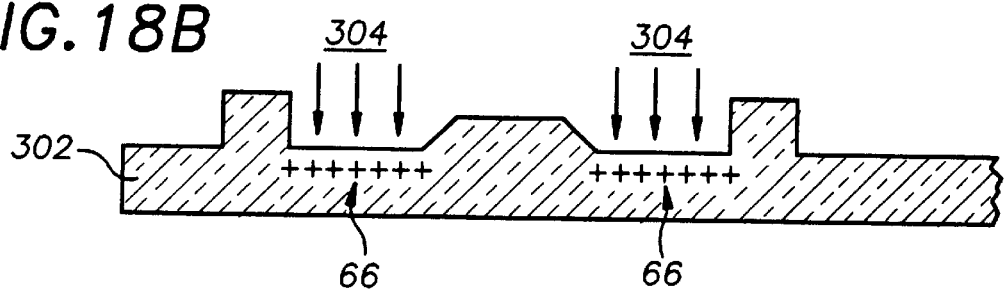

Referring to FIG. 18A, in a first step of the plastic display manufacturing process, a mold 300, e.g., a machined metal mold, is formed with standard molding techniques to produce a mold geometry for a plastic light storage plate. This plastic light storage plate is then cast in the mold via conventional plastic molding processes. A plastic material such as polystyrene, polycarbonate, or other suitable clear plastic material with good transparency to wavelength of interest, is cast in the mold to produce a cast light storage plate 302. The cast light storage plate includes topology defining mesas 26 and spacers 48 in accordance with the mechanical light tap geometry of FIG. 4. Once cast, the plastic light storage plate 302, is removed from the mold and as shown in FIG. 18B, an electret 66 is ion implanted 304 in the plate to produce a static layer of charge for electrostatically actuating a mechanical tap beam. Alternatively, a metal layer such as aluminum, silver, or other standard conducting vacuum-deposited material is deposited on the plate to provide both an actuating electrode and a high-reflectivity mirror surface.

Figure 18C:
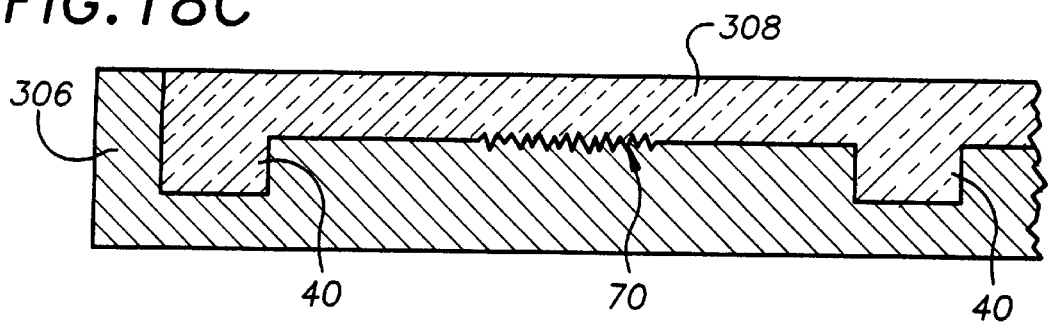
Figure 18D:
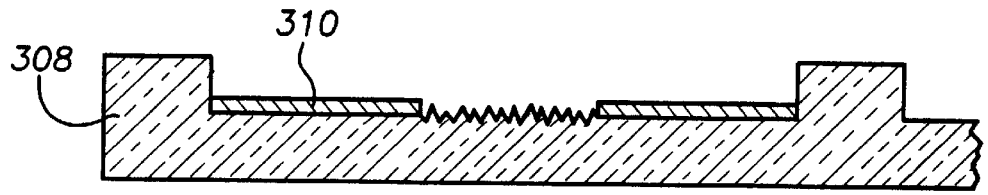

Next, as shown in FIG. 18C, a plastic viewing substrate is molded. Here, a metal mold 306, or other suitable mold is machined to provide topology for a plastic viewing substrate 308. Like the plastic light storage plate, the viewing substrate is formed of polystyrene, polycarbonate, teflon, or other suitable plastic material with at least moderate transparency for the wavelengths of interest. The cast viewing substrate includes topology defining supports 40 for supporting a mechanical tap beam, and optionally a roughened central region 70 corresponding to the light coupling region for providing effective optical scattering as previously described. Line electrodes 310 of a suitable metal are then deposited on the cast viewing substrate; an optical absorbing layer, e.g., black paint or CrO is preferably deposited under the line electrodes or provided by the line electrodes themselves to reduce reflection of room light and emergence of stray light into a viewing volume adjacent the viewing substrate in operation.

Preferably, either or both the plastic molded viewing substrate and light storage plate include a spacer line that forms an O-ring around their periphery for affixing the light storage plate to the viewing substrate later in the manufacturing sequence. As shown in FIG. 8, such an O-ring preferably is located at a point that accommodates both a large display area and regions at the periphery of the display for supporting electronics.

A plastic mechanical tap beam sheet 312 is then obtained or produced of, e.g., polystyrene or polycarbonate to provide a flexible plastic support layer of, e.g., about 2–3 $\mu$m in thickness, on which an array of mechanical tap beams will be defined. The layer, suspended in, e.g., a suitable frame, is held under moderate tension. A central roughened region 32 is preferably provided to ensure effective optical scattering of light coupled into the tap beam in operation, as explained earlier. This roughed region can be produced using, e.g., a solution of 0.1–0.5 $\mu$m polystyrene spheres like that discussed in the previous process. Here, the tap beam sheet is dipped into such a solution of spheres; upon removal of the sheet from the solution, the spheres are adherent to the sheet due to surface tension. If the solution is water-based, a hydrophobic layer can be deposited on the tap beam sheet in areas outside of the region to be roughened such that the spheres substantially adhere only to the desired central region. The sheet bearing a film of spheres is then heated to partially melt the spheres such that they fuse with the plastic film. Once fused, the spheres provide an excellent optical scattering surface. This is but one of many suitable techniques for roughening a region of the tap beam sheet and as will be recognized by those skilled in the art, many alternative processes can be successfully employed, such as stamping, rolling, or etching processes. No particular process is required by the invention; whatever process is selected, it preferably provides an effective optical scattering mechanism.

Figure 18E:
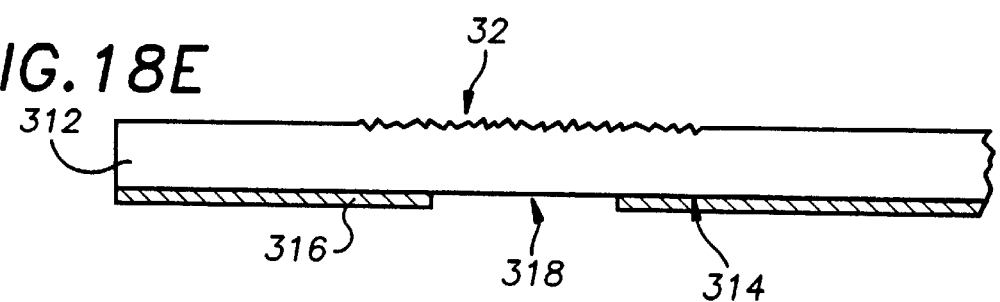
Figure 18F:
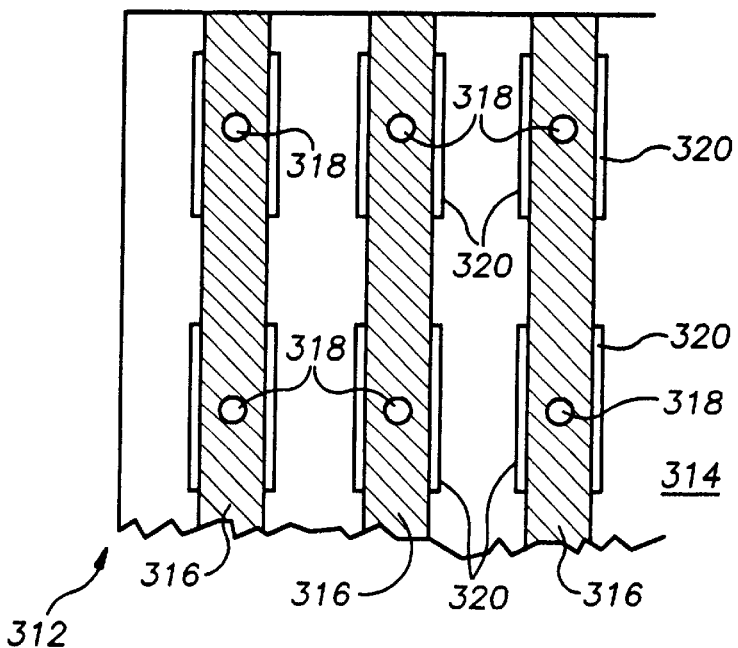

On the tap beam sheet surface opposite the scattering region, i.e., on the lower surface 314 of the tap beam sheet 312, as shown in FIGS. 18E and 18F, there is then provided an array of tap beam column electrodes 316. Silver, aluminum, copper, or other suitable conductor can be employed to form such electrodes using, e.g., standard electroplating or vacuum deposition techniques. Preferably, the metal selected is about 0.2–2.0 $\mu$m-thick and is both flexible and in at least a minimal state of tension such that each tap beam defined by the column electrode is held flat and does not become limp. In some applications, it may be preferable to coat the column electrodes with a suitable dielectric layer such that in operation the electrodes do not short out with the lower electrode on the light storage plate. Such dielectric layer can be formed of, e.g., a layer of oxide or a conformable plastic layer.

Each beam column electrode defines the actuating electrode for the series of tap beams that are together defined in series by a singe column. Accordingly, each beam electrode column includes an aperture 318 at the location of each roughened optical scattering region situated on the other side of the sheet. These apertures correspond to the mesa contact areas at which the tap beams in a given column make contact to the light storage plate in operation.

In combination with the column electrodes, each mechanical tap beam is individually defined on the sheet by way of slots 320 that preferably consist of, e.g., punched or chemically etched holes of about, e.g., 50 $\mu$m in width located on the sides of each column electrode 316 in the region around each aperture 318. These slots permit the local area of the tap beam sheet supporting a given column electrode in the area of a given slot pair to vertically move in a substantially mechanically isolated manner, and thus be electrostatically actuated in isolation from other tap beams defined by the same column electrode. The slots can be produced by, e.g., a punching process, laser ablation process, lithography, or other suitable technique. This scheme is particularly advantageous in that it produces an entire array of tap beams simultaneously and does so with relatively simple process techniques.

Figure 18G:
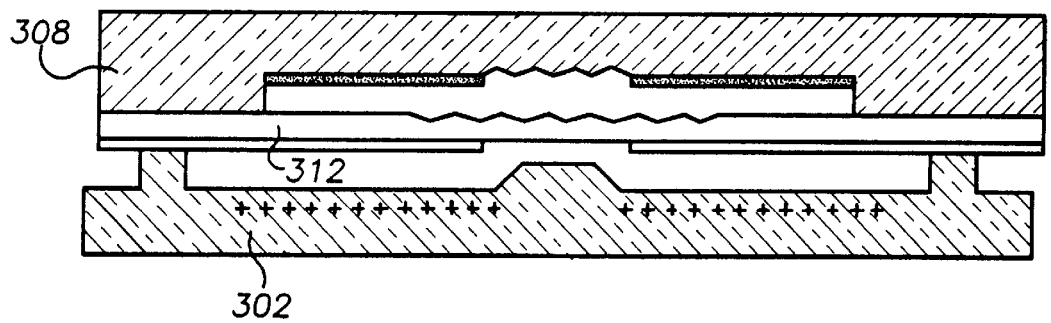

Next in the manufacturing sequence, the light storage plate, viewing substrate, and tap beam sheet are aligned, as shown in FIG. 18G, such that the array of mesas on the light storage plate is aligned with the array of apertures on the tap beam sheet and the tap beam and viewing substrate line and column electrodes are aligned in the criss-cross pattern of FIG. 11. The light storage plate and viewing substrate are then affixed together by way of the peripherally-located O-ring. The evacuation and sealing technique described in the previous manufacturing sequence is preferably followed here as well. A glue such as a UV-curable glue can also optionally be provided on, e.g., the tap beam sheet in the location of the storage plate spacers and viewing substrate supports to affix the three components together, but this additional step is not required.

As with the previous manufacturing process described, the line and column electrodes preferably include electronics connections and accommodate support of electronics on the viewing substrate. At this point in the assembly, the electronics are affixed to the substrate and connected to the appropriate column and line electrodes. Then an optical source is connected to one or more edges of the display and an outer housing such as a plastic cover is positioned over the optical source and the electronics. With this assembly, a mechanical flat panel display is formed substantially entirely of plastic and assembled in an elegantly simple and inexpensive manufacturing procedure. An electret configuration, a three-electrode configuration or other actuation scheme, e.g., electrostatic/mechanical, can be employed. This process highlights the adaptability of the mechanical optical switch and display scheme to a wide variety of manufacturing techniques that are both less complicated and less expensive than conventional display manufacturing techniques.

Figure 19:
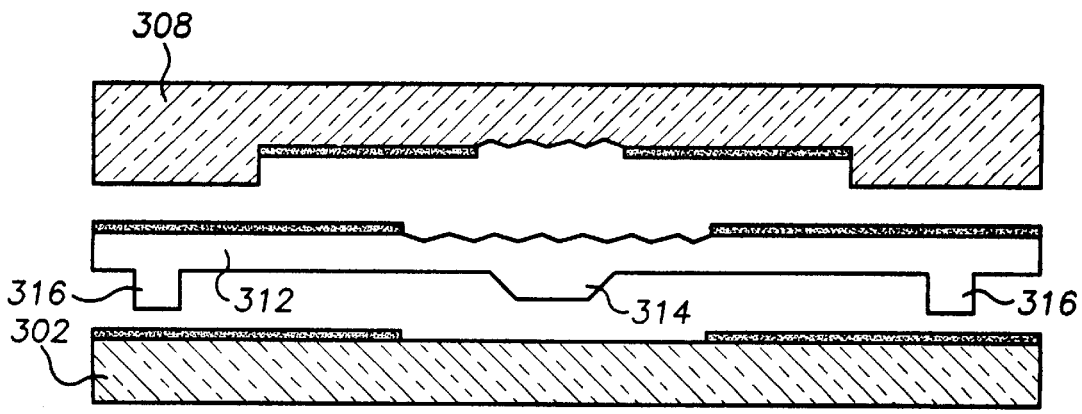
FIG. 19 is a schematic side view of a seventh example optical switch in accordance with the invention.

Indeed, the flexibility of the design and manufacturing process accommodates alternative geometries for the various supports and spacers of the plastic display. For example, as shown in the exploded schematic view of FIG. 19, the tap beam sheet 312 can be molded to provide a tap beam mesa 314 and tap beam supports 316. In this case, the light storage plate 302 can be molded as a feature-less, flat piece. In addition to ease of manufacture, such a light storage plate has few edges where internally reflected light might "leak out" of the plate. While FIG. 19 shows the viewing plate as including supports for spacing apart the tap beam sheet, such supports could additionally be molded into the tap beam sheet as well. This more complex tap beam sheet can be formed by embossing, rolling, stamping, molding, or other similar process for producing the mesa and support protrusions, as well as any stand-offs to suppress contact forces.

Whatever manufacturing process is used, the mechanical tap configuration of the invention can be employed in a wide range of display architectures, as well as other optical switch-based applications. Television displays, table top computer displays, monitor displays, kiosks, equipment monitors, and the like all achieve superior design and performance with the invention due to the flat, compact configuration of the display and the low power dissipation achieved by the control scheme, among the many other features previously discussed.

Aside from display applications, the mechanical tap configuration of the invention can also be used as an optical switch, for example, in applications such as optical relay or circuit breaker systems, two-dimensional digital optical computing, and other such optical switch applications. For example, the mechanical tap configuration can be employed to selectively radiate energy from an array of waveguides, whereby a single pole-multiple throw optical switch is produced. Optical multiplexing and opto-isolation schemes are accordingly enabled by the invention. As will be recognized by those skilled in the art, this is a short listing of the many switch and display schemes made possible by the mechanical tap configuration.

From the foregoing, it is apparent that the optical mechanical tap switches and flat panel displays described above not only provide fast, efficient, and reliable optical switching and display, but do so with elegantly uncomplicated components and system configurations that significantly improve the attainable optical switch and display performance, while at the same time reducing manufacturing cost and complexity. It is recognized, of course, that those skilled in the art may make various modifications and additions to the preferred embodiments described above without departing from the spirit and scope of the present contribution to the art. Accordingly, it is to be understood that the protection sought to be afforded hereby should be deemed to extend to the subject matter of the claims and all equivalents thereof fairly within the scope of the invention.

I claim:

1. An optical coupling switch comprising:
   a light storage plate having a coupling surface, the light storage plate being adapted to internally reflect light injected into the plate;
   a light tap disposed in a selected spaced relationship with the light storage plate coupling surface for coupling internally reflected light out of the light storage plate and into the light tap when the light tap is brought into coupling proximity with the light storage plate coupling surface, the light tap including actuation means responsive to an applied electric field for causing the light tap to move to positions toward and away from the light storage plate coupling surface, and the light tap being configured with a stress condition that is selected to constrain movement of the tap in response to an applied electric field to only designated stable positions; and
   scattering means configured to enable coupled light to penetrate the light tap, for scattering light that is coupled into the light tap.

2. The optical switch of claim 1 wherein the scattering means comprises a scattering surface.

3. The optical switch of claim 2 wherein the scattering surface comprises a textured surface of the light tap.

4. The optical switch of claim 3 wherein the light tap textured surface comprises surface asperities.

5. The optical switch of claim 3 wherein the light tap textured surface comprises a surface grating.

6. The optical switch of claim 1 wherein the scattering means comprises a scattering medium.

7. The optical switch of claim 6 wherein the scattering medium comprises a fluorescent medium.

8. The optical switch of claim 6 wherein the scattering medium comprises a luminescent medium.

9. The optical switch of claim 6 wherein the scattering medium comprises a translucent medium.

10. The optical switch of claim 1 wherein the light storage plate comprises at least one coupling mesa located on the coupling surface in correspondence with the light tap to define the coupling proximity between the light tap and the light storage plate.

11. The optical switch of claim 1 wherein the light tap comprises at least one light tap mesa located on the light tap in correspondence with the light storage plate coupling surface to define the coupling proximity between the light tap and the light storage plate.

12. The optical switch of claim 1 wherein the light tap is characterized by an internal mechanical restoring force that opposes an electrostatic force generated in response to an applied electric field, and wherein the light tap is mechanically biased in coupling proximity with the light storage plate by the mechanical restoring force and is moved out of coupling proximity with the light storage plate by an applied electric field.

13. The optical switch of claim 1 wherein the light tap is characterized by an internal mechanical restoring force that opposes an electrostatic force generated in response to an applied electric field, and wherein the light tap is mechanically biased out of coupling proximity with the light storage plate by the mechanical restoring force and is moved into coupling proximity with the light storage plate by an applied electric field.

14. The optical switch of claim 1 wherein the light tap is biased in coupling proximity with the light storage plate by an applied electric field and is moved out of coupling proximity with the light storage plate by an applied electric field.

15. The optical switch of claim 1 further comprising a viewing plate disposed adjacent to the light tap.

16. The optical switch of claim 3 wherein the textured scattering surface of the light tap comprises a reflective scattering surface for reflectively scattering light coupled into the light tap back through the light storage plate to emerge into a viewing volume adjacent to the light storage plate.

17. The optical switch of claim 3 wherein the textured scattering surface of the light tap comprises a forward scattering surface for scattering light coupled into the light tap into a viewing volume adjacent to the light tap.

18. The optical switch of claim 17 further comprising a viewing plate, disposed adjacent to the light tap, through which the forward scattered light emerges into the viewing volume.

19. The optical switch of claim 18 wherein the viewing plate comprises a forward scattering surface for scattering light emerging through the viewing plate into the viewing volume.

20. The optical switch of claim 1 wherein the light tap comprises a conducting electrode.

21. The optical switch of claim 20 further comprising a conducting electrode disposed on the light storage plate in proximity with the light tap conducting electrode for generating an electrostatic force.

22. The optical switch of claim 18 wherein the light tap comprises a conducting electrode, and wherein the viewing plate comprises a conducting electrode disposed in proximity with the light tap conducting electrode for generating an electrostatic force.

23. The optical switch of claim 22 further comprising a conducting electrode disposed on the light storage plate in proximity with the light tap conducting electrode for generating an electrostatic force.

24. The optical switch of claim 20 further comprising an electret embedded in the light storage plate in proximity with the light tap conducting electrode for generating an electrostatic force.

25. The optical switch of claim 18 wherein the light tap comprises a conducting electrode, and wherein the viewing plate comprises an electret embedded in the viewing plate in proximity with to the light tap conducting electrode for generating an electrostatic force.

26. The optical switch of claim 1 wherein the scattering means comprises a Lambertian scattering surface.

27. The optical switch of claim 15 wherein the light tap is anchored to the viewing plate by at least one support located at a point on the tap that permits flexing of the tap, and wherein the viewing plate is secured to the light storage plate.

28. The optical switch of claim 27 further comprising a light source located at a peripheral edge of the light storage plate.

29. The optical switch of claim 1 wherein the light storage plate is formed of a glassy material.

30. The optical switch of claim 29 wherein the light storage plate is formed of quartz.

31. The optical switch of claim 1 wherein the light storage plate is formed of plastic.

32. The optical switch of either of claims 12 or 13 wherein the light tap is formed of silicon nitride.

33. The optical switch of claim 32 wherein the silicon nitride light tap is characterized as being in a state of internal tensile stress.

34. The optical switch of claim 1 wherein the light tap is formed of plastic.

35. The optical switch of claim 1 wherein the light tap is formed of a microelectronic material.

36. The optical switch of claim 15 wherein the viewing plate is formed of plastic.

37. The optical switch of claim 15 wherein the viewing plate is formed of a glassy material.

38. The optical switch of claim 37 wherein the viewing plate is formed of quartz.

39. The optical switch of claim 1 wherein the light tap further comprises protrusions on a surface of the light tap facing the light storage plate, the protrusions permitting coupling of light into the light tap but suppressing contact forces between the light tap and the light storage plate.

40. The optical coupling switch of claim 1 wherein the selected stress condition configuration of the light tap comprises a selected stress in a material layer of the light tap.

41. The optical coupling switch of claim 1 wherein the stress condition configuration of the light tap is selected to constrain movement of the tap in response to an applied electric field to only three designated stable positions.

42. The optical coupling switch of claim 1 wherein the stress condition configuration of the light tap is selected to constrain movement of the tap in response to an applied electric field to only two designated stable positions.

43. An optical display comprising:

a light storage plate having a coupling surface and a back surface, the light storage plate being adapted to internally reflect light injected into the plate;

an array of light taps disposed in a selected spaced relationship with the light storage plate coupling surface for coupling internally reflected light out of the light storage plate into one or more light taps in the array when one or more of the light taps are in coupling proximity with the light storage plate, each light tap including a scattering surface configured to enable coupled light to penetrate the light tap, for scattering light that is coupled into the light tap, each light tap further including actuation means responsive to an applied electric field for causing the light tap to move to positions toward and away from the light storage plate coupling surface, and each light tap being configured with a stress condition that is selected to constrain movement of the tap in response to an applied electric field to only designated stable positions;

a light source disposed at an edge of the light storage plate for injecting light into the plate; and control circuitry connected to the array of light taps for applying an electric field to selected one or more of the light taps in the array.

44. The optical display of claim 43 wherein each light tap is characterized by an internal mechanical restoring force that opposes an electrostatic force generated in response to an applied electric field, and wherein each light tap is mechanically biased in coupling proximity with the light storage plate by the mechanical restoring force and is moved out of coupling proximity with the light storage plate by an applied electric field.

45. The optical switch of claim 43 wherein each light tap is biased in coupling proximity with the light storage plate by an applied electric field and is moved out of coupling proximity with the light storage plate by an applied electric field.

46. The optical switch of claim 43 wherein the light storage plate comprises an array of coupling mesas on the coupling surface, the coupling mesa array being located in correspondence with the light tap array to define the coupling proximity between each light tap and the light storage plate.

47. the optical display of claim 43 wherein each light tap comprises at least one coupling mesa located on the light tap in correspondence with the light storage plate coupling surface for defining the coupling proximity between the light tap and the light storage plate.

48. The optical display of claim 43 further comprising a viewing plate disposed adjacent to the light tap array, and wherein the scattering surface of each light tap comprises a forward scattering surface for scattering light that is coupled into a given light tap through the viewing plate into a viewing volume adjacent to the viewing plate.

49. The optical display of claim 43 wherein the light source is configured adjacent to an edge of the light storage plate such that light injected into the light storage plate undergoes total internal reflection.

50. The optical display of claim 49 further comprising a second light source disposed at an edge of the light storage plate.

51. The optical display of claim 43 further comprising a second light source disposed at a location on the back surface of the light storage plate.

52. The optical display of claim 49 wherein the light source comprises means for producing at least two different colors of light.

53. The optical display of claim 48 wherein each light tap in the light tap array comprises a conducting electrode, and wherein the viewing plate comprises an array of electrodes disposed on the viewing plate in correspondence with the array of light tap electrodes for producing an electrostatic force.

54. The optical display of claim 53 wherein the control circuitry comprises line and column electrode drive circuits and a controller for applying an electric field between selected one or more light tap and viewing plate electrodes in the array.

55. The optical display of claim 43 wherein the array of light taps forms an array of pixels, each pixel designated by a set of n light taps corresponding to a number n of pixel bits, each of the n light taps in a given pixel being controlled by the control circuitry to together produce for a given pixel one of a number $2^n$ of possible optical intensities.

56. An optical display comprising:
   a plastic light storage plate having a coupling surface, the light storage plate being characterized by a refractive index such that light injected into the plate is internally reflected;
   an array of light taps formed of a plastic layer disposed in a selected spaced relationship with the light storage plate coupling surface for coupling internally reflected light out of the light storage plate into one or more of the light taps in the array, each light tap in the array free to individually move into coupling proximity with the light storage plate, each light tap including scattering means configured to enable coupled light to penetrate the light tap for scattering light that is coupled into the light tap, each light tap further including actuation means responsive to an applied electric field for causing the light tap to move to positions toward and away from the light storage plate coupling surface, and each light tap being configured with a stress condition that is selected to constrain movement of the tap in response to an applied electric field to only designated stable positions;
   a light source disposed at an edge of the light storage plate for injecting light into the plate; and
   control circuitry connected to the plastic sheet for applying an electric field to selected one or more of the light taps in the array.

57. The optical display of claim 56 further comprising a plastic viewing plate disposed adjacent to the light tap array plastic sheet.

58. The optical display of claim 57 wherein the plastic viewing plate comprises scattering means for scattering light emerging through the viewing plate into a viewing volume.

59. The optical display of claim 56 wherein the array of light taps comprises an array of conducting column electrodes disposed on the plastic sheet.

60. The optical display of claim 59 wherein the plastic viewing plate comprises an array of conducting line electrodes disposed on the viewing plate in correspondence with the column electrodes on the plastic sheet for producing an electrostatic force.

61. The optical display of claim 59 wherein the plastic sheet comprises an array of slots bordering the column electrodes.

62. The optical display of claim 56 wherein the plastic light storage plate comprises plastic spacer protrusions for holding the plastic sheet separated from the light storage plate.

63. The optical display of claim 57 wherein the plastic viewing plate comprises plastic support protrusions for holding the plastic sheet separated from the viewing plate.

* * * * *

UNITED STATES PATENT AND TRADEMARK OFFICE
CERTIFICATE OF CORRECTION

PATENT NO. : 5,771,321
DATED : June 23, 1998
INVENTOR(S) : Ernest Stern

It is certified that error appears in the above-identified patent and that said Letters Patent is hereby corrected as shown below:

Title page,
Item [56], References Cited, FOREIGN PATENT DOCUMENTS, the following should not appear:

"0259051  3/1988  European Pat. Off.
 0280279  8/1988  European Pat. Off.
 0295130 12/1988  European Pat. Off.
 0459688 12/1991  European Pat. Off.
 0495400  7/1992  European Pat. Off.
 2274123  1/1976  France
 2302536  9/1976  France
 2319912  2/1977  France
 2336026  7/1977  France
 2543729 10/1984  France
 2549235  1/1985  France
 2902259  7/1980  Germany
 3839109  5/1990  Germany
 4128935  9/1992  Germany
 2040063  8/1980  United Kingdom
 2180665  4/1987  United Kingdom
 2215084  9/1989  United Kingdom
 9318423  9/1993  WIPO ".

Column 6,
Lines 21 and 25, each occurrence of "$\theta_i$" should read -- $-\theta_i$ --.

Column 8,
Line 28, "$E_e=E_i e^{\alpha z}$" should read -- $E_e=E_i e^{-\alpha z}$ --.

Column 16,
Line 47, "$\alpha_i=(F_e(x_i)+F_m(y_i))/pwhd$" should read -- $a_i=(F_e(x_i)+F_m(y_i))/pwhd$. --.
Line 52, "$v_i=v_{i-1}+\alpha_i \Delta t_i$" should read -- $v_i=v_{i-1}+a_i \Delta t_i$ --.

Column 17,
Line 2, "$\alpha_i$" should read -- $a_i$ --.
Line 3, "$\alpha_i=-F_m(y_i')/pwld$" should read -- $a_i=-F_m(y_i')/pwld$ --.

Column 23,
Lines 3, 8, and 13, each occurrence of "1" should read -- 1 --.

UNITED STATES PATENT AND TRADEMARK OFFICE
CERTIFICATE OF CORRECTION

PATENT NO. : 5,771,321
DATED : June 23, 1998
INVENTOR(S) : Ernest Stern

It is certified that error appears in the above-identified patent and that said Letters Patent is hereby corrected as shown below:

Column 26,
Line 35, "$\alpha_{LSB}$" should read -- $a_{LSB}$ --.
Line 40, "$t_\alpha$" should read -- $t_a$ --.
Line 41, "$\alpha$" should read -- a --.

Column 30,
Lines 28 and 30, each occurrence of "$\alpha$" should read -- a --.
Line 54, "$\alpha/2 = \Delta \tan \Omega_m$" should read -- $a/2 = \Delta \tan \Omega_m$ --.
Lines 59 and 62, each occurrence of "$\alpha/2$" should read -- $a/2$ --.

Column 31,
Line 13, "$\alpha$" should read -- a --.
Line 16, "$-\alpha/2$" should read -- $-a/2$ --.

Column 49,
Line 27, "with to" should read -- with --.

Column 50,
Line 53, "the" should read -- The --.

Signed and Sealed this

Sixth Day of December, 2005

JON W. DUDAS
*Director of the United States Patent and Trademark Office*